United States Patent
Lai et al.

(10) Patent No.: US 10,514,523 B2
(45) Date of Patent: Dec. 24, 2019

(54) OPTICAL IMAGE CAPTURING SYSTEM AND ELECTRONIC DEVICE

(71) Applicant: ABILITY OPTO-ELECTRONICS TECHNOLOGY CO.LTD., Taichung (TW)

(72) Inventors: Chien-Hsun Lai, Taichung (TW);
Yeong-Ming Chang, Taichung (TW);
Chen-Hung Tsai, Taichung (TW);
Ying-Jung Chen, Taichung (TW);
Yao-Wei Liu, Taichung (TW);
Hui-Hsuan Yang, Taichung (TW)

(73) Assignee: ABILITY OPTO-ELECTRONICS TECHNOLOGY CO. LTD., Taichung (TW)

(*) Notice: Subject to any disclaimer, the term of this patent is extended or adjusted under 35 U.S.C. 154(b) by 207 days.

(21) Appl. No.: 15/671,765

(22) Filed: Aug. 8, 2017

(65) Prior Publication Data

US 2018/0307000 A1    Oct. 25, 2018

(30) Foreign Application Priority Data

Apr. 21, 2017    (TW) .............................. 106113530 A

(51) Int. Cl.
*G02B 7/02*    (2006.01)
*G02B 9/04*    (2006.01)
*G02B 13/00*   (2006.01)

(52) U.S. Cl.
CPC ............. *G02B 7/028* (2013.01); *G02B 7/021* (2013.01); *G02B 9/04* (2013.01); *G02B 13/002* (2013.01); *G02B 13/003* (2013.01); *G02B 13/0045* (2013.01)

(58) Field of Classification Search
CPC .......... G02B 7/028; G02B 7/021; G02B 9/04; G02B 13/002; G02B 13/003; G02B 13/005
USPC ......................................................... 359/717
See application file for complete search history.

(56) References Cited

U.S. PATENT DOCUMENTS

| | | | |
|---|---|---|---|
| 9,594,228 B1* | 3/2017 | Feng | H04N 5/2254 |
| 9,933,592 B1* | 4/2018 | Peters | G02B 7/028 |
| 10,139,604 B2* | 11/2018 | Noethen | G02B 13/08 |
| 10,281,694 B2* | 5/2019 | Avila | G02B 27/0911 |
| 2012/0026388 A1* | 2/2012 | Sano | G02B 13/0045 348/360 |
| 2017/0059807 A1* | 3/2017 | Feng | H04N 5/2254 |
| 2018/0081154 A1* | 3/2018 | Cheng | G02B 13/14 |
| 2018/0364458 A1* | 12/2018 | Avila | G02B 27/0911 |
| 2019/0196159 A1* | 6/2019 | Avila | G02B 27/0911 |

FOREIGN PATENT DOCUMENTS

| | | |
|---|---|---|
| CN | 101131464 A | 2/2008 |
| CN | 107870410 A | 4/2018 |
| TW | 200717062 A | 5/2007 |

* cited by examiner

*Primary Examiner* — William R Alexander
(74) *Attorney, Agent, or Firm* — Muncy, Geissler, Olds & Lowe, P.C.

(57) ABSTRACT

An optical image capturing system and an electronic using the same are disclosed. The optical image capturing system includes at least two lenses, an image plane, and a first position element. In certain condition, the design of the optical image capturing system may simantaneously inhibit the deviation of effect focal length and improve the imagining quality in response to temperature fluctuation.

27 Claims, 32 Drawing Sheets

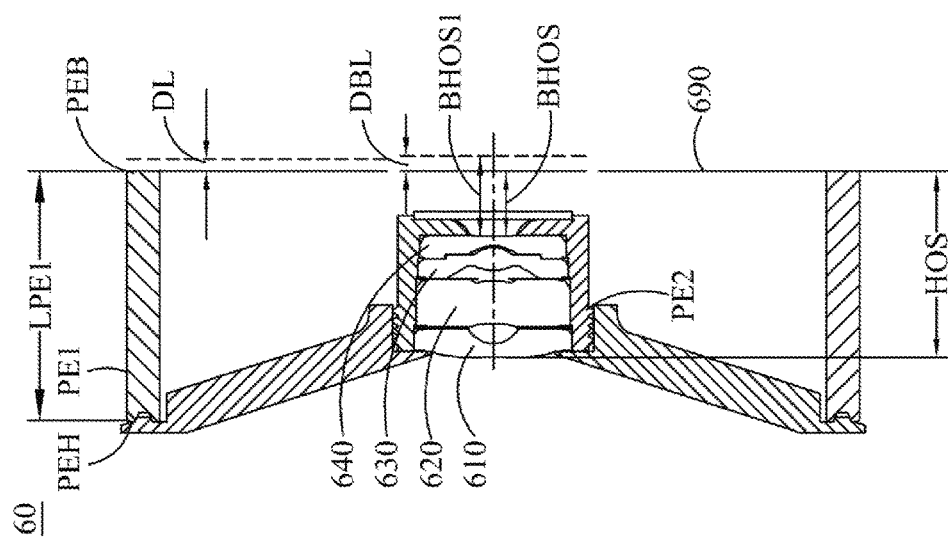

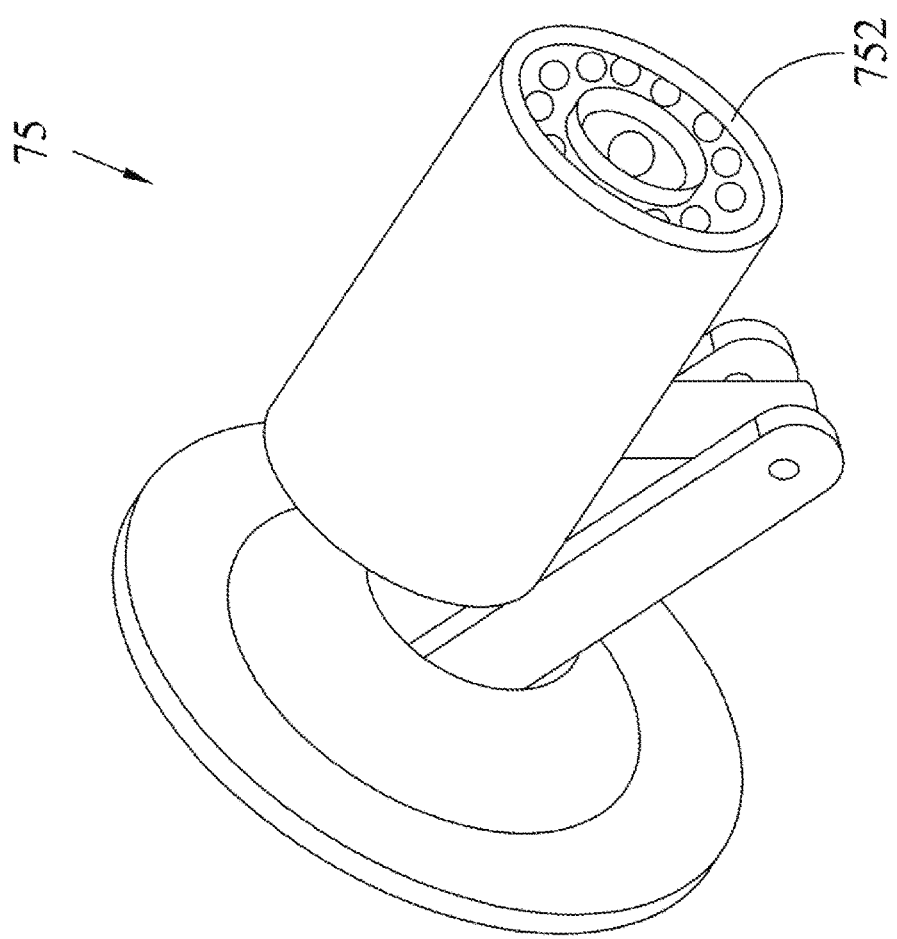

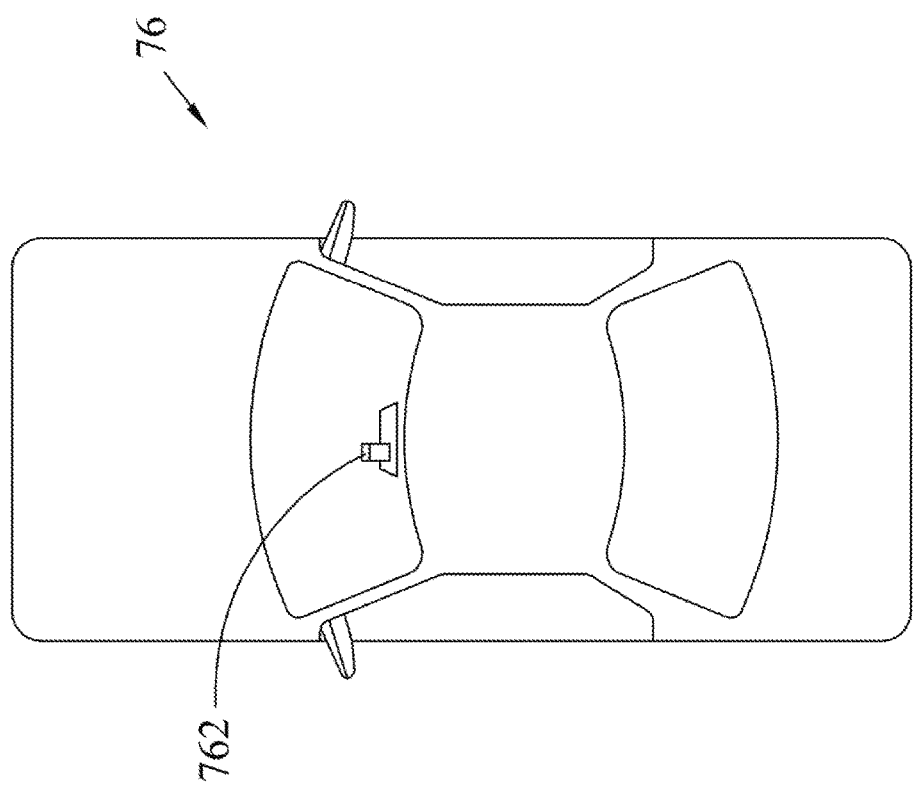

OPTICAL IMAGE CAPTURING SYSTEM AND ELECTRONIC DEVICE

CROSS-REFERENCE TO RELATED APPLICATION

This application claims the benefit of Taiwan Patent Application No. 106113530, filed on Apr. 21, 2017, in the Taiwan Intellectual Property Office, the disclosure of which is incorporated herein in its entirety by reference.

BACKGROUND OF THE INVENTION

1. Field of the Invention

The present invention generally relates to an optical system, and more particularly to a compact optical image capturing system for an electronic device.

2. Description of the Related Art

In recent years, with the rise of portable electronic devices having camera functionalities, the demand for an optical image capturing system is raised gradually. The image sensing device of the ordinary photographing camera is commonly selected from charge coupled device (CCD) or complementary metal-oxide semiconductor sensor (CMOS Sensor). Also, as advanced semiconductor manufacturing technology enables the minimization of the pixel size of the image sensing device, the development of the optical image capturing system towards the field of high pixels. Therefore, the requirement for high imaging quality is rapidly raised.

In a conventional optical image capturing system applied on an electronic device, the lenses and the mechanisms thereof are usually made of non-temperature-compensated material; however, more end consumers may use the electronic devices in extreme environment for photograph, for example, the environment with photograph temperature more than 50° C., and an offset of an initial focal length of the optical image capturing system may occur because of the rising temperature of the environment, it may result in reduction of imaging quality. For this reason, the conventional optical image capturing system is unable to meet the needs of high-level photography.

It is an important issue to inhibit the deviation of effect focal length in response to temperature fluctuation. Also, the modern lens is also asked to have several characters, including high image quality.

SUMMARY OF THE INVENTION

The aspect of embodiment of the present disclosure directs to an optical image capturing system and an optical image capturing lens which use combination of refractive powers, convex and concave surfaces of at least two optical lenses (the convex or concave surface in the disclosure denotes the geometrical shape of an image-side surface or an object-side surface of each lens on an optical axis), and use specific material, which has a temperature refractive index coefficient (dn/dt) relative to air being lower than or equal to zero in a temperature range of −50° C. to 100° C., to produce the optical lens, and use material having suitable thermal expansion coefficient to produce positioning elements for optical lenses (such as a holder and a base), so as to be applied to electronic products with high weatherability.

The term and its definition to the lens parameter in the embodiment of the present are shown as below for further reference.

The Lens Parameter Related to a Length or a Height in the Lens:

A maximum height for image formation of the optical image capturing system is denoted by HOI, for example, a half of a length of a diagonal line of an effective sensing area of the image sensing unit, and that is also denoted by ImgH. A height of the optical image capturing system at a standard temperature ST (such as 25° C.) is denoted by HOS, and a distance on the optical axis from the first lens, which is nearest to object side, to the image plane, and the distance is denoted as Total Track Length. In the optical image capturing system, a focal length of the system at the standard temperature ST (such as 25° C.) is denoted by FST (that is, Effect Focal Length). Heights of the optical image capturing system at a first working temperature (such as 70° C.) and a second working temperature (such as 50° C.) are denoted by HOS1 and HOS2, respectively, and their definitions are the same as that of HOS. Focal lengths of the optical image capturing system at the first working temperature and the second working temperature are denoted by FWT1 and FWT2, respectively.

A back focal length of the optical image capturing system at 25° C. is denoted by BHOS, which is defined as a distance on the optical axis between the image-side surface of the lens, which is nearest to the image plane, and the image plane. Back focal lengths of the optical image capturing system at the first working temperature (70° C.) and the second working temperature (50° C.) are denoted by BHOS1 and BHOS2, respectively, and their definitions are the same as that of BHOS. |BHOS1−BHOS| is a change of the back focal length of the optical image capturing system at the first working temperature and is also denoted by DBL1. |BHOS2−BHOS| is a change of the back focal length of the optical image capturing system at the second working temperature and is also denoted by DBL2. At 25° C., InTL is a distance between the object-side surface of the first lens and the image-side surface of the lens which is the nearest to the image plane, HOS is sum of BHOS and InTL, and InS is a distance between the aperture and the image plane.

The Lens Parameter Related to a Material in the Lens:

An Abbe number of the first lens in the optical image capturing system is denoted by NA1 (instance). A refractive index of the first lens is denoted by Nd1 (instance). At least one lens of the optical image capturing system may be made of material of which thermal refractive index coefficient is negative at the first working temperature WT1, which is higher than the standard temperature ST (25° C.); that is, the material of the lens has a characteristic of negative dn/dt at the temperature higher than the standard temperature ST, and the characteristic is denoted by a first thermal refractive index coefficient DNT1. Furthermore, at least one lens of the optical image capturing system may be made of material of which thermal refractive index coefficient is negative at the second working temperature WT2, which is higher than the standard temperature ST (25° C.) but lower than the first working temperature WT1, that is, the material of the lens has a negative thermal refractive index coefficient which is denoted by DNT2.

The thermal refractive index coefficient of the material of the lens is not a constant, and may be a specific value within a specific temperature range. For example, a thermal refractive index coefficient of LBC3N glass material is −8.2 in a temperature range of 40° C. to 60° C., and may be changed to −8.1 in a temperature range of 60° C. to 80° C. For example, a thermal refractive index coefficient of F4520 plastic material is −106.7 in a temperature range of 40° C. to 55° C., and may be changed to −120.0 in a temperature range of 40° C. to 80° C.

The Lens Parameter Related to a View Angle of the Lens:

A view angle is denoted by AF. Half of the view angle is denoted by HAF. A major light angle is denoted by MRA.

The Lens Parameter Related to Exit/Entrance Pupil in the Lens:

An entrance pupil diameter of the optical image capturing system is denoted by HEP. For any surface of any lens, a maximum effective half diameter (EHD) is a perpendicular distance between an optical axis and a crossing point on the surface wherein the incident light with a maximum viewing angle of the system passing the very edge of the entrance pupil. For example, the maximum effective half diameter of the object-side surface of the first lens is denoted by EHD11, the maximum effective half diameter of the image-side surface of the first lens is denoted by EHD12, the maximum effective half diameter of the object-side surface of the second lens is denoted by EHD21, the maximum effective half diameter of the image-side surface of the second lens is denoted by EHD22, and so on. The maximum effective diameter of the image-side surface which is nearest to the image plane of the optical image capturing system is denoted by PhiA, and the relationship is satisfied: PhiA=a double EHD. If the surface is aspheric, the cut-off point of the maximum effective diameter namely includes the cut-off point of the aspherical surface. An ineffective half diameter (IHD) position of any surface of single lens element means the surficial section of the cut-off point (if it is an aspheric surface, an point end of the aspherical coefficient is on the surface) of the maximum effective diameter extending from the same surface away from the optical axis. The maximum diameter of the image-side surface of the lens element which is nearest to the image plane of the optical image capturing system is denoted by PhiB, and the relationship is satisfied: PhiB a double (a maximum EHD+a maximum IHD) =PhiA+a double (a maximum IHD).

The Lens Parameter Related to an Arc Length of the Lens Shape and an Outline of Surface A length of outline curve of the maximum effective half diameter position of any surface of a single lens element refers to a length of outline curve from an axial point on the surface of the lens element to the maximum effective half diameter position of the surface along an outline of the surface of the lens element and is denoted as ARS. For example, the length of outline curve of the maximum effective half diameter position of the object-side surface of the first lens element is denoted as ARS11. The length of outline curve of the maximum effective half diameter position of the image-side surface of the first lens element is denoted as ARS12. The length of outline curve of the maximum effective half diameter position of the object-side surface of the second lens element is denoted as ARS21. The length of outline curve of the maximum effective half diameter position of the image-side surface of the second lens element is denoted as ARS22. The lengths of outline curve of the maximum effective half diameter position of any surface of the other lens elements in the optical image capturing system are denoted in the similar way.

A length of outline curve of a half of an pupil diameter (HEP) of any surface of a signal lens element refers to a length of outline curve of the half of the entrance pupil diameter (HEP) from an axial point on the surface of the lens element to a coordinate point of perpendicular height with a distance of the half of the entrance pupil diameter from the optical axis on the surface along the outline of the surface of the lens element and is denoted as ARE. For example, the length of the outline curve of the half of the entrance pupil diameter (HEP) of the object-side surface of the first lens element is denoted as ARE11. The length of the outline curve of the half of the entrance pupil diameter (HEP) of the image-side surface of the first lens element is denoted as ARE12. The length of the outline curve of the half of the entrance pupil diameter (HEP) of the object-side surface of the second lens element is denoted as ARE21. The length of the outline curve of the half of the entrance pupil diameter (HEP) of the image-side surface of the second lens element is denoted as ARE22. The lengths of outline curves of the half of the entrance pupil diameters (HEP) of any surface of the other lens elements in the optical image capturing system are denoted in the similar way.

The Lens Parameter Related to a Depth of the Lens Shape:

A distance in parallel with the optical axis from a point wherein the optical axis passes through to an end point of the maximum effective semi diameter on the object-side surface of the seventh lens is denoted by InRS71 (the depth of the maximum effective semi diameter). A distance in parallel with the optical axis from a point wherein the optical axis passes through to an end point of the maximum effective semi diameter on the image-side surface of the seventh lens is denoted by InRS72 (the depth of the maximum effective semi diameter). The depth of the maximum effective semi diameter (sinkage) on the object-side surface or the image-side surface of any other lens is denoted in the same manner.

The Lens Parameter Related to the Lens Shape:

A critical point C is a tangent point on a surface of a specific lens, and the tangent point is tangent to a plane perpendicular to the optical axis and the tangent point cannot be a crossover point on the optical axis. Following the above description, a distance perpendicular to the optical axis between a critical point C61 on the object-side surface of the sixth lens and the optical axis is HVT61 (instance), and a distance perpendicular to the optical axis between a critical point C62 on the image-side surface of the sixth lens and the optical axis is HVT62 (instance). A distance perpendicular to the optical axis between a critical point C71 on the object-side surface of the seventh lens and the optical axis is HVT71 (instance), and a distance perpendicular to the optical axis between a critical point C72 on the image-side surface of the seventh lens and the optical axis is HVT72 (instance). A distance perpendicular to the optical axis between a critical point on the object-side or image-side surface of other lenses and the optical axis is denoted in the same manner.

The object-side surface of the seventh lens has one inflection point IF711 which is the nearest to the optical axis, and the sinkage value of the inflection point IF711 is denoted by SGI711 (instance). A distance perpendicular to the optical axis between the inflection point IF711 and the optical axis is HIF711 (instance). The image-side surface of the seventh lens has one inflection point IF721 which is nearest to the optical axis, and the sinkage value of the inflection point IF721 is denoted by SGI721 (instance). A distance perpendicular to the optical axis between the inflection point IF721 and the optical axis is HIF721 (instance).

The object-side surface of the seventh lens has one inflection point IF712 which is the second nearest to the optical axis, and the sinkage value of the inflection point IF712 is denoted by SGI712 (instance). A distance perpendicular to the optical axis between the inflection point IF712 and the optical axis is HIF712 (instance). The image-side surface of the seventh lens has one inflection point IF722 which is the second nearest to the optical axis, and the sinkage value of the inflection point IF722 is denoted by SGI722 (instance). A distance perpendicular to the optical axis between the inflection point IF722 and the optical axis is HIF722 (instance).

The object-side surface of the seventh lens has one inflection point IF713 which is the third nearest to the optical axis, and the sinkage value of the inflection point IF713 is denoted by SGI713 (instance). A distance perpendicular to the optical axis between the inflection point IF713 and the optical axis is HIF713 (instance). The image-side surface of the seventh lens has one inflection point IF723 which is the third nearest to the optical axis, and the sinkage value of the inflection point IF723 is denoted by SGI723 (instance). A distance perpendicular to the optical axis between the inflection point IF723 and the optical axis is HIF723 (instance).

The object-side surface of the seventh lens has one inflection point IF714 which is the fourth nearest to the optical axis, and the sinkage value of the inflection point IF714 is denoted by SGI714 (instance). A distance perpendicular to the optical axis between the inflection point IF714 and the optical axis is HIF714 (instance). The image-side surface of the seventh lens has one inflection point IF724 which is the fourth nearest to the optical axis, and the sinkage value of the inflection point IF724 is denoted by SGI724 (instance). A distance perpendicular to the optical axis between the inflection point IF724 and the optical axis is HIF724 (instance).

An inflection point, a distance perpendicular to the optical axis between the inflection point and the optical axis, and a sinkage value thereof on the object-side surface or image-side surface of other lenses is denoted in the same manner.

The length of the outline curve of any surface of a signal lens element in the maximum effective half diameter position affects the functions of the surface aberration correction and the optical path difference in each view field. The longer outline curve may lead to a better function of aberration correction, but the difficulty of the production may become inevitable. Hence, the length of the outline curve of the maximum effective half diameter position of any surface of a signal lens element (ARS) has to be controlled, and especially, the ratio relations (ARS/TP) between the length of the outline curve of the maximum effective half diameter position of the surface (ARS) and the thickness of the lens element to which the surface belongs on the optical axis (TP) has to be controlled. For example, the length of the outline curve of the maximum effective half diameter position of the object-side surface of the first lens element is denoted as ARS11, and the thickness of the first lens element on the optical axis is TP1, and the ratio between both of them is ARS11/TP1. The length of the outline curve of the maximum effective half diameter position of the image-side surface of the first lens element is denoted as ARS12, and the ratio between ARS12 and TP1 is ARS12/TP1. The length of the outline curve of the maximum effective half diameter position of the object-side surface of the second lens element is denoted as ARS21, and the thickness of the second lens element on the optical axis is TP2, and the ratio between both of them is ARS21/TP2. The length of the outline curve of the maximum effective half diameter position of the image-side surface of the second lens element is denoted as ARS22, and the ratio between ARS22 and TP2 is ARS22/TP2. The ratio relations between the lengths of the outline curve of the maximum effective half diameter position of any surface of the other lens elements and the thicknesses of the lens elements to which the surfaces belong on the optical axis (TP) are denoted in the similar way.

The length of outline curve of half of an entrance pupil diameter of any surface of a single lens element especially affects the functions of the surface aberration correction and the optical path difference in each shared view field. The longer outline curve may lead to a better function of aberration correction, but the difficulty of the production may become inevitable. Hence, the length of outline curve of half of an entrance pupil diameter of any surface of a single lens element has to be controlled, and especially, the ratio relationship between the length of outline curve of half of an entrance pupil diameter of any surface of a single lens element and the thickness on the optical axis has to be controlled. For example, the length of outline curve of the half of the entrance pupil diameter of the object-side surface of the first lens element is denoted as ARE11, and the thickness of the first lens element on the optical axis is TP1, and the ratio thereof is ARE11/TP1. The length of outline curve of the half of the entrance pupil diameter of the image-side surface of the first lens element is denoted as ARE12, and the thickness of the first lens element on the optical axis is TP1, and the ratio thereof is ARE12/TP1. The length of outline curve of the half of the entrance pupil diameter of the object-side surface of the first lens element is denoted as ARE21, and the thickness of the second lens element on the optical axis is TP2, and the ratio thereof is ARE21/TP2. The length of outline curve of the half of the entrance pupil diameter of the image-side surface of the second lens element is denoted as ARE22, and the thickness of the second lens element on the optical axis is TP2, and the ratio thereof is ARE22/TP2. The ratio relationship of the remaining lens elements of the optical image capturing system can be referred as mentioned above.

The Lens Parameter Related to an Aberration:

Optical distortion for image formation in the optical image capturing system is denoted by ODT. TV distortion for image formation in the optical image capturing system is denoted by TDT. Further, the range of the aberration offset for the view of image formation may be limited to 50%-100% field. An offset of the spherical aberration is denoted by DFS. An offset of the coma aberration is denoted by DFC.

The present invention provides an optical image capturing system, and any one of the lenses thereof is provided with an inflection point at the object-side surface or at the image-side surface to adjust the incident angle of each view field and modify the ODT and the TDT.

A modulation transfer function (MTF) graph of an optical image capturing system is used to test and evaluate the contrast and sharpness of the generated images. The vertical axis of the coordinate system of the MTF graph represents the contrast transfer rate, of which the value is between 0 and 1, and the horizontal axis of the coordinate system represents the spatial frequency, of which the unit is cycles/mm or 1 p/mm, i.e., line pairs per millimeter. Theoretically, a perfect optical image capturing system can present all detailed contrast and every line of an object in an image. However, the contrast transfer rate of a practical optical image capturing system along a vertical axis thereof would be less than 1. In addition, peripheral areas in an image would have a poorer realistic effect than a center area thereof has. For visible spectrum, the values of MTF in the spatial frequency of 55 cycles/mm at the optical axis, 0.3 field of view, and 0.7 field of view on an image plane are respectively denoted by MTFE0, MTFE3, and MTFE7; the values of MTF in the spatial frequency of 110 cycles/mm at the optical axis, 0.3 field of view, and 0.7 field of view on an image plane are respectively denoted by MTFQ0, MTFQ3, and MTFQ7; the values of MTF in the spatial frequency of 220 cycles/mm at the optical axis, 0.3 field of view, and 0.7 field of view on an image plane are respectively denoted by MTFH0, MTFH3, and MTFH7; the values of MTF in the spatial frequency of 440 cycles/mm at the optical axis, 0.3 field of view, and 0.7 field of view on the image plane are respectively denoted by MTF0, MTF3, and MTF7. The three aforementioned fields of view respectively represent the center, the inner field of view, and the outer field of view of a lens, and, therefore, can be used to evaluate the performance of an optical image capturing system. If the optical image capturing system provided in the present invention corresponds to photosensitive components which provide pixels having a size no large than 1.12 micrometer, a quarter of the spatial frequency, a half of the spatial frequency (half frequency), and the full spatial frequency (full frequency) of the MTF diagram are respectively at least 110 cycles/mm, 220 cycles/mm and 440 cycles/mm.

If an optical image capturing system is required to be able also to image for infrared spectrum, e.g., to be used in low-light environments, then the optical image capturing system should be workable in wavelengths of 850 nm or 800 nm. Since the main function for an optical image capturing system used in low-light environment is to distinguish the shape of objects by light and shade, which does not require high resolution, it is appropriate to only use spatial frequency less than 110 cycles/mm for evaluating the performance of optical image capturing system in the infrared spectrum. When the aforementioned wavelength of 850 nm focuses on the image plane, the contrast transfer rates (i.e., the values of MTF) in spatial frequency of 55 cycles/mm at the optical axis, 0.3 field of view, and 0.7 field of view on an image plane are respectively denoted by MTFI0, MTFI3, and MTFI7. However, infrared wavelengths of 850 nm or 800 nm are far away from the wavelengths of visible light; it would be difficult to design an optical image capturing system capable of focusing visible and infrared light (i.e., dual-mode) at the same time and achieving certain performance.

The term and its definition to the parameters of structure elements in the embodiment of the present are shown as below for further reference.

Please refer to FIG. 1C. The first embodiment is taken as an example for illustration the terms of the same structure elements used in embodiments. The optical image capturing system includes an image sensor 190. The optical image capturing system may include a first positioning element which is denoted by PE1, and a length of an outer wall of the first positioning element PE1 in parallel with the optical axis (such as z axis) at 25° C. is denoted by LPE1, and the first positioning element may be made of metal, such as aluminum, copper, silver or gold; or plastic, such as polycarbonate (PC) or liquid crystal plastic (LCP). The first positioning element includes a base PEB and a holder PEH. The base PEB has an accommodation open chamber, and the base PEB is disposed near to the image plane and configured to shield the image plane 192. The holder PEH is in a hollow shape and non-transparent, and configured to connect the optical imaging lens assembly 10. The first positioning element PE1 may be implemented by a well-known holder, or may be a one-piece structure element to combine with a holder. The optical imaging lens assembly 10 may include a second positioning element denoted by PE2. The second positioning element is in a hollow-cylindrical shape and non-transparent, and is configured to accommodate the lenses and arrange the lenses to position on the optical axis.

Furthermore, the optical imaging lens assembly 10 may include at least one spacer which may be disposed between two neighboring lenses to ensure an air gap therebetween on the optical axis. When the optical imaging lens assembly 10 includes a plurality of spacers, the plurality of spacers are denoted by, in order along an optical axis from an object side to an image plane, SP1, SP2, SP3, SP4, SP5, SP6, and SP7, respectively. Please refer to FIG. 1C. The optical imaging lens assembly of the first embodiment includes two spacers SP1 and SP2, and the spacer SP1 is disposed between the second lens 120 and the third lens 130, and the spacer SP2 is disposed between the third lens 130 and the fourth lens 140.

A thermal expansion coefficient of the material of the first positioning element PE1 is denoted by CES1, and α is the product of LPE1 and CES1. A thermal expansion length variation of the first positioning element PE1 at a first working temperature (70° C.) is denoted by DL and satisfies: DL=α*(70° C.−25° C.).

Values of the thermal expansion coefficient of material used in embodiments of the present invention A thermal expansion coefficient of aluminum is 23.6 ($10^{-6}$/° C.), a thermal expansion coefficient of polycarbonate is 70 ($10^{-6}$/T), a thermal expansion coefficient of liquid crystal plastic is 30 ($10^{-6}$/T), and a thermal expansion coefficient of polycarbonate mixed with 30 wt % of glass is 45 ($10^{-6}$/T).

According to an embodiment, the optical image capturing system of the present invention includes an optical imaging lens assembly and an image plane. The optical imaging lens assembly includes at least two lenses having refractive power, and at least one among the at least two lenses has positive refractive power. Each lens of the at least two lenses has an object-side surface, which faces an object side, and an image-side surface, which faces an image side. The optical image capturing system satisfies: $1.0 \leq FST/HEP \leq 10.0$; $0 \text{ deg} < HAF \leq 150 \text{ deg}$; $WT1 \leq 100°$ C.; and $BHOS1/BHOS \geq 0.9$, where FST is a standard effective focal length of the optical imaging lens assembly at a standard temperature ST, HEP is an entrance pupil diameter of the optical imaging lens assembly, HAF is a half of the maximum field angle of the optical imaging lens assembly; under the standard temperature ST, HOS is a distance on the optical axis between the object-side surface of the lens, which is nearest to the object side, and the image plane, BHOS is a distance on the optical axis between the image-side surface of the lens, which is nearest to the image plane, and the image plane; under a first working temperature WT1, BHOS1 is a distance on the optical axis between the image-side surface of the lens, which is nearest to the image plane, and the image plane.

According to an embodiment, the optical image capturing system of the present invention includes an optical imaging lens assembly, an image plane, and a first positioning element. The optical imaging lens assembly includes at least two lenses having refractive power, and at least one among the at least two lenses has positive refractive power. Each lens of the at least two lenses has an object-side surface, which faces an object side, and an image-side surface, which faces an image side. The first positioning element includes a holder and a base, and the holder is in a hollow shape and non-transparent, and configured to connect the optical imaging lens assembly, and the base is disposed near the image plane and configured to shield the image plane, the optical image capturing system satisfies: $1.0 \leq FST/HEP \leq 10.0$; $0 \text{ deg} < HAF \leq 150 \text{ deg}$; $1 \text{ mm} \leq LPE1 \leq 1000 \text{ mm}$; $1.1(10^{-6}/° \text{ C.}) \leq CES1 \leq 120(10^{-6}/° \text{ C.})$; and $DNT1 < 0$ ($10^{-6}$/T), where FST is a standard effective focal length of the optical imaging lens assembly at a standard temperature ST, HEP is an entrance pupil diameter of the optical imaging lens assembly, HAF is a half of the maximum field angle of the optical imaging lens assembly; at least one among the at least two lenses of the optical imaging lens assembly is made of material which has a first thermal refractive index coefficient DNT1 at a first working temperature WT1 and a reference wavelength of d-line, and LPE1 is a length of an outer wall of the first positioning element in parallel with the optical axis at the standard temperature ST, and CES1 is a thermal expansion coefficient of the first positioning element at the standard temperature ST.

According to an embodiment, the optical image capturing system of the present invention includes an optical imaging lens assembly and an image plane. The optical imaging lens assembly includes at least two lenses having refractive power, and at least one among the at least two lenses has positive refractive power. Each lens of the at least two lenses has an object-side surface, which faces an object side, and an image-side surface, which faces an image side. The optical image capturing system satisfies: $1.0 \leq FST/HEP \leq 10.0$; $0 \deg < HAF \leq 150 \deg$; $-50°$ C.$<WT1 \leq 100°$ C.; $-200(10^{-6}/°$ C.$) \leq DNT1 < 0(10^{-6}/°$ C.$)$ and $0 < |BHOS1-BHOS|/BHOS \leq 5$, where FST is a standard effective focal length of the optical imaging lens assembly at a standard temperature ST, HEP is an entrance pupil diameter of the optical imaging lens assembly, HAF is a half of the maximum field angle of the optical imaging lens assembly; under the standard temperature ST, HOS is a distance on the optical axis between the object-side surface of the lens, which is nearest to the object side and the image plane, BHOS is a distance on the optical axis between the image-side surface of the lens, which is nearest to the image plane, and the image plane; under a first working temperature WT1, BHOS1 is a distance on the optical axis between the image-side surface of the lens, which is nearest to the image plane, and the image plane; at least one among the at least two lenses of the optical imaging lens assembly is made of material which has a first thermal refractive index coefficient DNT1 at a first working temperature WT1 and a reference wavelength of d-line.

According to an embodiment, the electronic device of the present invention includes an optical imaging lens assembly, an image plane, and a first positioning element. The optical imaging lens assembly comprising at least two lenses having refractive power, and at least one among the at least two lenses has positive refractive power. The first positioning element includes a holder and a base, and the holder is in a hollow shape and non-transparent, and configured to connect the optical imaging lens assembly, and the base is disposed near the image plane and configured to shield the image plane. The optical imaging lens assembly satisfies: $1.0 \leq FST/HEP \leq 10.0$; $0 \deg < HAF \leq 150 \deg$; and $-200(10^{-6}/°$ C.$) \leq DNT1 < 0(10^{-6}/°$ C.$)$, where FST is a standard effective focal length of the optical imaging lens assembly at a standard temperature ST, at least one among the at least two lenses of the optical imaging lens assembly is made of material which has a first thermal refractive index coefficient DNT1 at a first working temperature WT1 and a reference wavelength of d-line, and the first working temperature WT1 is higher than the standard temperature ST; HEP is an entrance pupil diameter of the optical imaging lens assembly, HAF is a half of the maximum field angle of the optical imaging lens assembly.

In the conventional optical image capturing system which is designed without temperature compensation, the positioning elements thereof (such as base and holder) may thermally expand because of high temperature of environment, it may cause an offset of the image plane, so that the optical imaging lens assembly is unable to focus on an accurate position. The optical image capturing system of the present invention uses specific material, which has a temperature refractive index coefficient (dn/dt) relative to air being lower than or equal to zero in a temperature range of $-50°$ C. to $100°$ C., to produce the optical lens, and also uses material having suitable thermal expansion coefficient to produce positioning elements for optical lenses (such as a holder and a base), so that the variation of back focal length of the optical imaging lens assembly is higher than the length variation DL of the thermally-expanded position element, and the offset of the image plane of the optical image capturing system due to thermal effect may be compensated and inhibited, thereby improving weatherability of the optical image capturing system.

BRIEF DESCRIPTION OF THE DRAWINGS

The structure, operating principle and effects of the present invention will be described in detail by way of various embodiments which are illustrated in the accompanying drawings.

FIG. 6C is a schematic diagram of an assembly of a first positioning element and the optical imaging lens assembly of the sixth embodiment of the present invention;

FIG. 7E shows a schematic view of the optical image capturing system applied to a security monitoring device, in accordance with the present invention;

FIG. 7F shows a schematic view of the optical image capturing system applied to an in-vehicle imaging device, in accordance with the present invention;

DETAILED DESCRIPTION OF THE PREFERRED EMBODIMENTS

Figure 1A:
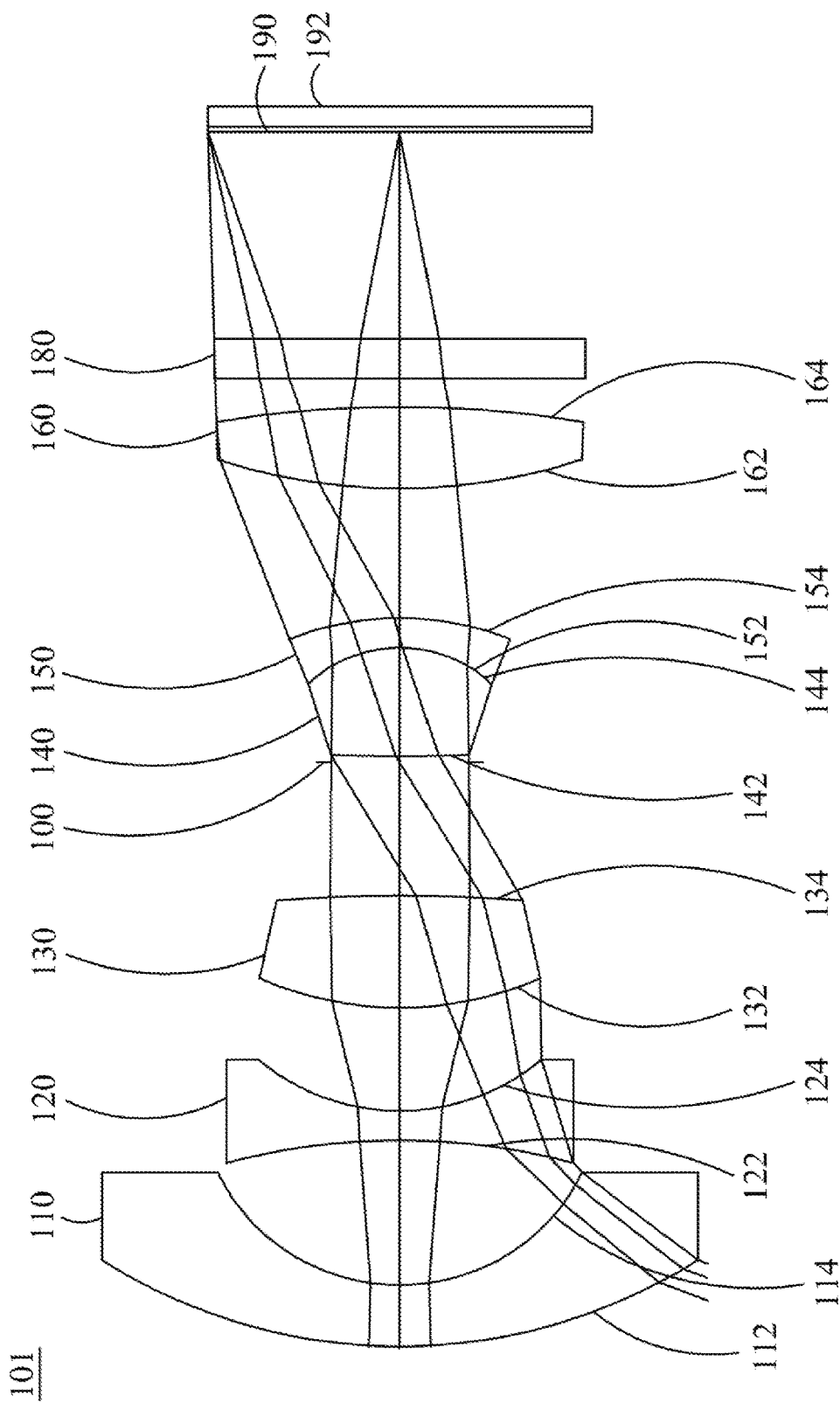
FIG. 1A is a schematic diagram of an optical imaging lens assembly of an optical image capturing system of a first embodiment of the present invention.

The optical image capturing system can work in three wavelengths, including 486.1 nm, 587.5 nm, and 656.2 nm, wherein 587.5 nm is the main reference wavelength and is the reference wavelength for obtaining the technical characters. The optical image capturing system can also work in five wavelengths, including 470 nm, 510 nm, 555 nm, 610 nm, and 650 nm wherein 555 nm is the main reference wavelength, and is the reference wavelength for obtaining the technical characters.

The optical image capturing system of the present invention satisfies $0.5 \leq \Sigma PPR/|\Sigma NPR| \leq 15$ and a preferable range is $1 \leq \Sigma PPR/|\Sigma NPR| \leq 3.0$, where PPR is a ratio of the focal length FST of the optical image capturing system to a focal length fp of each of lenses with positive refractive power at standard temperature ST (for example, 25° C.); NPR is a ratio of the focal length FST of the optical image capturing system to a focal length fn of each of lenses with negative refractive power at standard temperature ST (for example, 25° C.); $\Sigma PPR$ is a sum of the PPRs of each positive lens; and $\Sigma NPR$ is a sum of the NPRs of each negative lens. It is helpful for control of an entire refractive power and an entire length of the optical image capturing system.

The image sensor is provided on the image plane. The optical image capturing system of the present invention satisfies $HOS/HOI \leq 50$ and $0.5 \leq HOS/f \leq 150$, and a preferable range is $1 \leq HOS/HOI \leq 40$ and $1 \leq HOS/f \leq 140$, wherein HOI is a half of a diagonal of an effective sensing area of the image sensor, i.e., the maximum image height, and HOS is a distance on the optical axis between the object-side surface of the first lens and the image plane. It is helpful for reduction of the size of the system for used in compact cameras.

The optical image capturing system of the present invention further is provided with an aperture to increase image quality.

In the optical image capturing system of the present invention, the aperture could be a front aperture or a middle aperture. The front aperture is provided between the object and the first lens, and the middle aperture is provided between the first lens and the image plane. The front aperture provides a long distance between an exit pupil of the system and the image plane, which allows more elements to be installed. The middle aperture may enlarge a view angle of view of the system and increase the efficiency of the image sensor. The optical image capturing system satisfies $0.1 \leq InS/HOS \leq 1.1$, wherein InS is a distance between the aperture and the image-side surface of the sixth lens. It is helpful for size reduction and wide angle.

The optical image capturing system of the present invention satisfies: $0.1 \leq \Sigma TP/InTL \leq 0.9$, wherein InTL is a distance between the object-side surface of the first lens and the image-side surface of the lens which is the nearest to the image plane, and $\Sigma TP$ is a sum of central thicknesses of the lenses on the optical axis. It is helpful for the contrast of image and yield rate of manufacture and provides a suitable back focal length for installation of other elements.

The optical image capturing system of the present invention satisfies: $0.001 \leq |R1/R2| \leq 5$, and a preferable range is $0.01 \leq |R1/R2| < 12$, where R1 is a radius of curvature of the object-side surface of the first lens, and R2 is a radius of curvature of the image-side surface of the first lens. It provides the first lens with a suitable positive refractive power to reduce the increase rate of the spherical aberration.

The optical image capturing system of the present invention satisfies: $IN12/f \leq 60$, wherein IN12 is a distance on the optical axis between the first lens and the second lens. It may correct chromatic aberration and improve the performance.

The optical image capturing system of the present invention satisfies: $IN56/f \leq 3.0$, wherein IN56 is a distance on the optical axis between the fifth lens and the sixth lens. It may correct chromatic aberration and improve the performance.

The optical image capturing system of the present invention satisfies: 0.1≤(TP1+IN12)/TP2≤10, wherein TP1 is a central thickness of the first lens on the optical axis, and TP2 is a central thickness of the second lens on the optical axis. It may control the sensitivity of manufacture of the system and improve the performance.

The optical image capturing system of the present invention satisfies: 0.1≤(TP6+IN56)/TP5≤15, where TP5 is a central thickness of the fifth lens on the optical axis, TP6 is a central thickness of the sixth lens on the optical axis, and IN56 is a distance between the fifth lens and the sixth lens. It may control the sensitivity of manufacture of the system and improve the performance.

The optical image capturing system of the present invention satisfies: 0.1≤TP4/(IN34+TP4+IN45)<1, where TP2 is a central thickness of the second lens on the optical axis, TP3 is a central thickness of the third lens on the optical axis, TP4 is a central thickness of the fourth lens on the optical axis, IN34 is a distance on the optical axis between the third lens and the fourth lens, IN45 is a distance on the optical axis between the fourth lens and the fifth lens, and InTL is a distance between the object-side surface of the first lens and the image-side surface of the sixth lens. It may fine tune and correct the aberration of the incident rays layer by layer, and reduce the height of the system.

The optical image capturing system may satisfy: 0 mm≤HVT7≤13 mm; 0 mm<HVT72≤6 mm; 0≤HVT71/HVT72; 0 mm≤|SGC71|≤0.5 mm; 0 mm<|SGC72|≤2 mm; and 0<|SGC72|/(|SGC72|+TP7)≤0.9, where HVT71 a distance perpendicular to the optical axis between the critical point C71 on the object-side surface of the seventh lens and the optical axis; HVT72 a distance perpendicular to the optical axis between the critical point C72 on the image-side surface of the seventh lens and the optical axis; SGC71 is a distance in parallel with the optical axis between an point on the object-side surface of the seventh lens wherein the optical axis passes through and the critical point C71; SGC72 is a distance in parallel with the optical axis between an point on the image-side surface of the seventh lens wherein the optical axis passes through and the critical point C72. It is helpful to correct the off-axis view field aberration.

The optical image capturing system may satisfy: 0.2≤HVT72/HOI≤0.9, and preferably satisfies: 0.3≤HVT72/HOI≤0.8. It may help to correct the peripheral aberration.

The optical image capturing system may satisfy: 0≤HVT72/HOS≤0.5, and preferably satisfies: 0.2≤HVT72/HOS≤0.45. It may help to correct the peripheral aberration.

The optical image capturing system of the present invention may satisfy: 0<SGI711/(SGI711+TP7)≤0.9; 0<SGI721/(SGI721+TP7)≤0.9, and it is preferable to satisfy: 0.1≤SGI711/(SGI711+TP7)≤0.6; 0.1≤SGI721/(SGI721+TP7)≤0.6, where SGI711 is a displacement in parallel with the optical axis, from a point on the object-side surface of the seventh lens, through which the optical axis passes, to the inflection point on the object-side surface, which is the nearest to the optical axis, and SGI721 is a displacement in parallel with the optical axis, from a point on the image-side surface of the seventh lens, through which the optical axis passes, to the inflection point on the image-side surface, which is the nearest to the optical axis.

The optical image capturing system of the present invention satisfies: 0<SGI712/(SGI712+TP7)≤0.9; 0<SGI722/(SGI722+TP7)≤0.9, and it is preferable to satisfy: 0.1≤SGI712/(SGI712+TP7)≤0.6; 0.1≤SGI722/(SGI722+TP7)≤0.6, where SGI712 is a displacement in parallel with the optical axis, from a point on the object-side surface of the seventh lens, through which the optical axis passes, to the inflection point on the object-side surface, which is the second nearest to the optical axis, and SGI722 is a displacement in parallel with the optical axis, from a point on the image-side surface of the seventh lens, through which the optical axis passes, to the inflection point on the image-side surface, which is the second nearest to the optical axis.

The optical image capturing system of the present invention satisfies: 0.001 mm≤|HIF711|≤5 mm; 0.001 mm≤|HIF721|≤5 mm, and it is preferable to satisfy: 0.1 mm≤|HIF711|≤3.5 mm; 1.5 mm≤|HIF721|≤3.5 mm, where HIF711 is a distance perpendicular to the optical axis between the inflection point on the object-side surface of the seventh lens, which is the nearest to the optical axis, and the optical axis; HIF721 is a distance perpendicular to the optical axis between the inflection point on the image-side surface of the seventh lens, which is the nearest to the optical axis, and the optical axis.

The optical image capturing system of the present invention satisfies 0.001 mm≤|HIF712|≤5 mm; 0.001 mm≤|HIF722|≤5 mm, and it is preferable to satisfy 0.1 mm≤|HIF722|≤3.5 mm; 0.1 mm≤|HIF712|≤3.5 mm, wherein HIF712 is a distance perpendicular to the optical axis between the inflection point on the object-side surface of the seventh lens, which is the second nearest to the optical axis, and the optical axis; HIF722 is a distance perpendicular to the optical axis between the inflection point on the image-side surface of the seventh lens, which is the second nearest to the optical axis, and the optical axis.

The optical image capturing system of the present invention satisfies 0.001 mm≤|HIF713|≤5 mm; 0.001 mm≤|HIF723|≤5 mm, and it is preferable to satisfy 0.1 mm≤|HIF723|≤3.5 mm; 0.1 mm≤|HIF713|≤3.5 mm, wherein HIF713 is a distance perpendicular to the optical axis between the inflection point on the object-side surface of the seventh lens, which is the third nearest to the optical axis, and the optical axis; HIF723 is a distance perpendicular to the optical axis between the inflection point on the image-side surface of the seventh lens, which is the third nearest to the optical axis, and the optical axis.

The optical image capturing system of the present invention satisfies 0.001 mm≤|HIF714|≤5 mm; 0.001 mm≤|HIF724|≤5 mm, and it is preferable to satisfy 0.1 mm≤|HIF724|≤3.5 mm; 0.1 mm≤|HIF714|≤3.5 mm, wherein HIF714 is a distance perpendicular to the optical axis between the inflection point on the object-side surface of the seventh lens, which is the fourth nearest to the optical axis, and the optical axis; HIF724 is a distance perpendicular to the optical axis between the inflection point on the image-side surface of the seventh lens, which is the fourth nearest to the optical axis, and the optical axis.

In an embodiment, the lenses of high Abbe number and the lenses of low Abbe number are arranged in an interlaced arrangement that could be helpful for correction of aberration of the system.

An equation of aspheric surface is:

$$z=ch^2/[1+[1(k+1)c^2h^2]0.5]+A4h^4+A6h^6+A8h^8+A10h^{10}+A12h^{12}+A14h^{14}+A16h^{16}+A18h^{18}+A20h^{20}+ \quad (1)$$

where z is a depression of the aspheric surface; k is conic constant; c is reciprocal of the radius of curvature; and A4, A6, A8, A10, A12, A14, A16, A18, and A20 are high-order aspheric coefficients.

In the optical image capturing system, the lenses could be made of plastic or glass. The plastic lenses may reduce the weight and lower the cost of the system, and the glass lenses may control the thermal effect and enlarge the space for arrangement of the refractive power of the system. In addition, the opposite surfaces (object-side surface and image-side surface) of the first to the seventh lenses could be aspheric that can obtain more control parameters to reduce aberration. The number of aspheric glass lenses could be less than the conventional spherical glass lenses, which is helpful for reduction of the height of the system.

When the lens has a convex surface, which generally means that the surface is convex around a position, through which the optical axis passes, and when the lens has a concave surface, which generally means that the surface is concave around a position, through which the optical axis passes.

The optical image capturing system of the present invention could be applied in a dynamic focusing optical system. It is superior in the correction of aberration and high imaging quality so that it could be allied in lots of fields.

The optical image capturing system of the present invention could further include a driving module to meet different demands, wherein the driving module can be coupled with the lenses to move the lenses. The driving module can be a voice coil motor (VCM), which is used to move the lens for focusing, or can be an optical image stabilization (OIS) component, which is used to lower the possibility of having the problem of image blurring which is caused by subtle movements of the lens while shooting.

To meet different requirements, at least one lens among the first lens to the seventh lens of the optical image capturing system of the present invention can be a light filter, which filters out light of wavelength shorter than 500 nm. Such effect can be achieved by coating on at least one surface of the lens, or by using materials capable of filtering out short waves to make the lens.

The image plane of the optical image capturing system of the present invention may has a planar surface or a curve surface. When the image plane has a curve surface (such as a spherical surface with a radius of curvature), it is helpful to reduce an incident angle for focusing light on the image plane, thereby slightly reducing the length (TTL) of the optical image capturing system and improving relative illumination.

We provide several embodiments in conjunction with the accompanying drawings for the best understanding, which are:

First Embodiment

Figure 1B:
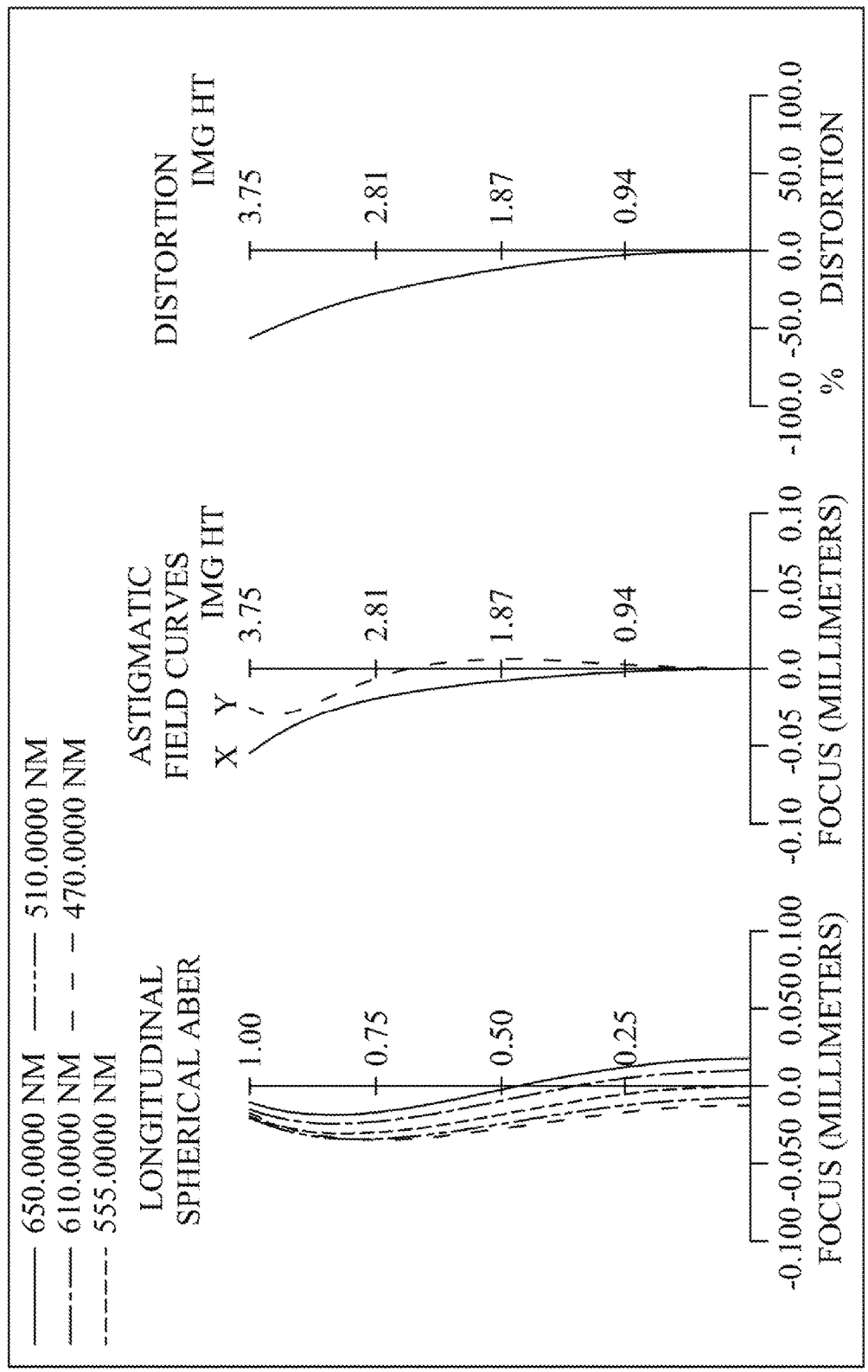
FIG. 1B shows curve diagrams of longitudinal spherical aberration, astigmatic field, and optical distortion of the optical image capturing system in the order from left to right, in accordance with the first embodiment of the present invention.
Figure 1C:
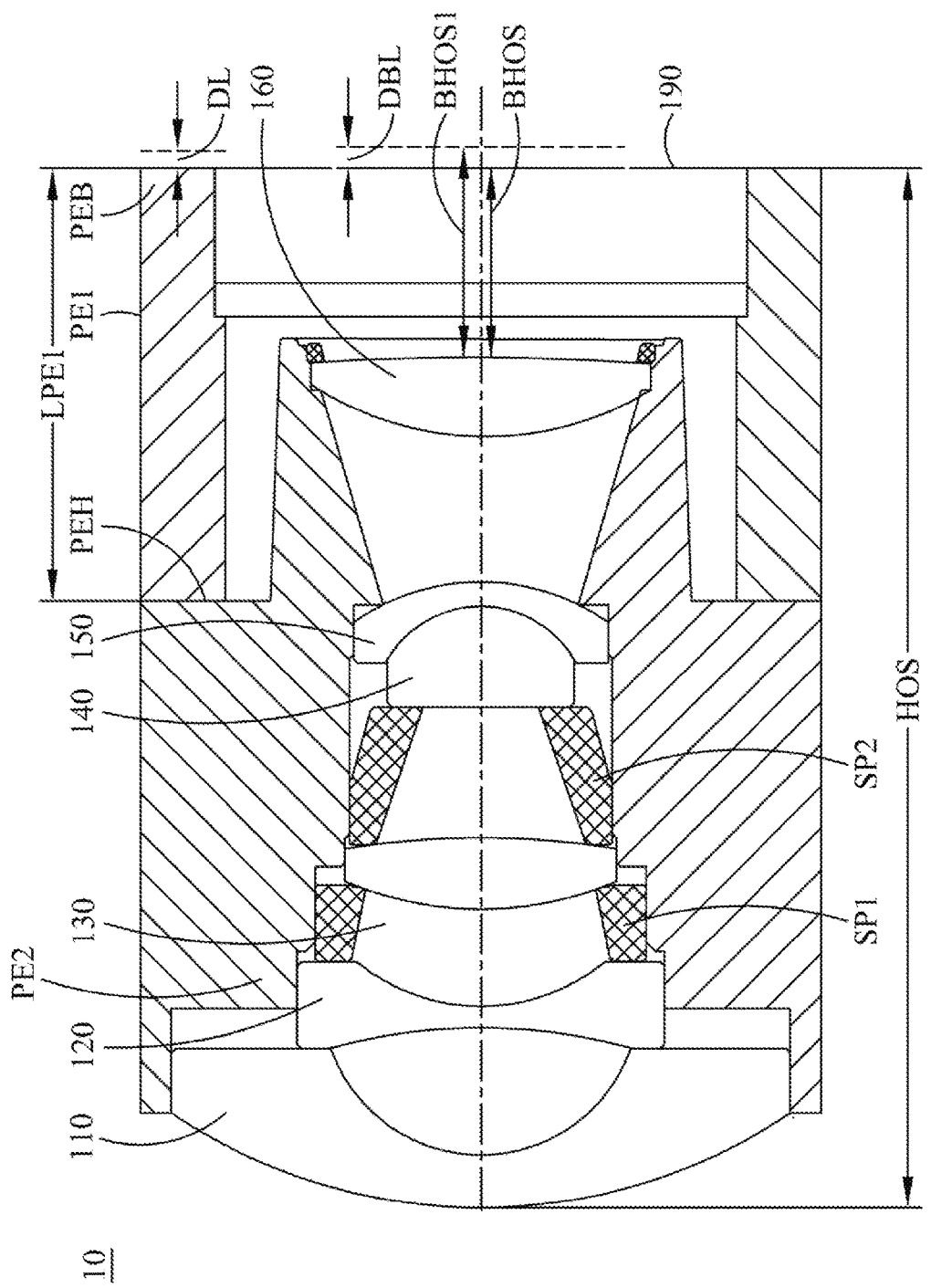
FIG. 1C is a schematic diagram of an assembly of a first positioning element and the optical imaging lens assembly of the first embodiment of the present invention.
Figure 1D:
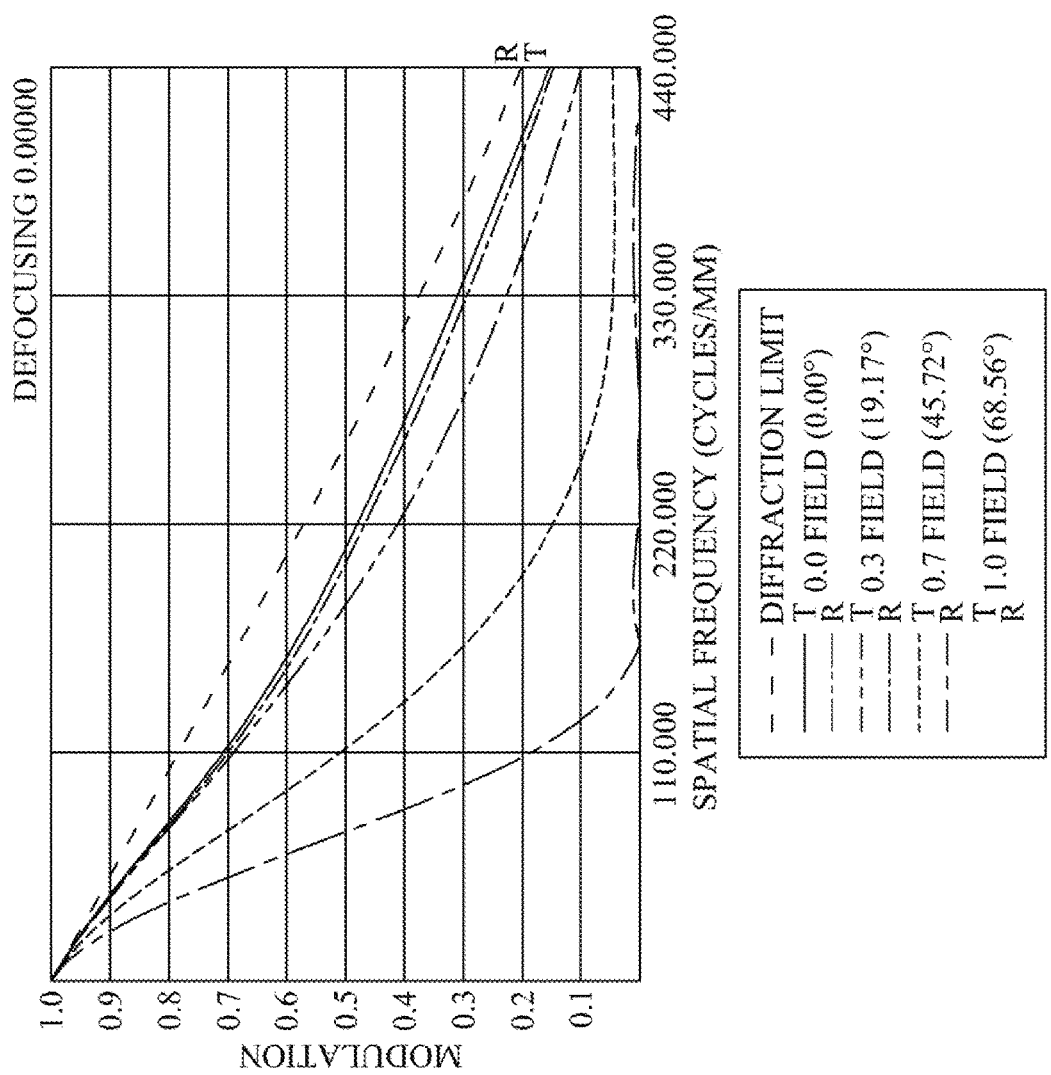
FIG. 1D shows a feature map of modulation transformation of the optical image capturing system of the first embodiment of the present invention in visible spectrum.

The following refers to FIGS. 1A through 1D. FIG. 1A is a schematic diagram of an optical imaging lens assembly of an optical image capturing system of a first embodiment of the present invention. FIG. 1B shows curve diagrams of longitudinal spherical aberration, astigmatic field, and optical distortion of the optical image capturing system in the order from left to right of the first embodiment of the present invention. FIG. 1C is a schematic diagram of an assembly of a first positioning element and the optical imaging lens assembly of the first embodiment of the present invention. FIG. 1D shows a feature map of modulation transformation of the optical image capturing system of the first embodiment of the present invention at the optical axis, 0.3 field of view, and 0.7 field of view in visible spectrum. As shown in FIG. 1A, an optical image capturing system 10 of the first embodiment of the present invention includes, along an optical axis from an object side to an image side, a first lens 110, a second lens 120, a third lens 130, an aperture 100, a fourth lens 140, a fifth lens 150, a sixth lens 160, an infrared rays filter 180, an image plane 190, and an image sensor 192.

The first lens 110 has negative refractive power and is made of glass. An object-side surface 112 thereof, which faces the object side, is a convex spheric surface, and an image-side surface 114 thereof, which faces the image side, is a concave spheric surface. The length of the outline curve of the maximum effective half diameter position of the object-side surface of the first lens is denoted as ARS11, and the length of the outline curve of the maximum effective half diameter position of the image-side surface of the first lens is denoted as ARS12. The length of the outline curve of the half of the entrance pupil diameter (HEP) of the object-side surface of the first lens is denoted as ARE11. The length of the outline curve of the half of the entrance pupil diameter (HEP) of the image-side surface of the first lens is denoted as ARE12. A thickness of the first lens 110 on the optical axis is TP1.

A displacement in parallel with the optical axis from a point on the object-side surface of the first lens, through which the optical axis passes, to the inflection point on the object-side surface, which is the nearest to the optical axis is denoted by SGI111, and a displacement in parallel with the optical axis from a point on the image-side surface of the first lens, through which the optical axis passes, to the inflection point on the image-side surface, which is the nearest to the optical axis is denoted by SGI121.

A displacement in parallel with the optical axis from a point on the object-side surface of the first lens, through which the optical axis passes, to the inflection point on the object-side surface, which is the second nearest to the optical axis is denoted by SGI112, and a displacement in parallel with the optical axis from a point on the image-side surface of the first lens, through which the optical axis passes, to the inflection point on the image-side surface, which is the second nearest to the optical axis is denoted by SGI122.

A displacement perpendicular to the optical axis from a point on the object-side surface of the first lens, through which the optical axis passes, to the inflection point, which is the nearest to the optical axis is denoted by HIF111, and a displacement perpendicular to the optical axis from a point on the image-side surface of the first lens, through which the optical axis passes, to the inflection point, which is the nearest to the optical axis is denoted by HIF121.

A displacement perpendicular to the optical axis from a point on the object-side surface of the first lens, through which the optical axis passes, to the inflection point, which is the second nearest to the optical axis is denoted by HIF112, and a displacement perpendicular to the optical axis from a point on the image-side surface of the first lens, through which the optical axis passes, to the inflection point, which is the second nearest to the optical axis is denoted by HIF122.

The second lens 120 has negative refractive power and is made of glass. An object-side surface 122 thereof, which faces the object side, is a concave spheric surface, and an image-side surface 124 thereof, which faces the image side, is a convex spheric surface. The length of the outline curve of the maximum effective half diameter position of the object-side surface of the second lens is denoted as ARS21, and the length of the outline curve of the maximum effective half diameter position of the image-side surface of the second lens is denoted as ARS22. The length of the outline curve of the half of the entrance pupil diameter (HEP) of the object-side surface of the second lens is denoted as ARE21. The length of the outline curve of the half of the entrance pupil diameter (HEP) of the image-side surface of the second lens is denoted as ARE22. A thickness of the second lens 120 on the optical axis is TP2.

A displacement in parallel with the optical axis from a point on the object-side surface of the second lens, through which the optical axis passes, to the inflection point on the object-side surface, which is the nearest to the optical axis is denoted by SGI211, and a displacement in parallel with the optical axis from a point on the image-side surface of the second lens, through which the optical axis passes, to the inflection point on the image-side surface, which is the nearest to the optical axis is denoted by SGI221.

A displacement perpendicular to the optical axis from a point on the object-side surface of the second lens, through which the optical axis passes, to the inflection point, which is the nearest to the optical axis is denoted by HIF211, and a displacement perpendicular to the optical axis from a point on the image-side surface of the second lens, through which the optical axis passes, to the inflection point, which is the nearest to the optical axis is denoted by HIF221.

The third lens 130 has positive refractive power and is made of glass. An object-side surface 132 thereof, which faces the object side, is a convex spheric surface, and an image-side surface 134 thereof, which faces the image side, is a convex spheric surface. The length of the outline curve of the maximum effective half diameter position of the object-side surface of the third lens is denoted as ARS31, and the length of the outline curve of the maximum effective half diameter position of the image-side surface of the third lens is denoted as ARS32. The length of the outline curve of the half of the entrance pupil diameter (HEP) of the object-side surface of the third lens is denoted as ARE31. The length of the outline curve of the half of the entrance pupil diameter (HEP) of the image-side surface of the third lens is denoted as ARE32. A thickness of the third lens 130 on the optical axis is TP3.

A displacement in parallel with the optical axis from a point on the object-side surface of the third lens, through which the optical axis passes, to the inflection point on the object-side surface, which is the nearest to the optical axis is denoted by SGI311, and a displacement in parallel with the optical axis from a point on the image-side surface of the third lens, through which the optical axis passes, to the inflection point on the image-side surface, which is the nearest to the optical axis is denoted by SGI321.

A displacement perpendicular to the optical axis from a point on the object-side surface of the third lens, through which the optical axis passes, to the inflection point, which is the nearest to the optical axis is denoted by HIF311, and a displacement perpendicular to the optical axis from a point on the image-side surface of the third lens, through which the optical axis passes, to the inflection point, which is the nearest to the optical axis is denoted by HIF321.

The fourth lens 140 has positive refractive power and is made of glass. An object-side surface 142 thereof, which faces the object side, is a convex spheric surface, and an image-side surface 144 thereof, which faces the image side, is a convex spheric surface. The length of the outline curve of the maximum effective half diameter position of the object-side surface of the fourth lens is denoted as ARS41, and the length of the outline curve of the maximum effective half diameter position of the image-side surface of the fourth lens is denoted as ARS42. The length of the outline curve of the half of the entrance pupil diameter (HEP) of the object-side surface of the fourth lens is denoted as ARE41. The length of the outline curve of the half of the entrance pupil diameter (HEP) of the image-side surface of the fourth lens is denoted as ARE42. A thickness of the fourth lens 140 on the optical axis is TP4.

A displacement in parallel with the optical axis from a point on the object-side surface of the fourth lens, through which the optical axis passes, to the inflection point on the object-side surface, which is the nearest to the optical axis is denoted by SGI411, and a displacement in parallel with the optical axis from a point on the image-side surface of the fourth lens, through which the optical axis passes, to the inflection point on the image-side surface, which is the nearest to the optical axis is denoted by SGI421.

A displacement in parallel with the optical axis from a point on the object-side surface of the fourth lens, through which the optical axis passes, to the inflection point on the object-side surface, which is the second nearest to the optical axis is denoted by SGI412, and a displacement in parallel with the optical axis from a point on the image-side surface of the fourth lens, through which the optical axis passes, to the inflection point on the image-side surface, which is the second nearest to the optical axis is denoted by SGI422.

A displacement perpendicular to the optical axis from a point on the object-side surface of the fourth lens, through which the optical axis passes, to the inflection point, which is the nearest to the optical axis is denoted by HIF411, and a displacement perpendicular to the optical axis from a point on the image-side surface of the fourth lens, through which the optical axis passes, to the inflection point, which is the nearest to the optical axis is denoted by HIF421.

A displacement perpendicular to the optical axis from a point on the object-side surface of the fourth lens, through which the optical axis passes, to the inflection point, which is the second nearest to the optical axis is denoted by HIF412, and a displacement perpendicular to the optical axis from a point on the image-side surface of the fourth lens, through which the optical axis passes, to the inflection point, which is the second nearest to the optical axis is denoted by HIF422.

The fifth lens 150 has negative refractive power and is made of glass. An object-side surface 152 thereof, which faces the object side, is a concave spheric surface, and an image-side surface 154 thereof, which faces the image side, is a convex spheric surface. The length of the outline curve of the maximum effective half diameter position of the object-side surface of the fifth lens is denoted as ARS51, and the length of the outline curve of the maximum effective half diameter position of the image-side surface of the fifth lens is denoted as ARS52. The length of the outline curve of the half of the entrance pupil diameter (HEP) of the object-side surface of the fifth lens is denoted as ARE51. The length of the outline curve of the half of the entrance pupil diameter (HEP) of the image-side surface of the fifth lens is denoted as ARE52. A thickness of the fifth lens 150 on the optical axis is TP5.

A displacement in parallel with the optical axis from a point on the object-side surface of the fifth lens, through which the optical axis passes, to the inflection point on the object-side surface, which is the nearest to the optical axis is denoted by SGI511, and a displacement in parallel with the optical axis from a point on the image-side surface of the fifth lens, through which the optical axis passes, to the inflection point on the image-side surface, which is the nearest to the optical axis is denoted by SGI521.

A displacement in parallel with the optical axis from a point on the object-side surface of the fifth lens, through which the optical axis passes, to the inflection point on the object-side surface, which is the second nearest to the optical axis is denoted by SGI512, and a displacement in parallel with the optical axis from a point on the image-side surface of the fifth lens, through which the optical axis passes, to the inflection point on the image-side surface, which is the second nearest to the optical axis is denoted by SGI522.

A displacement in parallel with the optical axis from a point on the object-side surface of the fifth lens, through which the optical axis passes, to the inflection point on the object-side surface, which is the third nearest to the optical axis is denoted by SGI513, and a displacement in parallel with the optical axis from a point on the image-side surface of the fifth lens, through which the optical axis passes, to the inflection point on the image-side surface, which is the third nearest to the optical axis is denoted by SGI523.

A displacement in parallel with the optical axis from a point on the object-side surface of the fifth lens, through which the optical axis passes, to the inflection point on the object-side surface, which is the fourth nearest to the optical axis is denoted by SGI514, and a displacement in parallel with the optical axis from a point on the image-side surface of the fifth lens, through which the optical axis passes, to the inflection point on the image-side surface, which is the fourth nearest to the optical axis is denoted by SGI524.

A displacement perpendicular to the optical axis from a point on the object-side surface of the fifth lens, through which the optical axis passes, to the inflection point, which is the nearest to the optical axis is denoted by HIF511, and a displacement perpendicular to the optical axis from a point on the image-side surface of the fifth lens, through which the optical axis passes, to the inflection point, which is the nearest to the optical axis is denoted by HIF521.

A displacement perpendicular to the optical axis from a point on the object-side surface of the fifth lens, through which the optical axis passes, to the inflection point, which is the second nearest to the optical axis is denoted by HIF512, and a displacement perpendicular to the optical axis from a point on the image-side surface of the fifth lens, through which the optical axis passes, to the inflection point, which is the second nearest to the optical axis is denoted by HIF522.

A displacement perpendicular to the optical axis from a point on the object-side surface of the fifth lens, through which the optical axis passes, to the inflection point, which is the third nearest to the optical axis is denoted by HIF513, and a displacement perpendicular to the optical axis from a point on the image-side surface of the fifth lens, through which the optical axis passes, to the inflection point, which is the third nearest to the optical axis is denoted by HIF523.

A displacement perpendicular to the optical axis from a point on the object-side surface of the fifth lens, through which the optical axis passes, to the inflection point, which is the fourth nearest to the optical axis is denoted by HIF514, and a displacement perpendicular to the optical axis from a point on the image-side surface of the fifth lens, through which the optical axis passes, to the inflection point, which is the fourth nearest to the optical axis is denoted by HIF524.

The sixth lens 160 has positive refractive power and is made of glass. An object-side surface 162 thereof, which faces the object side, is a convex spheric surface, and an image-side surface 164 thereof, which faces the image side, is a convex spheric surface. The length of the outline curve of the maximum effective half diameter position of the object-side surface of the sixth lens is denoted as ARS61, and the length of the outline curve of the maximum effective half diameter position of the image-side surface of the sixth lens is denoted as ARS62. The length of the outline curve of the half of the entrance pupil diameter (HEP) of the object-side surface of the sixth lens is denoted as ARE61. The length of the outline curve of the half of the entrance pupil diameter (HEP) of the image-side surface of the sixth lens is denoted as ARE62. A thickness of the sixth lens 160 on the optical axis is TP6.

A displacement in parallel with the optical axis from a point on the object-side surface of the sixth lens, through which the optical axis passes, to the inflection point on the object-side surface, which is the nearest to the optical axis is denoted by SGI611, and a displacement in parallel with the optical axis from a point on the image-side surface of the sixth lens, through which the optical axis passes, to the inflection point on the image-side surface, which is the nearest to the optical axis is denoted by SGI621.

A displacement in parallel with the optical axis from a point on the object-side surface of the sixth lens, through which the optical axis passes, to the inflection point on the object-side surface, which is the second nearest to the optical axis is denoted by SGI612, and a displacement in parallel with the optical axis from a point on the image-side surface of the sixth lens, through which the optical axis passes, to the inflection point on the image-side surface, which is the second nearest to the optical axis is denoted by SGI622.

A displacement perpendicular to the optical axis from a point on the object-side surface of the sixth lens, through which the optical axis passes, to the inflection point, which is the nearest to the optical axis is denoted by HIF611, and a displacement perpendicular to the optical axis from a point on the image-side surface of the sixth lens, through which the optical axis passes, to the inflection point, which is the nearest to the optical axis is denoted by HIF621.

A displacement perpendicular to the optical axis from a point on the object-side surface of the sixth lens, through which the optical axis passes, to the inflection point, which is the second nearest to the optical axis is denoted by HIF612, and a displacement perpendicular to the optical axis from a point on the image-side surface of the sixth lens, through which the optical axis passes, to the inflection point, which is the second nearest to the optical axis is denoted by HIF622.

A displacement perpendicular to the optical axis from a point on the object-side surface of the sixth lens, through which the optical axis passes, to the inflection point, which is the third nearest to the optical axis is denoted by HIF613, and a displacement perpendicular to the optical axis from a point on the image-side surface of the sixth lens, through which the optical axis passes, to the inflection point, which is the third nearest to the optical axis is denoted by HIF623.

A displacement perpendicular to the optical axis from a point on the object-side surface of the sixth lens, through which the optical axis passes, to the inflection point, which is the fourth nearest to the optical axis is denoted by HIF614, and a displacement perpendicular to the optical axis from a point on the image-side surface of the sixth lens, through which the optical axis passes, to the inflection point, which is the fourth nearest to the optical axis is denoted by HIF624.

The infrared rays filter 180 is made of glass and between the sixth lens 160 and the image plane 190. The infrared rays filter 180 gives no contribution to the focal length of the system.

The optical image capturing system 10 of the first embodiment has the following parameters, which are FST=3.378 mm; FST/HEP=2.8; HAF=68.56 degree; and tan(HAF)=2.5464, wherein FST is a focal length of the system at the standard temperature 25° C.; HAF is a half of the maximum field angle; and HEP is an entrance pupil diameter.

The parameters of the lenses of the first embodiment are f1=−8.46547 mm; |f/f1|=0.3990; f6=12.324 mm; and |f/f6|=0.2741, wherein f1 is a focal length of the first lens 110; and f6 is a focal length of the sixth lens 160.

The parameters of the lenses of the first embodiment further satisfies |f2|+|f3|+|f4|+|f5|=21.49854 mm; |f1|+|f6|=20.78947 mm, and |f2|+|f3|+|f4|+|f5|>|f1|+|f6|, wherein f2 is a focal length of the second lens 120, f3 is a focal length of the third lens 130, f4 is a focal length of the fourth lens 140, f5 is a focal length of the fifth lens 150, and f6 is a focal length of the sixth lens 160.

The optical image capturing system 10 of the first embodiment further satisfies: InTL+BHOS=HOS; HOS=24.501 mm; HOI=3.750 mm; HOS/HOI=6.5336; HOS/f=7.2529; InS=12.705 mm; and InS/HOS=0.59794, wherein InTL is a distance between the object-side surface 112 of the first lens 110 and the image-side surface 164 of the sixth lens 160 at the 25° C.; HOS is a distance between the object-side surface 112 of the first lens 110 and the image plane 190; InS is a distance between the aperture 100 and the image plane 190; HOI is a half of a diagonal of an effective sensing area of the image sensor 192; and BHOS is a distance between the image-side surface 164 of the sixth lens 160 and the image plane 190.

The optical image capturing system 10 of the first embodiment further satisfies: ΣTP=8.51129 mm, and ΣTP/InTL=0.44919, wherein ΣTP is a sum of the thicknesses of the lenses 110-160 with refractive power. It is helpful for the contrast of image and yield rate of manufacture and provides a suitable back focal length for installation of other elements.

The optical image capturing system 10 of the first embodiment further satisfies: |R1/R2|=2.67913, wherein R1 is a radius of curvature of the object-side surface 112 of the first lens 110, and R2 is a radius of curvature of the image-side surface 114 of the first lens 110. It provides the first lens with a suitable positive refractive power to reduce the increase rate of the spherical aberration.

The optical image capturing system 10 of the first embodiment further satisfies: (R11−R12)/(R11+R12)=−3.18219, wherein R11 is a radius of curvature of the object-side surface 162 of the sixth lens 160, and R12 is a radius of curvature of the image-side surface 164 of the sixth lens 160. It may modify the astigmatic field curvature.

The optical image capturing system 10 of the first embodiment further satisfies: IN12=2.906 mm, and IN12/f=0.86025, wherein IN12 is a distance on the optical axis between the first lens 110 and the second lens 120. It may correct chromatic aberration and improve the performance.

The optical image capturing system 10 of the first embodiment further satisfies: IN56=2.624 mm, and IN56/f=0.77665, wherein IN56 is a distance on the optical axis between the fifth lens 150 and the sixth lens 160. It may correct chromatic aberration and improve the performance.

The optical image capturing system 10 of the first embodiment further satisfies: TP1=1.247 mm; TP2=0.600 mm; and (TP1+IN12)/TP2=6.92102, wherein TP1 is a central thickness of the first lens 110 on the optical axis, and TP2 is a central thickness of the second lens 120 on the optical axis. It may control the sensitivity of manufacture of the system and improve the performance.

The optical image capturing system 10 of the first embodiment further satisfies: TP5=0.600 mm; TP6=1.630 mm; and (TP6+IN56)/TP5=7.08980, wherein TP5 is a central thickness of the fifth lens 150 on the optical axis, TP6 is a central thickness of the sixth lens 160 on the optical axis, and IN56 is a distance on the optical axis between the fifth lens 150 and the sixth lens 160. It may control the sensitivity of manufacture of the system and lower the total height of the system.

The optical image capturing system 10 of the first embodiment further satisfies: IN34=2.818 mm; IN45=0.001 mm; and TP4/(IN34+TP4+IN45)=0.43597, wherein TP4 is a central thickness of the fourth lens 140 on the optical axis; IN34 is a distance on the optical axis between the third lens 130 and the fourth lens 140; IN45 is a distance on the optical axis between the fourth lens 140 and the fifth lens 150. It may control the sensitivity of manufacture of the system and lower the total height of the system.

The optical image capturing system 10 of the first embodiment further satisfies: InRS51=−0.742 mm; InRS52=−0.426 mm; |InRS51|/TP5=1.23590, and |InRS52|/TP5=0.70997, wherein InRS51 is a displacement in parallel with the optical axis from a point on the object-side surface 152 of the fifth lens 150, through which the optical axis passes, to a point at the maximum effective semi diameter of the object-side surface 152 of the fifth lens 150; InRS52 is a displacement in parallel with the optical axis from a point on the image-side surface 154 of the fifth lens 150, through which the optical axis passes, to a point at the maximum effective semi diameter of the image-side surface 154 of the fifth lens 150; and TP5 is a central thickness of the fifth lens 150 on the optical axis. It is helpful for manufacturing and shaping of the lenses and is helpful to reduce the size.

The optical image capturing system 10 of the first embodiment further satisfies: HVT51=0 mm; HVT52=0 mm, wherein HVT51 is a distance perpendicular to the optical axis between the critical point on the object-side surface 152 of the fifth lens 150 and the optical axis; and HVT52 is a distance perpendicular to the optical axis between the critical point on the image-side surface 154 of the fifth lens 150 and the optical axis.

The optical image capturing system 10 of the first embodiment further satisfies: InRS61=0.567 mm; InRS62=−0.301 mm; |InRS61|/TP6=0.34788, and |InRS62|/TP6=0.18461, wherein InRS61 is a displacement in parallel with the optical axis from a point on the object-side surface 162 of the sixth lens 160, through which the optical axis passes, to a point at the maximum effective semi diameter of the object-side surface 162 of the sixth lens 160; InRS62 is a displacement in parallel with the optical axis from a point on the image-side surface 164 of the sixth lens 160, through which the optical axis passes, to a point at the maximum effective semi diameter of the image-side surface 164 of the fifth lens 160; and TP6 is a central thickness of the sixth lens 160 on the optical axis. It is helpful for manufacturing and shaping of the lenses and is helpful to reduce the size.

The optical image capturing system 10 of the first embodiment further satisfies: HVT61=0 mm; HVT62=0 mm, wherein HVT61 is a distance perpendicular to the optical axis between the critical point on the object-side surface 162 of the sixth lens 160 and the optical axis; and HVT62 is a distance perpendicular to the optical axis between the critical point on the image-side surface 164 of the sixth lens 160 and the optical axis.

The optical image capturing system 10 of the first embodiment further satisfies: NA6/NA2>1, wherein NA2 is an Abbe number of the second lens 120; NA3 is an Abbe number of the third lens 130; and NA6 is an Abbe number of the sixth lens 160. It may correct the aberration of the optical image capturing system.

The optical image capturing system 10 of the first embodiment further satisfies: TDT=−56.369%; ODT=39.020%, wherein TDT is TV distortion; and ODT is optical distortion.

The optical imaging lens assembly 101 of the first embodiment has the following parameters, which are FWT1=4.3079 mm; FWT2=4.3049 mm; and FWT1/FST=1.0012, wherein FWT1 is a focal length of system at 70° C. (that is a first working temperature WT1), and FWT2 is a focal length of the system at 50° C. (that is, the second working temperature WT2).

The optical imaging lens assembly 101 of the first embodiment has the following parameters, which are: BHOS=5.5529 mm; BHOS1=5.5639 mm; |BHOS1−BHOS|=0.011 mm, and |BHOS1−BHOS|/BHOS=0.002, wherein BHOS is a distance on the optical axis between the image plane and the object-side surface of the lens, which is nearest to the image plane at 25° C., and BHOS1 is a distance on the optical axis between the image plane and the object-side surface of the lens, which is nearest to the image plane, at the first working temperature of 70° C.

The optical imaging lens assembly 101 of the first embodiment has the following parameters, which are: BHOS=5.5529 mm; BHOS2=5.5589 mm; and |BHOS2−BHOS|=0.006 mm, wherein BHOS is a distance on the optical axis between the object-side surface of the lens, which is nearest to the image plane, and the image plane at 25° C., and BHOS2 is a distance on the optical axis between the object-side surface of the lens, which is nearest to the image plane, and the image plane at the second working temperature of 50° C.

The first positioning member PE1 is made of aluminum, and the second positioning member PE2 are made of polycarbonate (PC), and the optical image capturing system of the first embodiment has the following parameters, which are: LPE1=10.195 mm, LPE2=18.121 mm, wherein LPE1 is a length of an outer wall of the first positioning element PE1 in parallel with the optical axis at 25° C., and LPE2 is a length of an outer wall of the second positioning element PE2 in parallel with the optical axis at 25° C. The optical imaging lens assembly 101 includes two spacers, the spacer SP1 is disposed between the second lens 120 and the third lens 130, and the spacer SP2 is disposed between the third lens 130 and the fourth lens 140. These spacers are made of polycarbonate (PC). A length (thickness) of the outermost side of the spacer SP1 in parallel with the optical axis is 1.797 mm, and a length (thickness) of the outermost side of the spacer SP2 in parallel with the optical axis is 3.243 mm.

The optical image capturing system of the first embodiment further satisfies: DL=α*(70° C.−25° C.)=0.013 mm; |BHOS1−BHOS|/α=45.7187; and |BHOS1−BHOS|/DL=1.016, wherein CES1 is a thermal expansion coefficient of the material of the first positioning element PE1, α is the product of LPE1 and CES1, and DL is a thermal expansion length variation of the first positioning element PE1 at the first working temperature of 70° C.

Please refer to FIG. 1D. For the optical image capturing system of the first embodiment, the values of MTF in the spatial frequency of 55 cycles/mm at the optical axis, 0.3 field of view, and 0.7 field of view of visible light on an image plane are respectively denoted by MTFE0, MTFE3, and MTFE7, wherein MTFE0 is around 0.87, MTFE3 is around 0.86, and MTEF7 is around 0.83; the values of MTF in the spatial frequency of 110 cycles/mm at the optical axis, 0.3 field of view, and 0.7 field of view of visible light on an image plane are respectively denoted by MTFQ0, MTFQ3, and MTFQ7, wherein MTFQ0 is around 0.71, MTFQ3 is around 0.69, and MTFQ7 is around 0.51; the values of modulation transfer function (MTF) in the spatial frequency of 220 cycles/mm at the optical axis, 0.3 field of view, and 0.7 field of view on an image plane are respectively denoted by MTFH0, MTFH3, and MTFH7, wherein MTFH0 is around 0.47, MTFH3 is around 0.42, and MTFH7 is around 0.15.

The parameters of the lenses of the first embodiment are listed in Table 1 and Table 2.

TABLE 1

The parameters of the lenses of the first embodiment
FST = 3.378 mm; FST/HEP = 2.8; HAF = 68.560 deg

| Surface | | Radius of curvature | Thickness (mm) | Material | Refractive index | Abbe number | Focal length |
|---|---|---|---|---|---|---|---|
| 0 | Object plane | 1E+18 | 900 | | | | |
| 1 | 1$^{th}$ lens | 10.5170497 | 1.247 | Glass | 1.805 | 39.64 | −8.46547 |
| 2 | | 3.925528666 | 2.906 | | | | |
| 3 | 2$^{nd}$ lens | −12.87132476 | 0.600 | Glass | 1.569 | 56.04 | −5.46599 |
| 4 | | 4.186848152 | 2.088 | | | | |
| 5 | 3$^{rd}$ lens | 6.607401075 | 2.255 | Glass | 1.904 | 31.32 | 6.10851 |
| 6 | | −29.10483772 | 2.700 | | | | |
| 7 | Aperture plane | 1E+18 | 0.118 | | | | |
| 8 | 4$^{th}$ lens | 48.32271258 | 2.179 | Glass | 1.606 | 63.71 | 4.01947 |
| 9 | | −2.530087311 | 0.001 | | | | |
| 10 | 5$^{th}$ lens | −2.530087311 | 0.600 | Glass | 1.847 | 23.83 | −5.90457 |
| 11 | | −5.638676831 | 2.624 | | | | |
| 12 | 6$^{th}$ ens | 11.18706538 | 1.630 | Glass | 1.606 | 63.71 | 12.324 |
| 13 | | −21.44019214 | 0.576 | | | | |
| 14 | Infrared rays filter plane | 1E+18 | 0.800 | | 1.517 | 64.13 | |
| 15 | | 1E+18 | 4.176 | | | | |

TABLE 1-continued

The parameters of the lenses of the first embodiment
FST = 3.378 mm; FST/HEP = 2.8; HAF = 68.560 deg

| | 16 | Image plane | 1E+18 | 0.000 | | | |

Reference wavelength (d-line): 555 nm; shield position: the clear aperture of the sixth surface is 2.400 mm; the clear aperture of the eleventh surface is 2.15 mm; the clear aperture of the twelfth surface is 3.560 mm
Values of refractive index of each lens relative to air in different working temperature ranges: dn/dt ($10^{-6}$/° C., Reference wavelength: d-line)

| Lens number | Material code | Temperature (° C.) | | | | | |
|---|---|---|---|---|---|---|---|
| | | −40° C.~−20° C. | −20° C.~0° C. | 0° C.~20° C. | 20° C.~40° C. | 40° C.~60° C. | 60° C.~80° C. |
| $1^{st}$ lens | H-ZLaF51 | 7.6 | 8.1 | 8.6 | 8.6 | 8.8 | 9.2 |
| $2^{nd}$ lens | H-BaK7 | 2.4 | 2.7 | 2.8 | 2.8 | 2.9 | 2.9 |
| $3^{rd}$ lens | H-ZLaF75A | 1.5 | 2.3 | 2.5 | 2.6 | 2.6 | 3.0 |
| $4^{th}$ lens | LBC3N | −7.9 | −8.1 | −8.2 | −8.2 | −8.2 | −8.1 |
| $5^{th}$ lens | ZF52 | 8.8 | 8.8 | 10.0 | 10.2 | 10.3 | 10.6 |
| $6^{th}$ lens | LBC3N | −7.9 | −8.1 | −8.2 | −8.2 | −8.2 | −8.1 |

TABLE 2

Coefficients of the aspheric surfaces
Table 2: Coefficients of the aspheric surfaces

| | Surface | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 | 0.000000E+00 | 0.000000E+00 |

| | Surface | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 |

Values related to the lengths of the outline curves of the first embodiment based on Table 1 and Table 2 are listed in the following table:

| First embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.604 | 0.603 | −0.00042 | 99.93% | 1.247 | 48.40% |
| 12 | 0.604 | 0.605 | 0.00165 | 100.27% | 1.247 | 48.56% |
| 21 | 0.604 | 0.603 | −0.00053 | 99.91% | 0.600 | 100.54% |
| 22 | 0.604 | 0.605 | 0.00136 | 100.22% | 0.600 | 100.85% |
| 31 | 0.604 | 0.604 | 0.00009 | 100.02% | 2.255 | 26.77% |
| 32 | 0.604 | 0.603 | −0.00070 | 99.88% | 2.255 | 26.74% |
| 41 | 0.604 | 0.603 | −0.00073 | 99.88% | 2.179 | 27.67% |
| 42 | 0.604 | 0.609 | 0.00511 | 100.85% | 2.179 | 27.94% |
| 51 | 0.604 | 0.609 | 0.00511 | 100.85% | 0.600 | 101.48% |
| 52 | 0.604 | 0.604 | 0.00041 | 100.07% | 0.600 | 100.69% |
| 61 | 0.604 | 0.603 | −0.00046 | 99.92% | 1.630 | 37.01% |

-continued

First embodiment (Reference wavelength: 555 nm)

| 62 | 0.604 | 0.603 | −0.00067 | 99.89% | 1.630 | 36.99% |

| ARS | EHD | ARS value | ARS − EHD | (ARS/EHD) % | TP | ARS/TP (%) |
| --- | --- | --- | --- | --- | --- | --- |
| 11 | 5.876 | 6.234 | 0.358 | 106.09% | 1.247 | 500.05% |
| 12 | 3.583 | 4.514 | 0.931 | 125.98% | 1.247 | 362.12% |
| 21 | 3.498 | 3.542 | 0.044 | 101.25% | 0.600 | 590.25% |
| 22 | 2.853 | 3.139 | 0.286 | 110.01% | 0.600 | 523.15% |
| 31 | 2.908 | 3.010 | 0.102 | 103.51% | 2.255 | 133.47% |
| 32 | 2.400 | 2.402 | 0.002 | 100.07% | 2.255 | 106.49% |
| 41 | 1.512 | 1.512 | 0.000 | 100.02% | 2.179 | 69.40% |
| 42 | 1.862 | 2.093 | 0.230 | 112.36% | 2.179 | 96.03% |
| 51 | 1.862 | 2.093 | 0.230 | 112.38% | 0.600 | 348.76% |
| 52 | 2.150 | 2.205 | 0.055 | 102.55% | 0.600 | 367.46% |
| 61 | 3.560 | 3.623 | 0.063 | 101.77% | 1.630 | 222.23% |
| 62 | 3.496 | 3.511 | 0.015 | 100.42% | 1.630 | 215.34% |

Figure 2A:
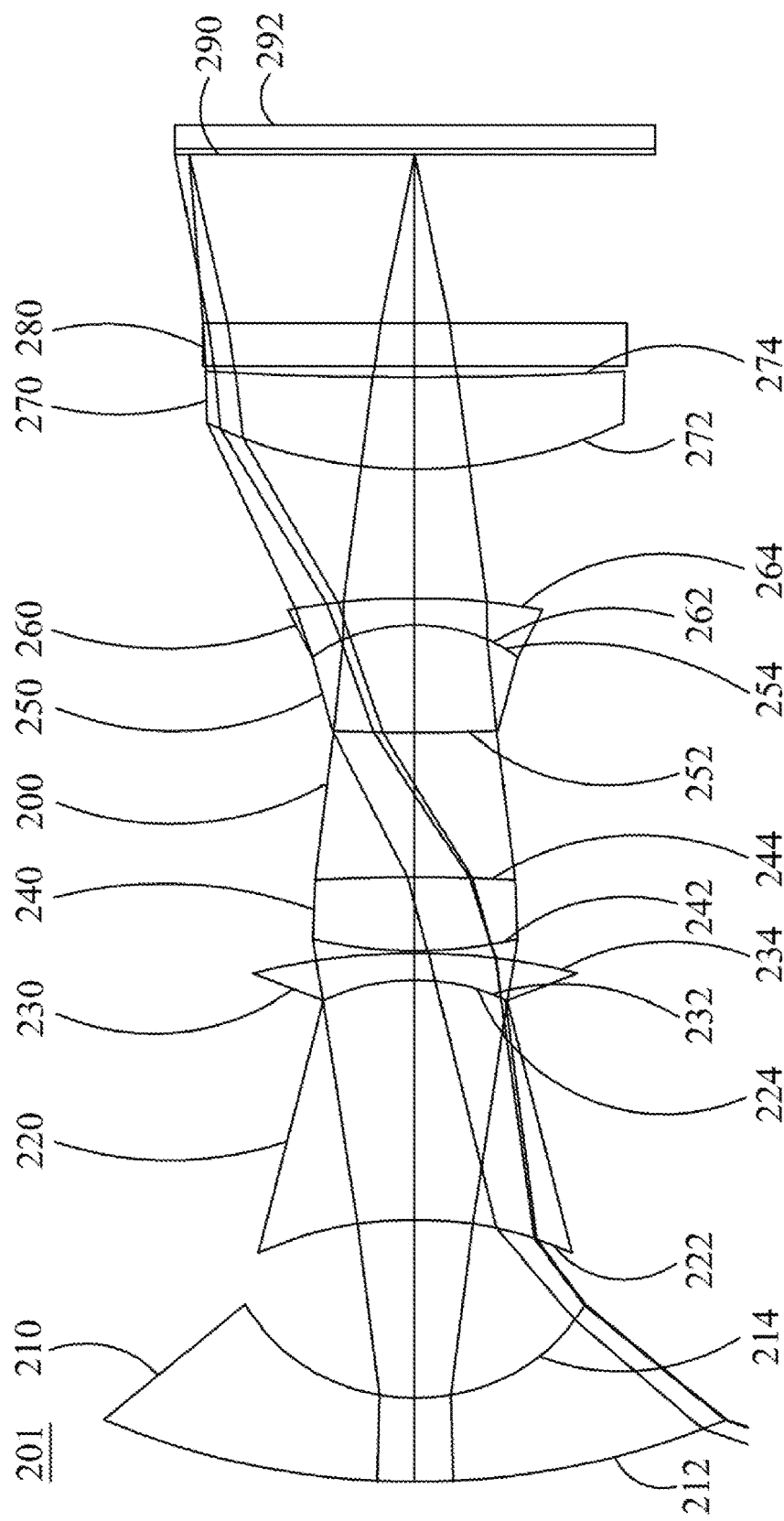
FIG. 2A is a schematic diagram of an optical imaging lens assembly of an optical image capturing system of a second embodiment of the present invention.
Figure 2B:
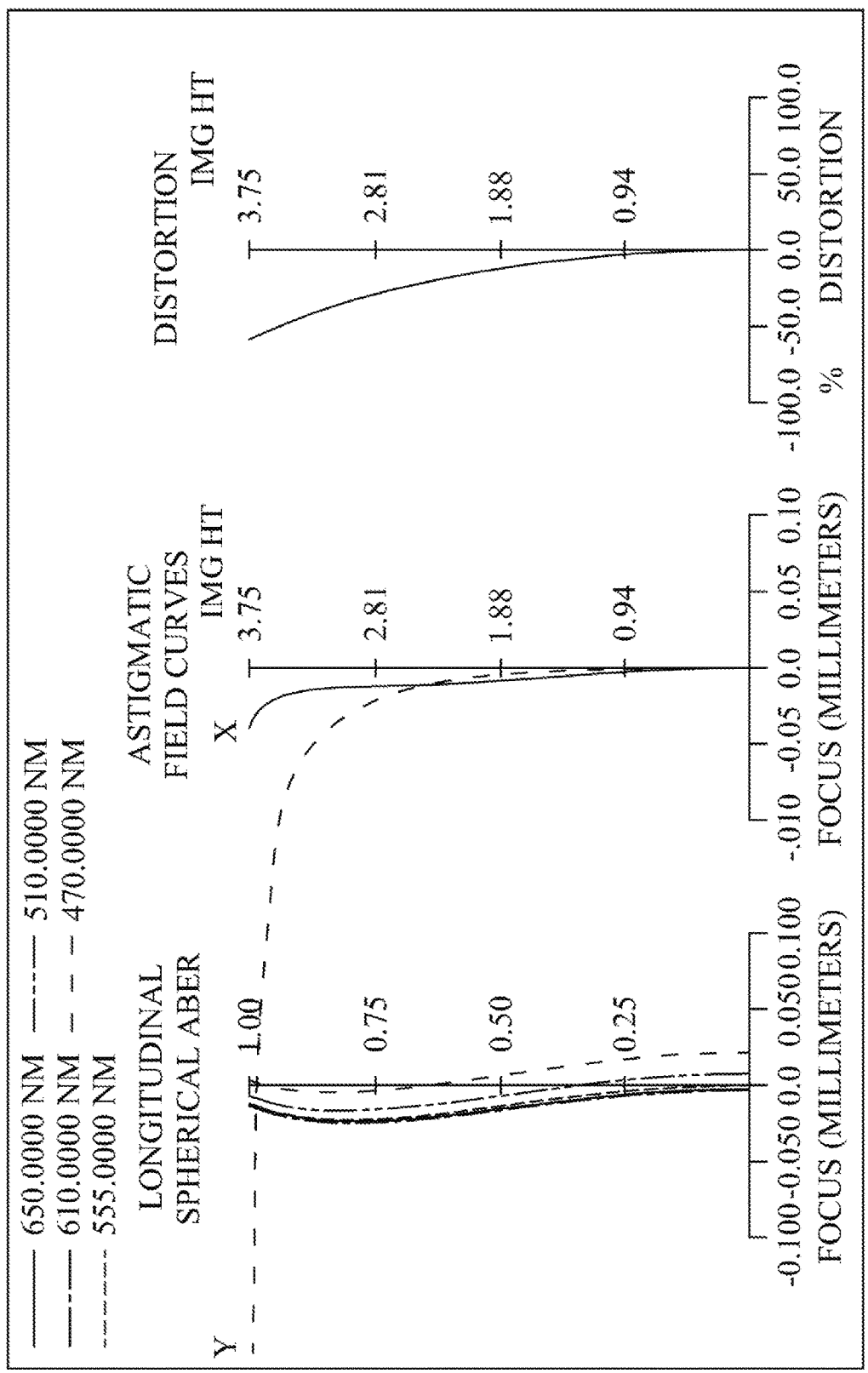
FIG. 2B shows curve diagrams of longitudinal spherical aberration, astigmatic field, and optical distortion of the optical image capturing system in the order from left to right, in accordance with the second embodiment of the present application.
Figure 2C:
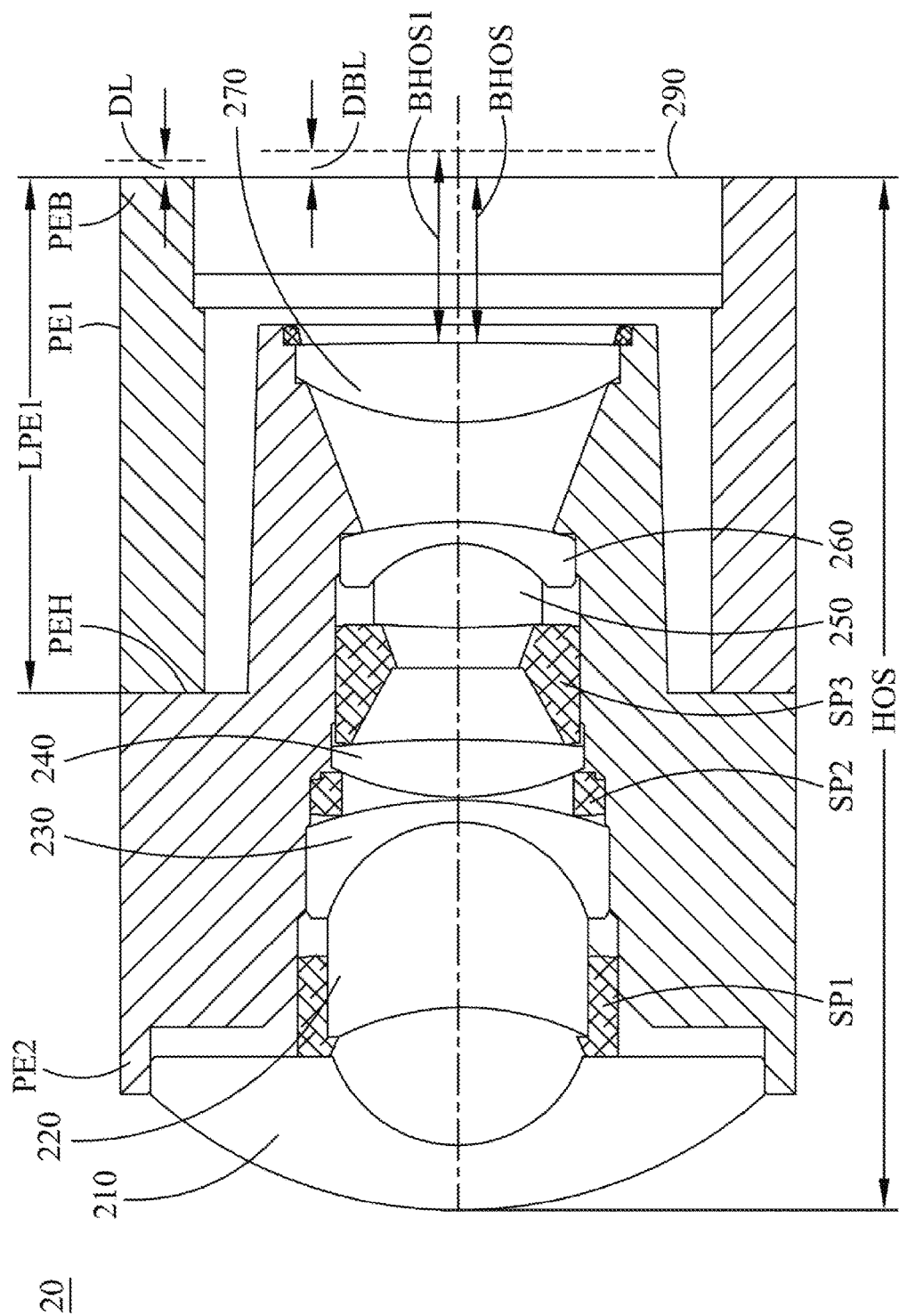
FIG. 2C is a schematic diagram of an assembly of a first positioning element and the optical imaging lens assembly of the second embodiment of the present invention.
Figure 2D:
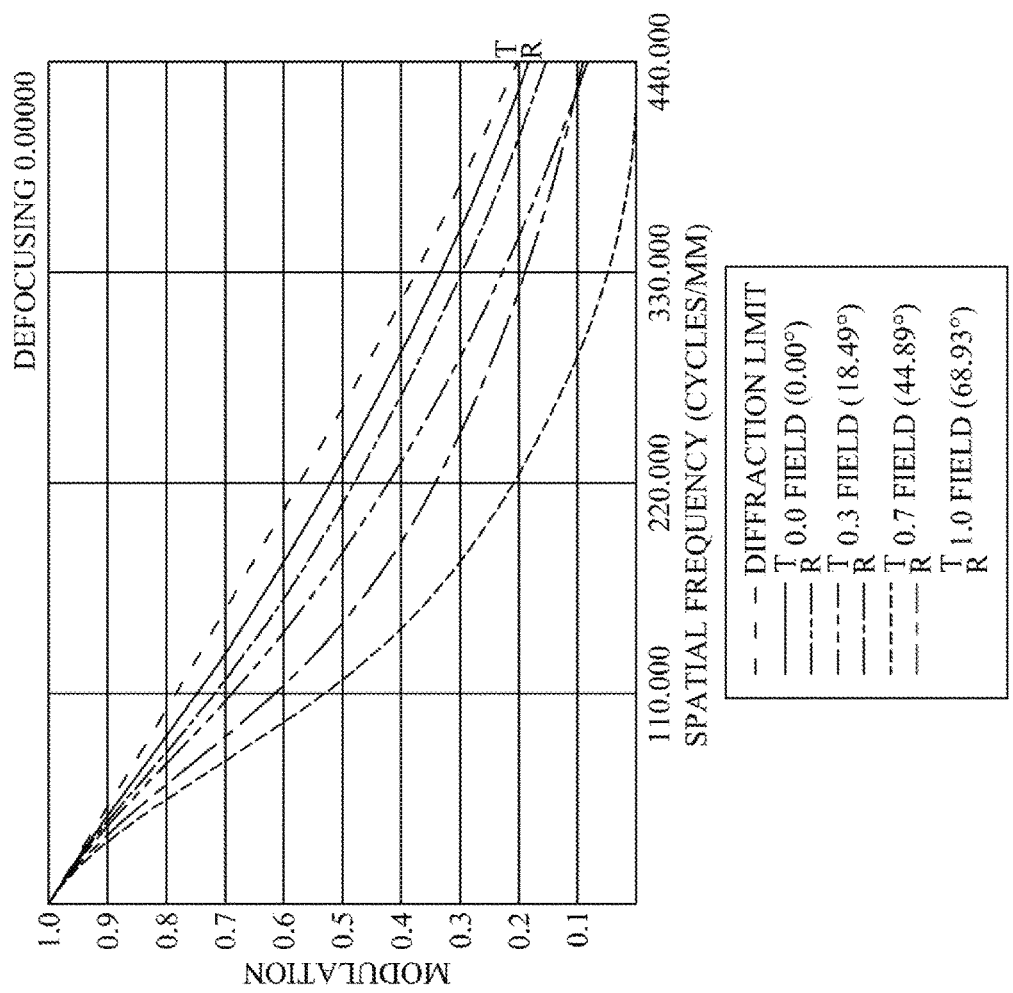
FIG. 2D shows a feature map of modulation transformation of the optical image capturing system of the second embodiment of the present invention in visible spectrum.

The detail parameters of the first embodiment are listed in Table 1, in which the unit of the radius of curvature, thickness, and focal length are millimeter, and surface 0-16 indicates the surfaces of all elements in the system in sequence from the object side to the image side. Table 2 is the list of coefficients of the aspheric surfaces, in which A1-A20 indicate the coefficients of aspheric surfaces from the first order to the twentieth order of each aspheric surface. The following embodiments have the similar diagrams and tables, which are the same as those of the first embodiment, so we do not describe it again. Further, definitions of parameters of structure element of other embodiments described below are the same as that of the first embodiment Second Embodiment The following refers to FIGS. 2A through 2D. FIG. 2A is a schematic diagram of a second embodiment of an optical imaging lens assembly of an optical image capturing system of the present invention; FIG. 2B shows curve diagrams of longitudinal spherical aberration, astigmatic field, and optical distortion of the optical image capturing system in the order from left to right of the second embodiment of the present application; FIG. 2C is a schematic diagram of an assembly of a first positioning element and the optical imaging lens assembly of the second embodiment of the present invention; and FIG. 2D shows a feature map of modulation transformation of the optical image capturing system of the second embodiment of the present invention in visible spectrum. As shown in FIG. 2A, The optical imaging lens assembly 201 of the second embodiment includes, along an optical axis from an object side to an image side, a first lens 210, a second lens 220, a third lens 230, a fourth lens 240, an aperture 200, a fifth lens 250, a sixth lens 260, a seventh lens 270, an infrared rays filter 280, an image plane 290, and an image sensor 292.

The first lens 210 has negative refractive power and is made of glass. An object-side surface 212 thereof, which faces the object side, is a convex spheric surface, and an image-side surface 214 thereof, which faces the image side, is a concave spheric surface.

The second lens 220 has positive refractive power and is made of glass. An object-side surface 222 thereof, which faces the object side, is a concave spheric surface, and an image-side surface 224 thereof, which faces the image side, is a convex spheric surface.

The third lens 230 has negative refractive power and is made of glass. An object-side surface 232 thereof, which faces the object side, is a concave spheric surface, and an image-side surface 234 thereof, which faces the image side, is a convex spheric surface.

The fourth lens 240 has positive refractive power and is made of glass. An object-side surface 242 thereof, which faces the object side, is a convex spheric surface, and an image-side surface 244 thereof, which faces the image side, is a convex spheric surface.

The fifth lens 250 has positive refractive power and is made of glass. An object-side surface 252 thereof, which faces the object side, is a convex spheric surface, and an image-side surface 254 thereof, which faces the image side, is a convex spheric surface.

The sixth lens 260 has negative refractive power and is made of glass. An object-side surface 262 thereof, which faces the object side, is a concave spheric surface, and an image-side surface 264 thereof, which faces the image side, is a convex spheric surface. As a result, the incident angle of each view field entering the sixth lens 260 can be effectively adjusted to improve aberration.

The seventh lens 270 has positive refractive power and is made of glass. An object-side surface 272 thereof, which faces the object side, is a convex spheric surface, and an image-side surface 274 thereof, which faces the image side, is a concave spheric surface.

The infrared rays filter 280 is made of glass and between the seventh lens 270 and the image plane 290. The infrared rays filter 280 gives no contribution to the focal length of the system.

The optical imaging lens assembly 201 of the second embodiment has the following parameters, which are FWT1=3.5210 mm; FWT2=3.5170 mm; and FWT1/FST=1.0023, wherein FWT1 is a focal length of the system at the first working temperature of 70° C., and FWT2 is a focal length of the system at the second working temperature of 50° C.

The optical imaging lens assembly 201 of the second embodiment has the following parameters, which are: BHOS=4.1160 mm; BHOS1=4.1290 mm; |BHOS1−BHOS|=0.013 mm; and |BHOS1−BHOS|/BHOS=0.032, wherein BHOS is a distance on the optical axis between the image plane and the object-side surface of the lens, which is nearest to the image plane, at 25° C., and BHOS1 is a distance on the optical axis between the image plane and the object-side surface of the lens, which is nearest to the image plane, at the first working temperature of 70° C.

The optical imaging lens assembly 201 of the second embodiment has the following parameters, which are:

BHOS=4.1160 mm; BHOS2=4.1230 mm; and |BHOS2−BHOS|=0.007 mm, wherein BHOS is a distance on the optical axis between the image plane and the object-side surface of the lens, which is nearest to the image plane at 25° C., and BHOS2 is a distance on the optical axis between the image plane and the object-side surface of the lens, which is nearest to the image plane, at the second working temperature of 50° C.

The first positioning member PE1 is made of aluminum, and the second positioning member PE2 is made of polycarbonate (PC), and the optical image capturing system of the second embodiment has the following parameters, which are: LPE1=12.260 mm, LPE2=18.3780 mm, wherein LPE1 is a length of an outer wall of the first positioning element PE1 in parallel with the optical axis at 25° C., and LPE2 is a length of an outer wall of the second positioning element PE2 in parallel with the optical axis at 25° C. The optical imaging lens assembly 201 includes three spacers, the spacer SP1 is disposed between the first lens 210 and the second lens 220, the spacer SP2 is a spacer disposed between the third lens 230 and the fourth lens 240, and the spacer SP3 is disposed between the fourth lens 240 and the fifth lens 250. These spacers are made of polycarbonate (PC). A length (thickness) of the outermost side of the spacer SP1 in parallel with the optical axis is 0.467 mm, a length (thickness) of the outermost side of the spacer SP2 in parallel with the optical axis is 1.026 mm, and a length (thickness) of the outermost side of the spacer SP3 in parallel with the optical axis is 2.813 mm.

The optical image capturing system of the second embodiment further satisfies: DL=α*(70° C.−25° C.)=0.013 mm; |BHOS1−BHOS|/α=44.9305; and |BHOS1−BHOS|/DL=0.9985, wherein CES1 is a thermal expansion coefficient of the material of the first positioning element PE1, α is the product of LPE1 and CES1, and DL is a thermal expansion length variation of the first positioning element PE1 at the first working temperature of 70° C.

The parameters of the lenses of the second embodiment are listed in Table 3 and Table 4.

TABLE 3

The parameters of the lenses of the second embodiment
FST = 3.5130 mm; FST/REP = 2.8; HAF = 68.9333 deg

| surfaces # | | Radius of curvature | Thickness (mm) | Material | Refractive index | Abbe number | Focal length (mm) |
|---|---|---|---|---|---|---|---|
| 0 | Object plane | 1E+18 | 900 | | | | |
| 1 | 1st lens | 12.19512195 | 1.551 | glass | 1.805 | 39.64 | −5.69745 |
| 2 | | 3.152498061 | 3.292 | | | | |
| 3 | 2nd lens | −5.773457526 | 4.433 | glass | 1.774 | 49.60 | 5.34467 |
| 4 | | −3.225806452 | 0.001 | | | | |
| 5 | 3rd lens | −3.225806452 | 0.500 | glass | 1.850 | 30.06 | −5.76014 |
| 6 | | −10.01282667 | 0.050 | | | | |
| 7 | 4th lens | 6.72775582 | 1.361 | glass | 1.785 | 25.75 | 6.99192 |
| 8 | | −28.14619553 | 1.707 | | | | |
| 9 | Aperture plane | 1E+18 | 0.967 | | | | |
| 10 | 5th lens | 26.41277547 | 1.994 | glass | 1.593 | 68.53 | 4.27047 |
| 11 | | −2.729160204 | 0.001 | | | | |
| 12 | 6th lens | −2.729160204 | 0.500 | glass | 1.847 | 23.83 | −4.50628 |
| 13 | | −10.20324778 | 2.388 | | | | |
| 14 | 7th lens | 7.422008342 | 1.700 | glass | 1.593 | 68.53 | 14.2276 |
| 15 | | 55.47710412 | 0.207 | | | | |
| 16 | Infrared rays filter plane | 1E+18 | 0.800 | BK_7 | 1.517 | 64.2 | |
| 17 | | 1E+18 | 1.494 | | | | |
| 18 | | 1E+18 | 1.615 | | | | |
| 19 | Image plane | 1E+18 | 0.000 | | | | |

Reference wavelength (d-line): 555 nm; shield position: the clear aperture of the third surface is 2.595 mm; the clear aperture of the sixth surface is 2.690 mm; the clear aperture of the eleventh surface is 1.702 mm; and clear aperture of the twelfth surface is 1.702 mm
Values of refractive index of each lens relative to air in different working temperature ranges: dn/dt (unit: $10^{-6}$/° C., Reference wavelength: d-line)

| Lens number | Material code | Temperature (° C.) | | | | | |
|---|---|---|---|---|---|---|---|
| | | −40° C.~−20° C. | −20° C.~0° C. | 0° C.~20° C. | 20° C.~40° C. | 40° C.~60° C. | 60° C.~80° C. |
| 1st lens | H-ZLaF51 | 7.6 | 8.1 | 8.6 | 8.6 | 8.8 | 9.2 |
| 2nd lens | D-LaF50 | 3.4 | 3.4 | 3.4 | 3.8 | 3.8 | 4.0 |
| 3rd lens | H-ZLaF76 | 2.4 | 2.7 | 3.2 | 3.3 | 3.4 | 3.7 |
| 4th lens | H-ZF13 | 0.5 | 0.8 | 0.6 | 1.0 | 1.4 | 2.1 |
| 5th lens | H-ZPK5 | −7.1 | −7.3 | −7.3 | −7.4 | −7.5 | −7.4 |
| 6th lens | ZF52 | 8.8 | 8.8 | 10.0 | 10.2 | 10.3 | 10.6 |
| 7th lens | H-ZPK5 | −7.1 | −7.3 | −7.3 | −7.4 | −7.5 | −7.4 |

TABLE 4

Coefficients of the aspheric surfaces of the second embodiment
TABLE 4 Coefficients of the aspheric surfaces

| 表面 | | | | | | | |
|---|---|---|---|---|---|---|---|
| | 1 | 2 | 3 | 4 | 5 | 6 | 8 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

| 表面 | | | | | | | |
|---|---|---|---|---|---|---|---|
| | 9 | 10 | 11 | 12 | 13 | 14 | 15 |
| k | 0.000000E+00 | 0.000000E+00 | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 | 0.000000E+00 | 0.000000E+00 |

An equation of the aspheric surfaces of the second embodiment is the same as that of the first embodiment, and the definitions are the same as well.

The exact parameters of the second embodiment based on Table 3 and Table 4 are listed in the following table:

| Second embodiment (Reference wavelength: 555 nm) | | | | | |
|---|---|---|---|---|---|
| |FST/f1| | |FST/f2| | |FST/f3| | |FST/f4| | |FST/f5| | |FST/f6| |
| 0.6166 | 0.6573 | 0.6099 | 0.5024 | 0.8226 | 0.7796 |
| |FST/f7| | ΣPPR | ΣNPR | ΣPPR/|ΣNPR| | IN12/f | IN67/f |
| 0.2469 | 2.5085 | 1.7268 | 1.4527 | 0.9371 | 0.6798 |
| |f1/f2| | |f2/f3| | (TP1 + IN12)/TP2 | | (TP7 + IN67)/TP6 | |
| 1.0660 | 0.9279 | 1.0926 | | 8.1767 | |

-continued

| Second embodiment (Reference wavelength: 555 nm) | | | | | |
|---|---|---|---|---|---|
| HOS | InTL | HOS/HOI | InS/HOS | ODT % | TDT % |
| 24.5608 | 20.4450 | 6.5495 | 0.4750 | −58.8560 | 41.0165 |
| HVT11 | HVT12 | HVT21 | HVT22 | HVT31 | HVT32 |
| 0.0000 | 0.0000 | 0.0000 | 0.0000 | 0.0000 | 0.0000 |
| HVT61 | HVT62 | HVT71 | HVT72 | HVT72/HOI | HVT72/HOS |
| 0.0000 | 0.0000 | 0.0000 | 0.0000 | 0.0000 | 0.0000 |

Values related to the lengths of the outline curves of the second embodiment based on Table 3 and Table 4 are listed in the following table:

| Second embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.628 | 0.628 | 0.000263 | 100.04% | 1.551 | 40.50% |
| 12 | 0.628 | 0.632 | 0.004215 | 100.67% | 1.551 | 40.76% |
| 21 | 0.628 | 0.629 | 0.001230 | 100.20% | 4.433 | 14.20% |
| 22 | 0.628 | 0.632 | 0.004022 | 100.64% | 4.433 | 14.26% |
| 31 | 0.628 | 0.632 | 0.004022 | 100.64% | 0.500 | 126.41% |
| 32 | 0.628 | 0.628 | 0.000398 | 100.06% | 0.500 | 125.68% |
| 41 | 0.628 | 0.629 | 0.000901 | 100.14% | 1.361 | 46.20% |
| 42 | 0.628 | 0.628 | 0.000038 | 100.01% | 1.361 | 46.13% |
| 51 | 0.628 | 0.628 | 0.000045 | 100.01% | 1.994 | 31.49% |
| 52 | 0.628 | 0.634 | 0.005664 | 100.90% | 1.994 | 31.77% |
| 61 | 0.628 | 0.634 | 0.005664 | 100.90% | 0.500 | 126.74% |
| 62 | 0.628 | 0.628 | 0.000383 | 100.06% | 0.500 | 125.68% |
| 71 | 0.628 | 0.629 | 0.000737 | 100.12% | 1.700 | 36.98% |
| 72 | 0.628 | 0.628 | −0.000001 | 100.00% | 1.700 | 36.93% |
| ARS | EHD | ARS value | ARS − EHD | (ARS/EHD) % | TP | ARS/TP (%) |
| 11 | 5.162 | 5.330 | 0.167594 | 103.25% | 1.551 | 343.60% |
| 12 | 2.817 | 3.484 | 0.667089 | 123.68% | 1.551 | 224.62% |
| 21 | 2.595 | 2.690 | 0.095309 | 103.67% | 4.433 | 60.69% |
| 22 | 1.528 | 1.591 | 0.062729 | 104.11% | 4.433 | 35.89% |
| 31 | 1.520 | 1.583 | 0.062351 | 104.10% | 0.500 | 316.55% |
| 32 | 2.690 | 2.722 | 0.032419 | 101.21% | 0.500 | 544.48% |
| 41 | 1.692 | 1.710 | 0.017941 | 101.06% | 1.361 | 125.63% |

-continued

| Second embodiment (Reference wavelength: 555 nm) | | | | | | |
|---|---|---|---|---|---|---|
| 42 | 1.652 | 1.653 | 0.000876 | 100.05% | 1.361 | 121.41% |
| 51 | 1.364 | 1.364 | 0.000053 | 100.00% | 1.994 | 68.37% |
| 52 | 1.702 | 1.838 | 0.135719 | 107.97% | 1.994 | 92.14% |
| 61 | 1.702 | 1.838 | 0.135719 | 107.97% | 0.500 | 367.55% |
| 62 | 2.110 | 2.124 | 0.014314 | 100.68% | 0.500 | 424.86% |
| 71 | 3.445 | 3.581 | 0.136371 | 103.96% | 1.700 | 210.63% |
| 72 | 3.468 | 3.469 | 0.001296 | 100.04% | 1.700 | 204.03% |

The results of the equations of the second embodiment based on Table 3 and Table 4 are listed in the following table:

| Values related to the inflection points of the second embodiment (Reference wavelength: 555 nm) | | | | | |
|---|---|---|---|---|---|
| HIF111 | 0 | HIF111/HOI | SGI111 | 0 | \|GI111/\|/(I111/HOI + TP1) | 0 |

Third Embodiment

Figure 3A:
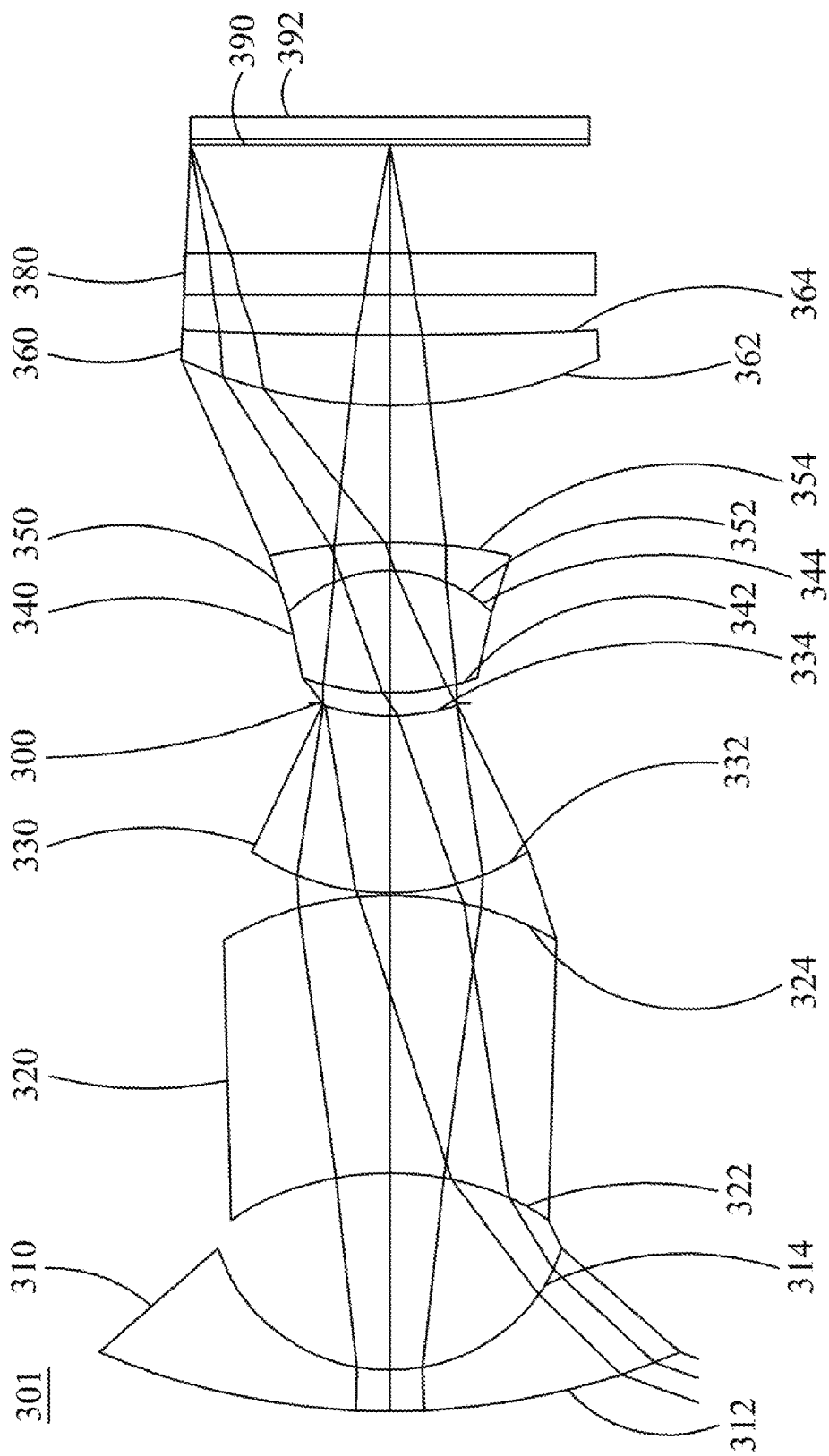
FIG. 3A is a schematic diagram of an optical imaging lens assembly of an optical image capturing system of a third embodiment of the present invention.
Figure 3B:
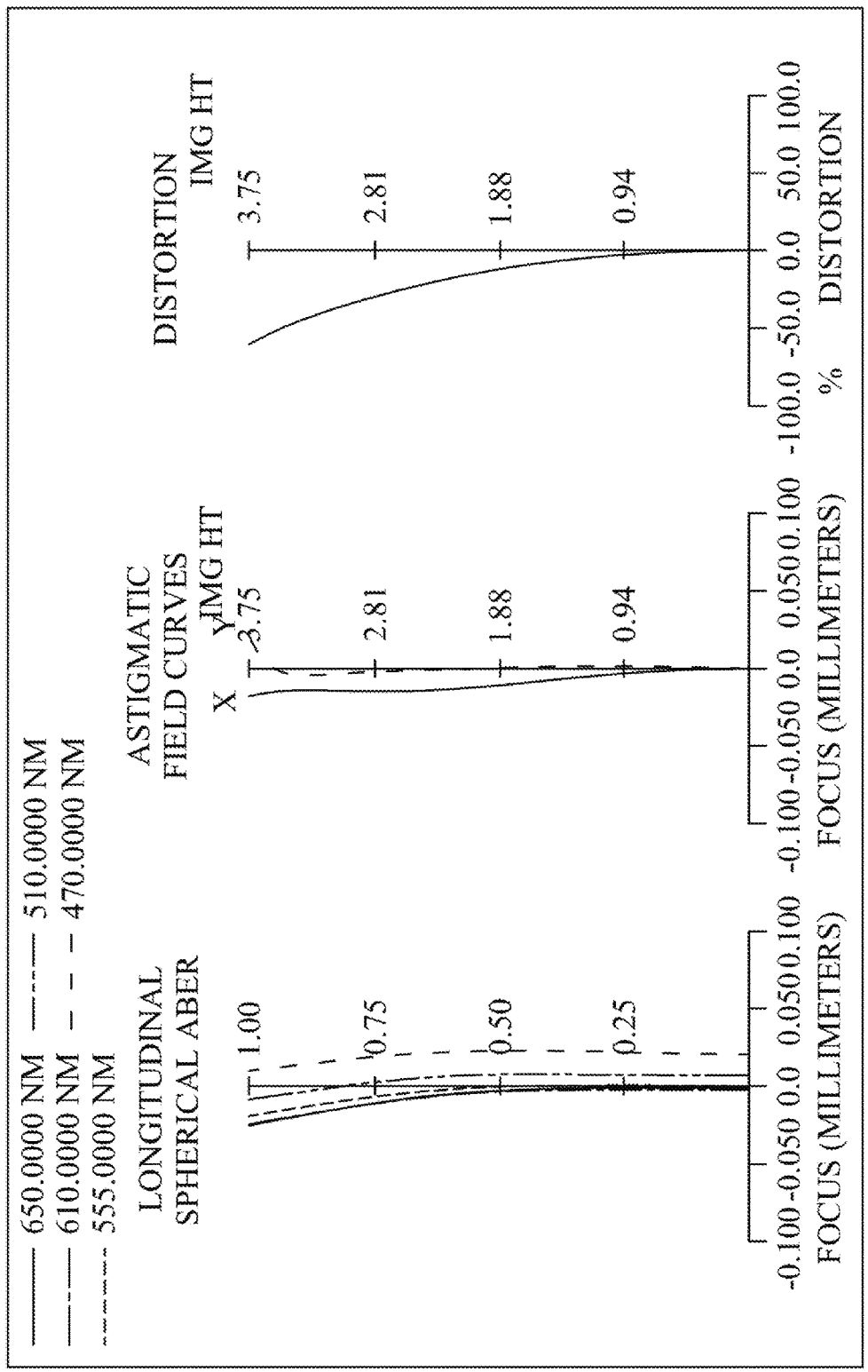
FIG. 3B shows curve diagrams of longitudinal spherical aberration, astigmatic field, and optical distortion of the optical image capturing system in the order from left to right of the third embodiment of the present application.
Figure 3C:
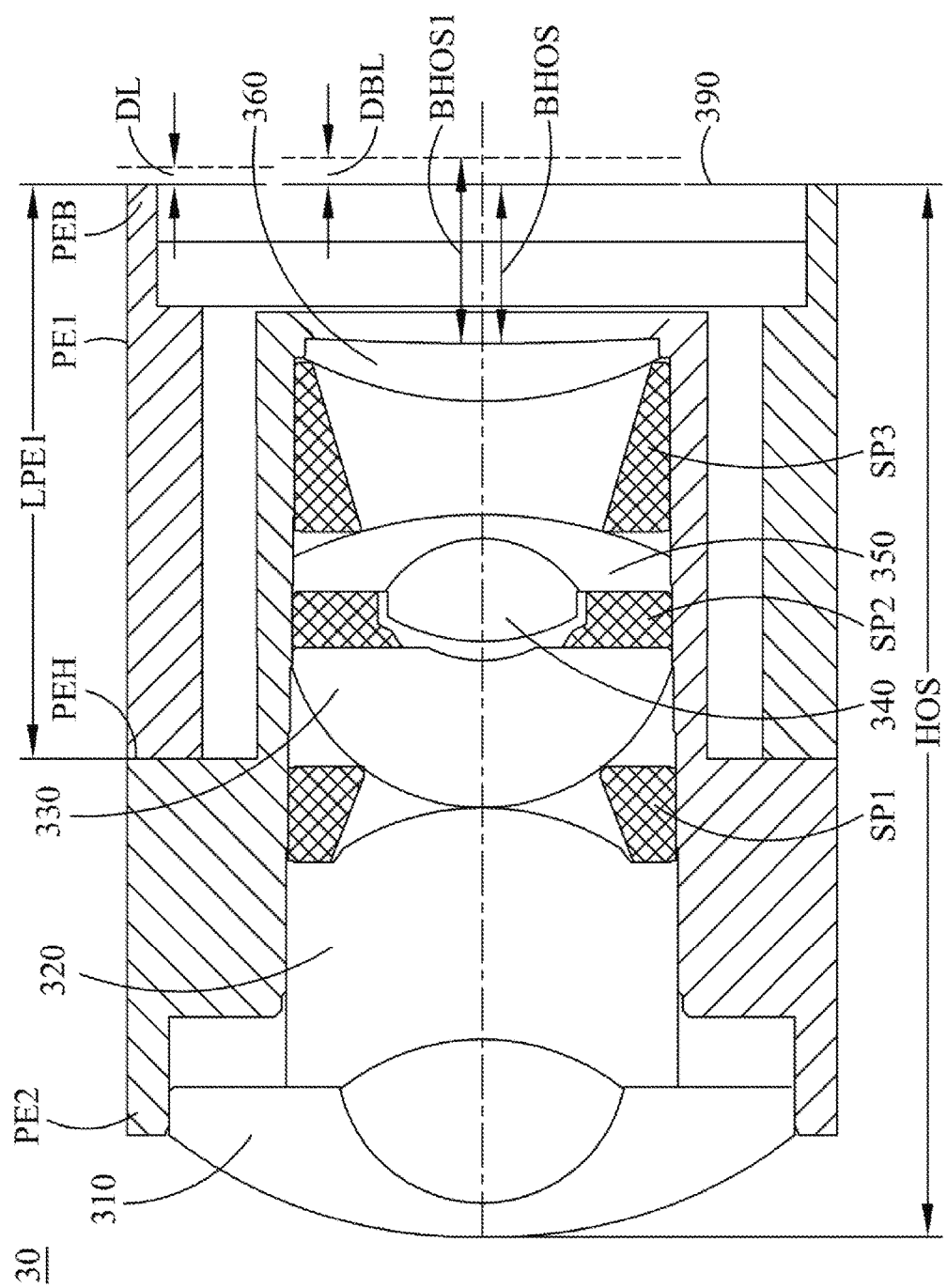
FIG. 3C is a schematic diagram of an assembly of a first positioning element and the optical imaging lens assembly of the third embodiment of the present invention.
Figure 3D:
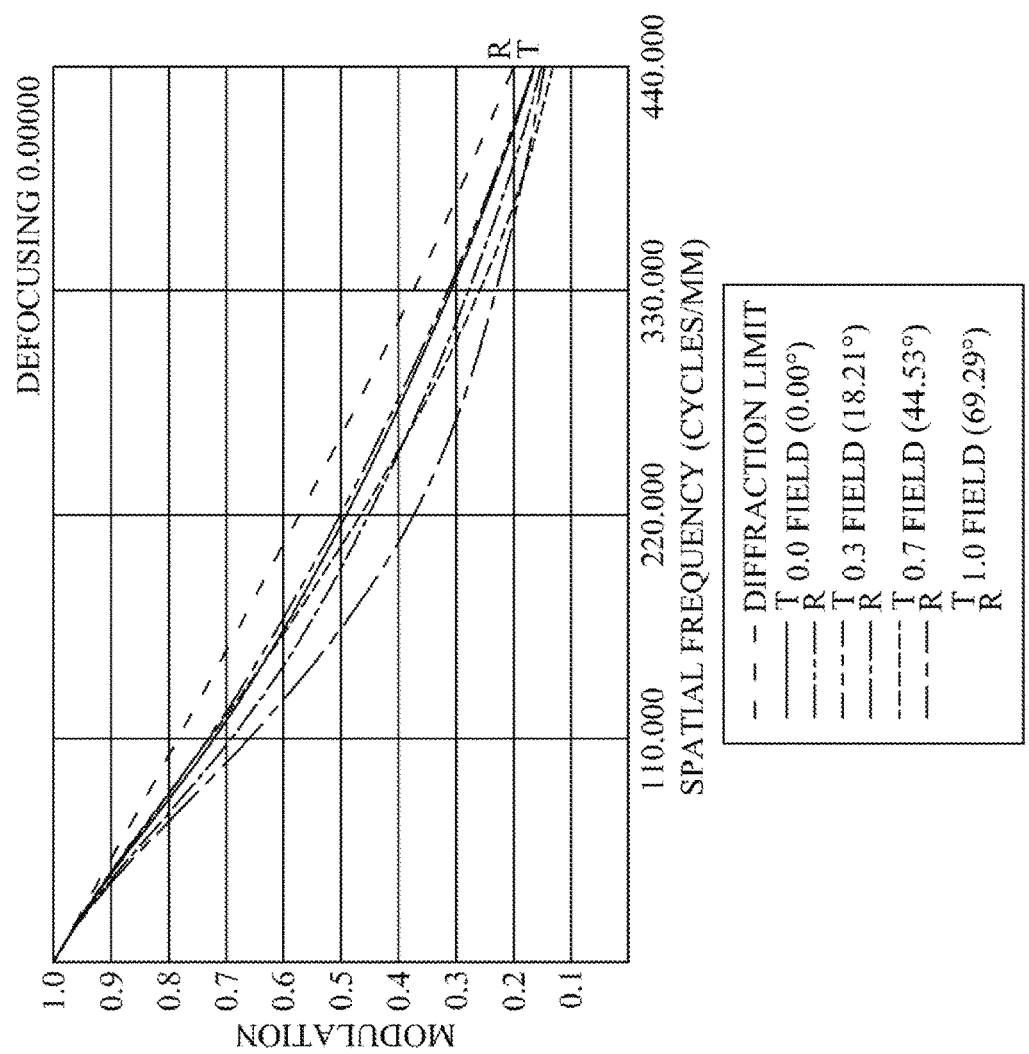
FIG. 3D shows a feature map of modulation transformation of the optical image capturing system of the third embodiment of the present invention in visible spectrum.

The following refers to FIGS. 3A through 3D. FIG. 3A is a schematic diagram of a third embodiment of an optical imaging lens assembly of an optical image capturing system of the present invention; FIG. 3B shows curve diagrams of longitudinal spherical aberration, astigmatic field, and optical distortion of the optical image capturing system in the order from left to right of the third embodiment of the present application; FIG. 3C is a schematic diagram of an assembly of a first positioning element and the optical imaging lens assembly of the third embodiment of the present invention; and FIG. 3D shows a feature map of modulation transformation of the optical image capturing system of the third embodiment of the present invention in visible spectrum. As shown in FIG. 3A, The optical image capturing system of the third embodiment includes, along an optical axis from an object side to an image side, a first lens 310, a second lens 320, a third lens 330, an aperture 300, a fourth lens 340, a fifth lens 350, a sixth lens 360, an infrared rays filter 380, an image plane 390, and an image sensor 392.

The first lens 310 has negative refractive power and is made of glass. An object-side surface 312 thereof, which faces the object side, is a convex spheric surface, and an image-side surface 314 thereof, which faces the image side, is a concave spheric surface.

The second lens 320 has positive refractive power and is made of glass. An object-side surface 322 thereof, which faces the object side, is a concave spheric surface, and an image-side surface 324 thereof, which faces the image side, is a convex spheric surface.

The third lens 330 has positive refractive power and is made of glass. An object-side surface 332 thereof, which faces the object side, is a convex spheric surface, and an image-side surface 334 thereof, which faces the image side, is a concave spheric surface.

The fourth lens 340 has positive refractive power and is made of glass. An object-side surface 342 thereof, which faces the object side, is a convex spheric surface, and an image-side surface 344 thereof, which faces the image side, is a convex spheric surface.

The fifth lens 350 has negative refractive power and is made of glass. An object-side surface 352 thereof, which faces the object side, is a concave spheric surface, and an image-side surface 354 thereof, which faces the image side, is a convex spheric surface.

The sixth lens 360 has positive refractive power and is made of glass. An object-side surface 362 thereof, which faces the object side, is a convex spheric surface, and an image-side surface 364 thereof, which faces the image side, is a concave spheric surface.

The infrared rays filter 380 is made of glass and between the sixth lens 360 and the image plane 390. The infrared rays filter 380 gives no contribution to the focal length of the system.

The optical imaging lens assembly 301 of the third embodiment has the following parameters, which are FWT1=3.5799 mm; FWT2=3.5749 mm; and FWT1/FST=1.0028, wherein FWT1 is a focal length of the system at the first working temperature of 70° C., and FWT2 is a focal length of the system at the second working temperature of 50° C.

The optical imaging lens assembly 301 of the third embodiment has the following parameters, which are: BHOS=3.6835 mm; BHOS1=3.7275 mm; |BHOS1−BHOS|=0.044 mm, and |BHOS1−BHOS|/BHOS=0.0119, wherein BHOS is a distance on the optical axis between the image plane and the object-side surface of the lens, which is nearest to the image plane at 25° C., and BHOS1 is a distance on the optical axis between the image plane and the object-side surface of the lens, which is nearest to the image plane, at the first working temperature of 70° C.

The optical imaging lens assembly 301 of the third embodiment has the following parameters, which are: BHOS=3.6835 mm; BHOS2=3.7065 mm; and |BHOS2−BHOS|=0.023 mm, wherein BHOS is a distance on the optical axis between the image plane and the object-side surface of the lens, which is nearest to the image plane at 25° C., and BHOS2 is a distance on the optical axis between the image plane and the object-side surface of the lens, which is nearest to the image plane, at the second working temperature of 50° C.

The first positioning member PE1 is made of polycarbonate (PC) and the second positioning member PE2 is made of aluminum, and the optical image capturing system of the third embodiment has the following parameters, which are: LPE1=13.3940 mm, LPE2=19.2000 mm, wherein LPE1 is a length of an outer wall of the first positioning element PE1 in parallel with the optical axis at 25° C., and LPE2 is a length of an outer wall of the second positioning element PE2 in parallel with the optical axis at 25° C. The optical imaging lens assembly 301 includes three spacers, the spacer SP1 is disposed between the second lens 320 and the third lens 330, the spacer SP2 is disposed between the third lens 330 and the fifth lens 350, and the spacer SP3 is disposed between the fifth lens 350 and the sixth lens 360. These spacers are made of polycarbonate (PC). A length (thickness) of the outermost side of the spacer SP1 in parallel with the optical axis is 2.195 mm, a length (thickness) of the outermost side of the spacer SP2 in parallel with the optical axis is 1.303 mm, and a length (thickness) of the outermost side of the spacer SP3 in parallel with the optical axis is 3.928 mm.

The optical image capturing system of the third embodiment further satisfies: DL=α*(70° C.−25° C.)=0.0422 mm; |BHOS1−BHOS|/α=46.9293; and |BHOS1−BHOS|/DL=1.0429, wherein CES1 is a thermal expansion coefficient of the material of the first positioning element PE1, a is the product of LPE1 and CES1, and DL is a thermal expansion length variation of the first positioning element PE1 at the first working temperature of 70° C.

The parameters of the lenses of the third embodiment are listed in Table 5 and Table 6.

TABLE 5

The parameters of the lenses of the third embodiment
FST = 3.5699 mm; FST/REP = 2.8; HAF = 69.2861 deg

| Surface | | Radius of curvature | Thickness (mm) | Material | Refractive index | Abbe number | Focal length |
|---|---|---|---|---|---|---|---|
| 0 | Object plane | 1E+18 | 900 | | | | |
| 1 | 1$^{st}$ lens | 13.5232225 | 0.800 | Glass | 1.755 | 52.33 | −6.18287 |
| 2 | | 3.390461386 | 3.815 | | | | |
| 3 | 2$^{nd}$ lens | −5.592325094 | 5.389 | Plastic | 1.511 | 57.12 | 48.5747 |
| 4 | | −6.058103322 | 0.050 | | | | |
| 5 | 3$^{rd}$ lens | 4.592258357 | 3.428 | Glass | 1.785 | 25.75 | 27.7058 |
| 6 | | 3.89668807 | 0.241 | | | | |
| 7 | Aperture plane | 1E+18 | 0.209 | | | | |
| 8 | 4$^{th}$ lens | 4.761801526 | 2.369 | Glass | 1.593 | 68.53 | 3.27281 |
| 9 | | −2.678847623 | 0.001 | | | | |
| 10 | 5$^{th}$ lens | −2.678847623 | 0.550 | Glass | 1.923 | 18.90 | −4.00916 |
| 11 | | −10.41228011 | 2.658 | | | | |
| 12 | 6$^{th}$ lens | 9.081204739 | 1.368 | Glass | 1.923 | 20.88 | 10.7795 |
| 13 | | 88.74751852 | 0.780 | | | | |
| 14 | Infrared rays filter plane | 1E+18 | 0.800 | BK_7 | 1.517 | 64.13 | |
| 15 | | 1E+18 | 2.104 | | | | |
| 16 | | 1E+18 | 0.000 | | | | |
| 17 | Image plane | 1E+18 | 0.000 | | | | |

Reference wavelength: 555 nm
Values of refractive index of each lens relative to air in different working temperature ranges: dn/dt (unit: $10^{-6}/°$ C., Reference wavelength: d-line)

| Lens number | Material code | Temperature (° C.) | | | | | |
|---|---|---|---|---|---|---|---|
| | | −40° C.~−20° C. | −20° C.~0° C. | 0° C.~20° C. | 20° C.~40° C. | 40° C.~60° C. | 60° C.~80° C. |
| 1$^{st}$ lens | H-LaK53A | 7.6 | 8.1 | 8.6 | 8.6 | 8.8 | 9.2 |
| 3$^{rd}$ lens | ZF13 | 2.4 | 2.7 | 3.2 | 3.3 | 3.4 | 3.7 |
| 4$^{th}$ lens | H-ZPK5 | 0.5 | 0.8 | 0.6 | 1.0 | 1.4 | 2.1 |
| 5$^{th}$ lens | H-ZF72A | −7.1 | −7.3 | −7.3 | −7.4 | −7.5 | −7.4 |
| 6$^{th}$ lens | H-ZF62 | 8.8 | 8.8 | 10.0 | 10.2 | 10.3 | 10.6 |

| Lens number | Material code | Temperature (° C.) | | | | | |
|---|---|---|---|---|---|---|---|
| | | −10° C.~0° C. | 0° C.~10° C. | 10° C.~25° C. | 25° C.~40° C. | 40° C.~55° C. | 55° C.~70° C. |
| 2$^{nd}$ lens | F4520 | −110.0 | −110.0 | −100.0 | −113.3 | −106.7 | −120.0 |

TABLE 6

Coefficients of the aspheric surfaces of the third embodiment
TABLE 6 Coefficients of the aspheric surfaces

| | surface | | | | | | |
|---|---|---|---|---|---|---|---|
| | 1 | 2 | 3 | 4 | 5 | 6 | 8 |
| k | 0.000000E+00 | 0.000000E+00 | 7.113992E−01 | 4.205537E−01 | 0.000000E+00 | 0.000000E+00 | 0.000000E+00 |
| A4 | 0.000000E+00 | 0.000000E+00 | 4.054828E−04 | 4.221186E−04 | 0.000000E+00 | 0.000000E+00 | 0.000000E+00 |
| A6 | 0.000000E+00 | 0.000000E+00 | 1.756155E−05 | −1.858459E−05 | 0.000000E+00 | 0.000000E+00 | 0.000000E+00 |
| A8 | 0.000000E+00 | 0.000000E+00 | −9.390872E−06 | 1.817078E−06 | 0.000000E+00 | 0.000000E+00 | 0.000000E+00 |
| A10 | 0.000000E+00 | 0.000000E+00 | 1.130591E−06 | −3.163280E−08 | 0.000000E+00 | 0.000000E+00 | 0.000000E+00 |
| A12 | 0.000000E+00 | 0.000000E+00 | −6.702857E−08 | −9.282061E−17 | 0.000000E+00 | 0.000000E+00 | 0.000000E+00 |
| A14 | 0.000000E+00 | 0.000000E+00 | 0.000000E+00 | −2.032110E−19 | 0.000000E+00 | 0.000000E+00 | 0.000000E+00 |

TABLE 6-continued

Coefficients of the aspheric surfaces of the third embodiment
TABLE 6 Coefficients of the aspheric surfaces

| | | | | | | | |
|---|---|---|---|---|---|---|---|
| A16 | 0.000000E+00 | 0.000000E+00 | 0.000000E+00 | −4.448529E−22 | 0.000000E+00 | 0.000000E+00 | 0.000000E+00 |

| | surface | | | | |
|---|---|---|---|---|---|
| | 9 | 10 | 11 | 12 | 13 |
| k | 0.000000E+00 | 0.000000E+00 | 0.000000E+00 | 0.000000E+00 | 0.000000E+00 |
| A4 | 0.000000E+00 | 0.000000E+00 | 0.000000E+00 | 0.000000E+00 | 0.000000E+00 |
| A6 | 0.000000E+00 | 0.000000E+00 | 0.000000E+00 | 0.000000E+00 | 0.000000E+00 |
| A8 | 0.000000E+00 | 0.000000E+00 | 0.000000E+00 | 0.000000E+00 | 0.000000E+00 |
| A10 | 0.000000E+00 | 0.000000E+00 | 0.000000E+00 | 0.000000E+00 | 0.000000E+00 |
| A12 | 0.000000E+00 | 0.000000E+00 | 0.000000E+00 | 0.000000E+00 | 0.000000E+00 |
| A14 | 0.000000E+00 | 0.000000E+00 | 0.000000E+00 | 0.000000E+00 | 0.000000E+00 |
| A16 | 0.000000E+00 | 0.000000E+00 | 0.000000E+00 | 0.000000E+00 | 0.000000E+00 |

An equation of the aspheric surfaces of the third embodiment is the same as that of the first embodiment, and the definitions are the same as well.

The exact parameters of the third embodiment based on Table 5 and Table 6 are listed in the following table:

Third embodiment (Reference wavelength: 555 nm)

| |FST/f1| | |FST/f2| | |FST/f3| | |FST/f4| | |FST/f5| | |FST/f6| |
|---|---|---|---|---|---|
| 0.57738 | 0.07349 | 0.12885 | 1.09077 | 0.89043 | 0.33117 |

| ΣPPR | ΣNPR | ΣPPR/|ΣNPR| | IN12/f | IN56/f | TP4/(IN34 + TP4 + IN45) |
|---|---|---|---|---|---|
| 2.68744 | 0.40467 | 6.64112 | 1.06873 | 0.74448 | 0.84010 |

| |f1/f2| | |f2/f3| | (TP1 + IN12)/TP2 | | (TP6 + IN56)/TP5 | |
|---|---|---|---|---|---|
| 0.12729 | 1.75323 | 0.85643 | | 7.31876 | |

| HOS | InTL | HOS/HOI | InS/HOS | ODT % | TDT % |
|---|---|---|---|---|---|
| 24.56100 | 20.87750 | 6.54960 | 0.44129 | −60.26270 | 42.22830 |

| HVT51 | HVT52 | HVT61 | HVT62 | HVT62/HOI | HVT62/HOS |
|---|---|---|---|---|---|
| 0 | 0 | 0.00000 | 0.00000 | 0.00000 | 0.00000 |

| TP2/TP3 | TP3/TP4 | InRS61 | InRS62 | |InRS61|/TP6 | |InRS62|/TP6 |
|---|---|---|---|---|---|
| 1.57226 | 1.44653 | 0.89158 | 0.08570 | 0.65192 | 0.06266 |

Values related to the lengths of the outline curves of the third embodiment based on Table 5 and Table 6 are listed in the following table:

Third embodiment (Reference wavelength: 555 nm)

| ARE | ½(HEP) | ARE value | ARE − ½(HEP) | 2(ARE/HEP) % | TP | ARE/TP (%) |
|---|---|---|---|---|---|---|
| 11 | 0.638 | 0.638 | 0.00001 | 100.00% | 0.800 | 79.78% |
| 12 | 0.638 | 0.642 | 0.00360 | 100.56% | 0.800 | 80.23% |
| 21 | 0.638 | 0.639 | 0.00117 | 100.18% | 5.389 | 11.86% |
| 22 | 0.638 | 0.639 | 0.00096 | 100.15% | 5.389 | 11.86% |
| 31 | 0.638 | 0.640 | 0.00185 | 100.29% | 3.428 | 18.67% |
| 32 | 0.638 | 0.641 | 0.00266 | 100.42% | 3.428 | 18.70% |
| 41 | 0.638 | 0.640 | 0.00170 | 100.27% | 2.369 | 27.01% |
| 42 | 0.638 | 0.644 | 0.00597 | 100.93% | 2.369 | 27.19% |
| 51 | 0.638 | 0.644 | 0.00597 | 100.93% | 0.550 | 117.13% |
| 52 | 0.638 | 0.638 | 0.00018 | 100.03% | 0.550 | 116.07% |
| 61 | 0.638 | 0.639 | 0.00030 | 100.05% | 1.368 | 46.69% |
| 62 | 0.638 | 0.638 | −0.00022 | 99.97% | 1.368 | 46.65% |

| ARS | EHD | AR value | ARS − EHD | (ARS/EHD) % | TP | ARS/TP (%) |
|---|---|---|---|---|---|---|
| 11 | 5.314 | 5.460 | 0.147 | 102.76% | 0.800 | 682.52% |
| 12 | 3.190 | 4.154 | 0.964 | 130.20% | 0.800 | 519.25% |
| 21 | 2.779 | 2.921 | 0.142 | 105.12% | 5.389 | 54.21% |
| 22 | 2.845 | 2.960 | 0.115 | 104.05% | 5.389 | 54.94% |
| 31 | 2.466 | 2.603 | 0.137 | 105.54% | 3.428 | 75.95% |
| 32 | 1.262 | 1.284 | 0.022 | 101.77% | 3.428 | 37.46% |
| 41 | 1.361 | 1.380 | 0.019 | 101.40% | 2.369 | 58.25% |
| 42 | 1.634 | 1.756 | 0.122 | 107.49% | 2.369 | 74.11% |
| 51 | 1.634 | 1.756 | 0.122 | 107.49% | 0.550 | 319.29% |
| 52 | 1.928 | 1.939 | 0.011 | 100.57% | 0.550 | 352.58% |
| 61 | 3.540 | 3.636 | 0.096 | 102.72% | 1.368 | 265.89% |
| 62 | 3.548 | 3.549 | 0.000 | 100.01% | 1.368 | 259.50% |

The results of the equations of the third embodiment based on Table 5 and Table 6 are listed in the following table:

Values related to the inflection points of the third embodiment (Reference wavelength: 555 nm)

| HIF221 | 0 | HIF221/HOI | 00 | SGI221 | 0 | |SGI221|/(|SGI221| + TP2) | 0 |
|---|---|---|---|---|---|---|---|

Fourth Embodiment

Figure 4A:
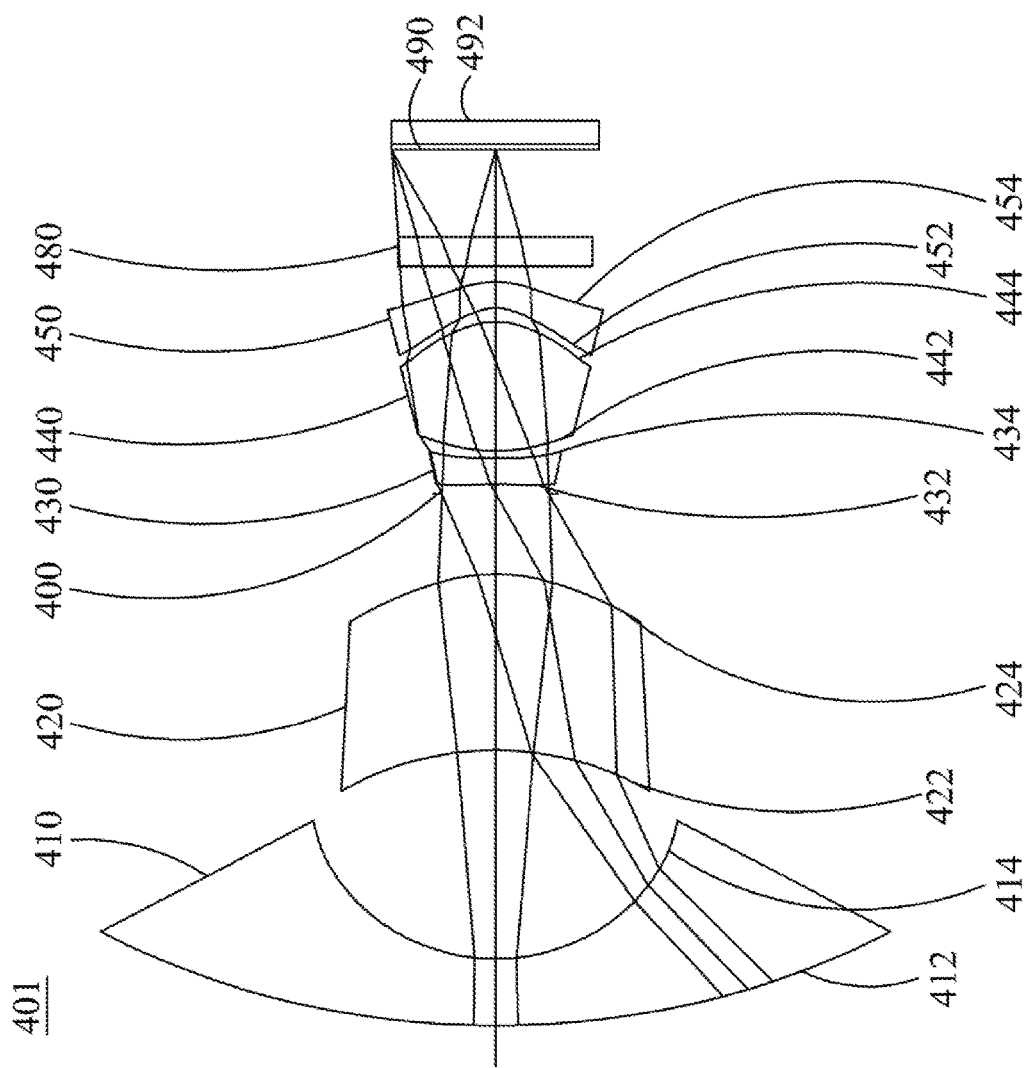
FIG. 4A is a schematic diagram of an optical imaging lens assembly of an optical image capturing system of a fourth embodiment of the present invention.
Figure 4B:
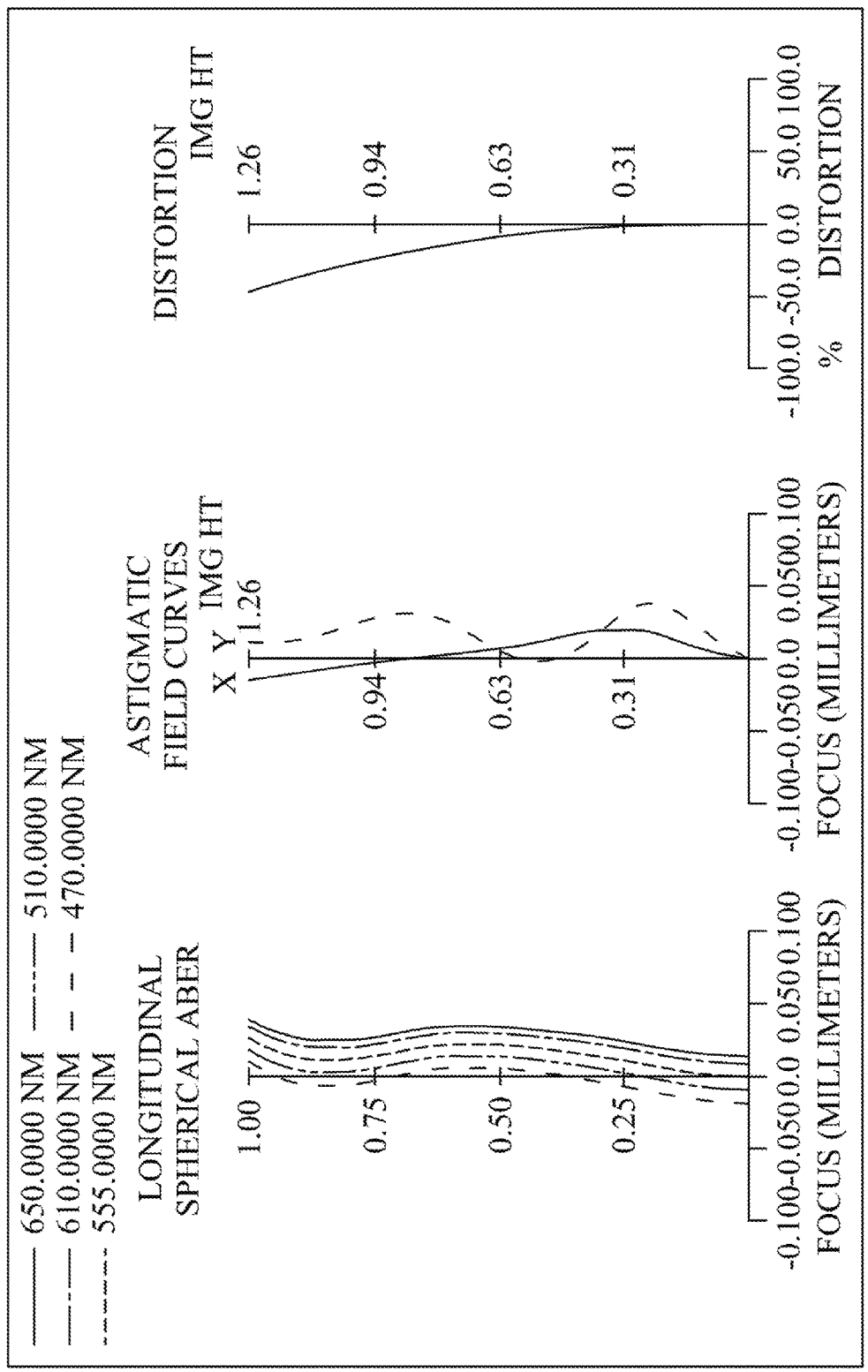
FIG. 4B shows curve diagrams of longitudinal spherical aberration, astigmatic field, and optical distortion of the optical image capturing system in the order from left to right, in accordance with the fourth embodiment of the present application.
Figure 4C:
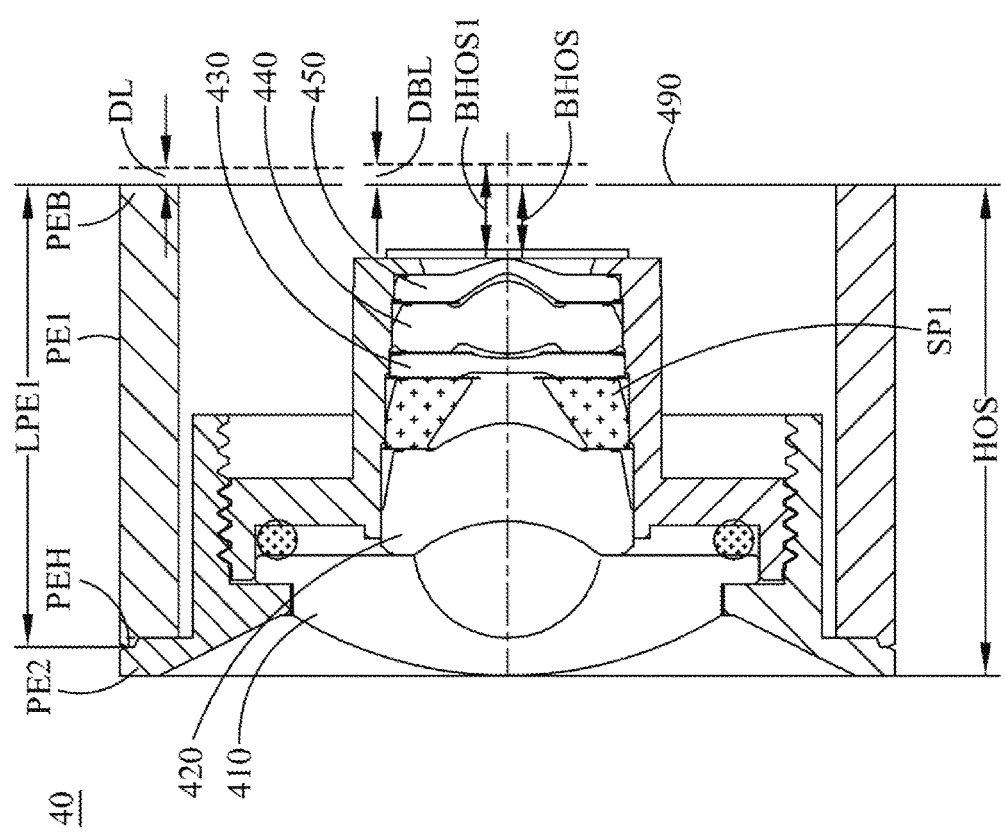
FIG. 4C is a schematic diagram of an assembly of a first positioning element and the optical imaging lens assembly of the fourth embodiment of the present invention.
Figure 4D:
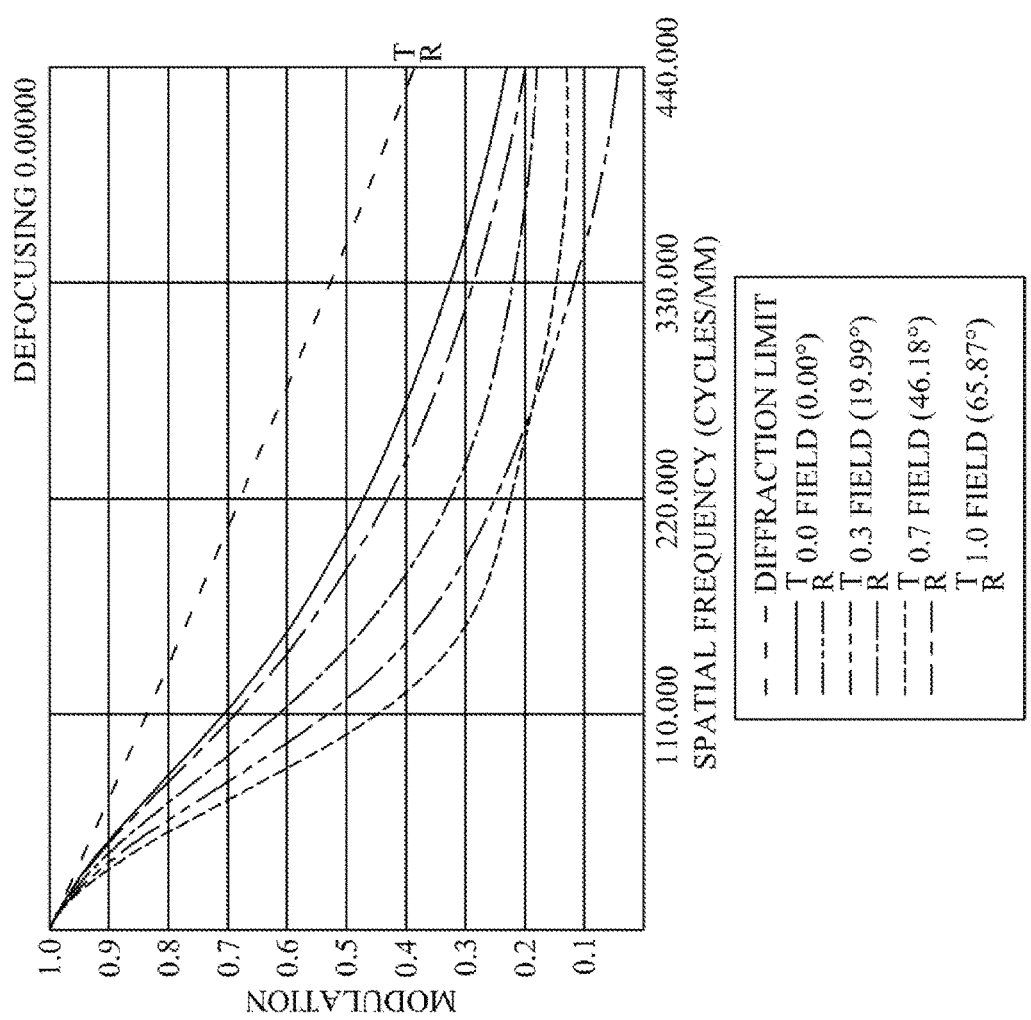
FIG. 4D shows a feature map of modulation transformation of the optical image capturing system of the fourth embodiment of the present invention in visible spectrum.

The following refers to FIGS. 4A through 4D. FIG. 4A is a schematic diagram of an optical imaging lens assembly of an optical image capturing system of a fourth embodiment of the present invention; FIG. 4B shows curve diagrams of longitudinal spherical aberration, astigmatic field, and optical distortion of the optical image capturing system in the order from left to right of the fourth embodiment of the present application; FIG. 4C is a schematic diagram of an assembly of a first positioning element and the optical imaging lens assembly of the fourth embodiment of the present invention; and FIG. 4D shows a feature map of modulation transformation of the optical image capturing system of the fourth embodiment of the present invention in visible spectrum. As shown in FIG. 4A, The optical imaging lens assembly 401 of the fourth embodiment includes, along an optical axis from an object side to an image side, a first lens 410, a second lens 420, an aperture 400, a third lens 430, a fourth lens 440, a fifth lens 450, an infrared rays filter 480, an image plane 490, and an image sensor 492.

The first lens 410 has negative refractive power and is made of glass. An object-side surface 412 thereof, which faces the object side, is a convex spheric surface, and an image-side surface 414 thereof, which faces the image side, is a concave spheric surface.

The second lens 420 has positive refractive power and is made of plastic. An object-side surface 422 thereof, which faces the object side, is a concave aspheric surface, and an image-side surface 424 thereof, which faces the image side, is a convex aspheric surface.

The third lens 430 has negative refractive power and is made of plastic. An object-side surface 432 thereof, which faces the object side, is a concave aspheric surface, and an image-side surface 434 thereof, which faces the image side, is a concave aspheric surface. The object-side surface 432 has two inflection points, and the image-side surface 434 has an inflection point.

The fourth lens 440 has positive refractive power and is made of plastic. An object-side surface 442 thereof, which faces the object side, is a convex aspheric surface, and an image-side surface 444 thereof, which faces the image side, is a convex aspheric surface. The image-side surface 444 has an inflection point.

The fifth lens 450 has negative refractive power and is made of plastic. An object-side surface 452 thereof, which faces the object side, is a concave aspheric surface, and an image-side surface 454 thereof, which faces the image side, is a convex aspheric surface. The object-side surface 452 has an inflection point, and the image-side surface 454 has an inflection point. It may reduce back focal length and size.

The infrared rays filter 480 is made of glass and between the fifth lens 450 and the image plane 490. The infrared rays filter 480 gives no contribution to the focal length of the system.

The optical imaging lens assembly 401 of the fourth embodiment has the following parameters, which are FWT1=1.0686 mm; FWT2=1.0636 mm; and FWT1/FST=1.0104, wherein FWT1 is a focal length of the system at the first working temperature of 70° C., and FWT2 is a focal length of the system at the second working temperature of 50° C.

The optical imaging lens assembly 401 of the fourth embodiment has the following parameters, which are: BHOS=1.7600 mm; BHOS1=1.7950 mm; |BHOS1−BHOS|=0.035 mm, and |BHOS1−BHOS|/BHOS=0.0199, wherein BHOS is a distance on the optical axis between the image plane and the object-side surface of the lens, which is nearest to the image plane at 25° C., and BHOS1 is a distance on the optical axis between the image plane and the object-side surface of the lens, which is nearest to the image plane, at the first working temperature of 70° C.

The optical imaging lens assembly 401 of the fourth embodiment has the following parameters, which are: BHOS=1.7600 mm; BHOS2=1.7800 mm; and |BHOS2−BHOS|=0.02 mm, wherein BHOS is a distance on the optical axis between the image plane and the object-side surface of the lens, which is nearest to the image plane at 25° C., and BHOS2 is a distance on the optical axis between the image plane and the object-side surface of the lens, which is nearest to the image plane, at the second working temperature of 50° C.

The first positioning member PE1 and the second positioning member PE2 are made of polycarbonate (PC), and the optical image capturing system of the fourth embodiment has the following parameters, which are: LPE1=10.7900 mm, LPE2=7.6870 mm, wherein LPE1 is a length of an outer wall of the first positioning element PE1 in parallel with the optical axis at 25° C., and LPE2 is a length of an outer wall of the second positioning element PE2 in parallel with the optical axis at 25° C. The optical imaging lens assembly 401 includes a spacer SP1 disposed between the second lens 420 and the third lens 430, and a length (thickness) of outermost side of the spacer SP1 in parallel with the optical axis is 1.61 mm. The spacer SP1 is made of polycarbonate (PC).

The optical image capturing system of the fourth embodiment further satisfies: DL=α*(70° C.−25° C.)=0.034 mm; |BHOS1−BHOS|/α=46.3392; and |BHOS1−BHOS|/DL=1.0298, wherein CES1 is a thermal expansion coefficient of the material of the first positioning element PE1, α is the product of LPE1 and CES1, and DL is a thermal expansion length variation of the first positioning element PE1 at the first working temperature of 70° C.

The parameters of the lenses of the fourth embodiment are listed in Table 7 and Table 8.

TABLE 7

The parameters of the lenses of the fourth embodiment
FST = 1.0576 mm; FST/HEP = 2.0; HAF = 65.8659 deg

| Surface | | Radius of curvature | Thickness (mm) | Material | Refractive index | Abbe number | Focal length (mm) |
|---|---|---|---|---|---|---|---|
| 0 | Object plane | 1E+18 | 1E+20 | | | | |
| 1 | 1$^{st}$ lens | 9.766104683 | 0.900 | Glass | 1.883 | 40.77 | −3.47244 |
| 2 | | 2.24 | 2.778 | | | | |
| 3 | 2$^{nd}$ lens | −3.375411874 | 2.353 | Plastic | 1.636 | 23.890 | 4.48779 |
| 4 | | −1.974518923 | 1.074 | | | | |
| 5 | Aperature plane | 1E+18 | 0.125 | | | | |
| 6 | 3$^{rd}$ lens | −4.770963135 | 0.350 | Plastic | 1.642 | 22.455 | −5.80575 |
| 7 | | 18.2557766 | 0.100 | | | | |
| 8 | 4$^{th}$ lens | 1.904272583 | 1.723 | Plastic | 1.545 | 55.960 | 1.33399 |
| 9 | | −0.803014619 | 0.187 | | | | |

TABLE 7-continued

The parameters of the lenses of the fourth embodiment
FST = 1.0576 mm; FST/HEP = 2.0; HAF = 65.8659 deg

| | | | | | | |
|---|---|---|---|---|---|---|
| 10 | 5th lens | −0.509518478 | 0.350 | Plastic | 1.642 | 22.455 | −2.73154 |
| 11 | | −0.908863599 | 0.204 | | | |
| 12 | Infrared rays filter plane | 1E+18 | 0.400 | BK_7 | 1.517 | 64.13 |
| 13 | | 1E+18 | 1.156 | | | |
| 14 | Image plane | 1E+18 | 0.000 | | | |

Reference wavelength: 555 nm
Values of refractive index of each lens relative to air in different working temperature ranges: dn/dt
(unit: $10^{-6}/\square$, Reference wavelength: d-line)

| Lens number | Material code | Temperature (° C.) | | | | | |
|---|---|---|---|---|---|---|---|
| | | −18° C.~0° C. | 0° C.~20° C. | 0° C.~20° C. | 20° C.~40° C. | 40° C.~60° C. | 60° C.~80° C. |
| 2nd lens | EP5000 | −105.6 | −110.0 | −115.0 | −110.0 | −110.0 | −105.6 |

| | | 10° C.~20° C. | 20° C.~30° C. | 30° C.~40° C. | 40° C.~50° C. | 50° C.~60° C. | 60° C.~70° C. |
|---|---|---|---|---|---|---|---|
| 3rd lens | OKP1 | −80.0 | −110.0 | −110.0 | −140.0 | −150.0 | −120.0 |
| 4th lens | 5014CL | −96.0 | −97.0 | −102.0 | −102.0 | −103.0 | −103.0 |
| 5th lens | OKP1 | −80.0 | −110.0 | −110.0 | −140.0 | −150.0 | −120.0 |

| Lens number | Material code | Temperature (° C.) | | | | | |
|---|---|---|---|---|---|---|---|
| | | −40° C.~−20° C. | −20° C.~0° C. | 0° C.~20° C. | 20° C.~40° C. | 40° C.~60° C. | 60° C.~80° C. |
| 1st lens | H-ZLaF68B | 3.0 | 3.4 | 3.6 | 3.8 | 4.1 | 3.8 |

TABLE 8

Coefficients of the aspheric surfaces of the fourth embodiment
TABLE 8 Coefficients of the aspheric surfaces

| | surface | | | | | | |
|---|---|---|---|---|---|---|---|
| | 1 | 2 | 3 | 4 | 5 | 6 | 8 |
| k | 0.000000E+00 | 0.000000E+00 | 1.291904E+00 | −3.546759E−01 | −9.041656E−01 | −1.846860E+01 | −6.132665E−02 |
| A4 | 0.000000E+00 | 0.000000E+00 | 1.757790E−02 | 4.845342E−02 | 3.694941E−01 | 4.271629E−01 | 8.222096E−02 |
| A6 | 0.000000E+00 | 0.000000E+00 | −2.577629E−02 | −1.820688E−02 | −3.311855E−01 | −9.110381E−01 | −6.033774E−01 |
| A8 | 0.000000E+00 | 0.000000E+00 | 3.588117E−02 | 8.937467E−03 | −1.614472E+00 | 6.235167E−01 | 8.725457E−01 |
| A10 | 0.000000E+00 | 0.000000E+00 | −3.087968E−02 | −2.780300E−03 | 8.419964E+00 | 3.280477E+00 | 1.315814E+00 |
| A12 | 0.000000E+00 | 0.000000E+00 | 1.684307E−02 | 3.697329E−04 | 5.162423E+00 | −7.485169E+00 | −8.370388E+00 |
| A14 | 0.000000E+00 | 0.000000E+00 | −5.778668E−03 | 6.639792E−05 | −1.460121E+02 | −4.377112E+00 | 1.720971E+01 |
| A16 | 0.000000E+00 | 0.000000E+00 | 1.208959E−03 | −3.275244E−05 | 4.627149E+02 | 3.562595E+01 | −1.860375E+01 |
| A18 | 0.000000E+00 | 0.000000E+00 | −1.407147E−04 | 4.596384E−06 | −6.206808E+02 | −4.833496E+01 | 1.047924E+01 |
| A20 | 0.000000E+00 | 0.000000E+00 | 6.991040E−06 | −2.229367E−07 | 3.126500E+02 | 2.185385E+01 | −2.422819E+00 |

| | surface | | |
|---|---|---|---|
| | 9 | 10 | 11 |
| k | −7.961541E−01 | −8.705488E−01 | −7.611910E+00 |
| A4 | 4.163799E−01 | 1.530930E+00 | −3.371740E−01 |
| A6 | −2.382941E−01 | −2.596765E+00 | 1.583654E+00 |
| A8 | −3.930316E−01 | 4.369249E+00 | −3.931833E+00 |
| A10 | 1.124925E+00 | −6.583498E+00 | 6.185897E+00 |
| A12 | −1.819354E+00 | 7.563308E+00 | −6.467481E+00 |
| A14 | 2.448375E+00 | −5.431276E+00 | 4.498981E+00 |
| A16 | −2.192190E+00 | 2.059168E+00 | −1.996287E+00 |
| A18 | 1.061488E+00 | −2.681767E−01 | 5.087245E−01 |
| A20 | −2.076313E−01 | −2.290169E−02 | −5.633542E−02 |

An equation of the aspheric surfaces of the fourth embodiment is the same as that of the first embodiment, and the definitions are the same as well.

The exact parameters of the fourth embodiment based on Table 7 and Table 8 are listed in the following table:

| Fourth embodiment (Reference wavelength: 555 nm) | | | | | |
|---|---|---|---|---|---|
| |FST/f1| | |FST/f2| | |FST/f3| | |FST/f4| | |FST/f5| | |FST/f6| |
| 0.30456 | 0.23565 | 0.18216 | 0.79278 | 0.38717 | 0.77375 |

-continued

| Fourth embodiment (Reference wavelength: 555 nm) | | | | | |
|---|---|---|---|---|---|
| ΣPPR | ΣNPR | ΣPPR/\|ΣNPR\| | IN12/f | IN45/f | \|f2/f3\| |
| 1.4156 | 0.4867 | 2.9085 | 2.6268 | 0.1768 | 0.7730 |
| TP3/(TN23 + TP3 + IN34) | | (TP1 + IN12)/TP2 | | (TP5 + IN45)/TP4 | |
| 0.21225 | | 1.56299 | | 0.31158 | |
| HOS | InTL | HOS/HOI | InS/HOS | ODT % | TDT % |
| 11.70070 | 9.94071 | 9.28627 | 0.39276 | −46.7261 | 32.6649 |
| HVT41 | HVT42 | HVT51 | HVT52 | HVT52/HOI | HVT52/HOS |
| 0.00000 | 0.00000 | 0.00000 | 0.00000 | 0.00000 | 0.00000 |
| TP2/TP3 | TP3/TP4 | InRS51 | InRS52 | \|InRS51\|/TP5 | \|InRS52\|/TP5 |
| 6.72337 | 0.20308 | −0.554297 | −0.328012 | 1.58371 | 0.93718 |

Values related to the lengths of the outline curves of the fourth embodiment based on Table 7 and Table 8 are listed in the following table:

| Fourth embodiment (Reference wavelength: 555 nm) | | | | | |
|---|---|---|---|---|---|
| ARE | ½(HEP) | ARE value | ARE − ½(HEP) | 2(ARE/HEP) % | TP | ARE/TP (%) |
| 11 | 0.264 | 0.264 | −0.000352 | 99.87% | 0.900 | 29.34% |
| 12 | 0.264 | 0.265 | 0.000231 | 100.09% | 0.900 | 29.40% |
| 21 | 0.264 | 0.264 | −0.000118 | 99.96% | 2.353 | 11.23% |
| 22 | 0.264 | 0.265 | 0.000382 | 100.14% | 2.353 | 11.25% |
| 31 | 0.264 | 0.264 | −0.000311 | 99.88% | 0.350 | 75.45% |
| 32 | 0.264 | 0.264 | −0.000341 | 99.87% | 0.350 | 75.44% |
| 41 | 0.264 | 0.265 | 0.000491 | 100.19% | 1.723 | 15.37% |
| 42 | 0.264 | 0.268 | 0.003881 | 101.47% | 1.723 | 15.57% |
| 51 | 0.264 | 0.273 | 0.008831 | 103.34% | 0.350 | 78.06% |
| 52 | 0.264 | 0.267 | 0.002638 | 101.00% | 0.350 | 76.29% |
| ARS | EHD | ARS value | ARS − EHD | (ARS/EHD) % | TP | ARS/TP (%) |
| 11 | 4.790 | 5.005 | 0.215429 | 104.50% | 0.900 | 556.14% |
| 12 | 2.204 | 3.111 | 0.907335 | 141.18% | 0.900 | 345.65% |
| 21 | 1.866 | 1.972 | 0.105198 | 105.64% | 2.353 | 83.79% |
| 22 | 1.760 | 1.897 | 0.136776 | 107.77% | 2.353 | 80.60% |
| 31 | 0.717 | 0.716 | −0.000459 | 99.94% | 0.350 | 204.69% |
| 32 | 0.803 | 0.811 | 0.007809 | 100.97% | 0.350 | 231.75% |
| 41 | 0.937 | 0.966 | 0.029594 | 103.16% | 1.723 | 56.06% |
| 42 | 1.150 | 1.320 | 0.169391 | 114.73% | 1.723 | 76.57% |
| 51 | 1.164 | 1.340 | 0.176360 | 115.15% | 0.350 | 383.00% |
| 52 | 1.303 | 1.360 | 0.057211 | 104.39% | 0.350 | 388.71% |

The results of the equations of the fourth embodiment based on Table 7 and Table 8 are listed in the following table:

| Values related to the inflection points of the fourth embodiment (Reference wavelength: 555 nm) | | | | | | |
|---|---|---|---|---|---|---|
| HIF311 | 0.2375 | HIF311/HOI | 0.1885 | SGI311 | −0.0048 | \|0.0048\|/(.0048HOI\| + TP3) | 0.0136 |
| HIF312 | 0.6719 | HIF312/HOI | 0.5332 | SGI312 | −0.0012 | \|SGI312\|/(ISGI312\| + TP3) | 0.0033 |
| HIF321 | 0.7576 | HIF321/HOI | 0.6013 | SGI311 | 0.0763 | \|SGI321\|/(ISGI321\| + TP3) | 0.1789 |
| HIF421 | 0.9902 | HIF421/HOI | 0.7859 | SGI421 | −0.4727 | \|0.4721\|/(.472721\| + TP4) | 0.2152 |
| HIF511 | 0.9142 | HIF511/HOI | 0.7256 | SGI511 | −0.4658 | \|0.4658\|/(.4658HOI\| + TP5) | 0.5710 |
| HIF521 | 0.7839 | HIF521/HOI | 0.6221 | SGI521 | −0.2095 | \|0.2021\|/(.209521\| + TP5) | 0.3744 |

Fifth Embodiment

Figure 5A:
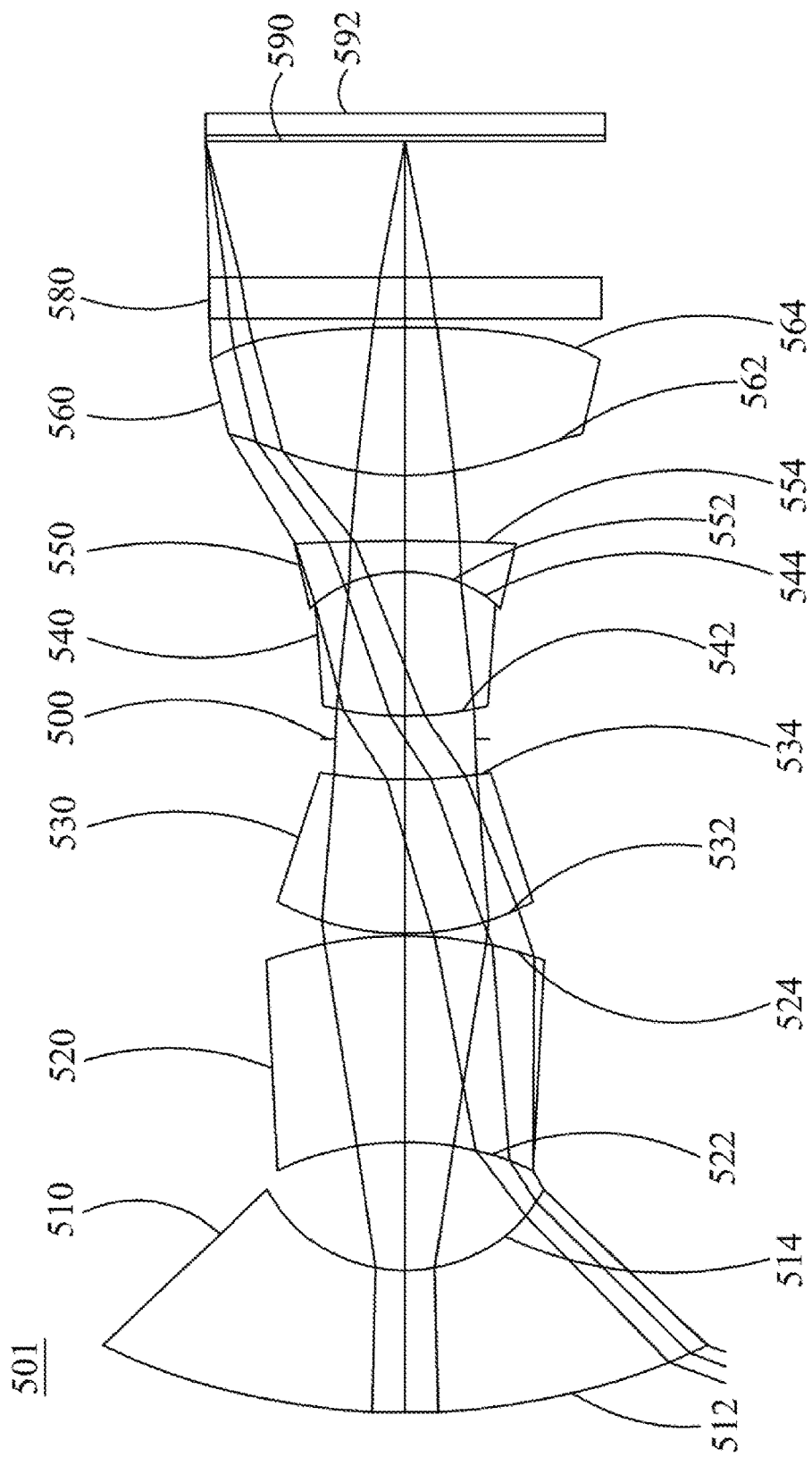
FIG. 5A is a schematic diagram of an optical imaging lens assembly of an optical image capturing system of a fifth embodiment of the present invention.
Figure 5B:
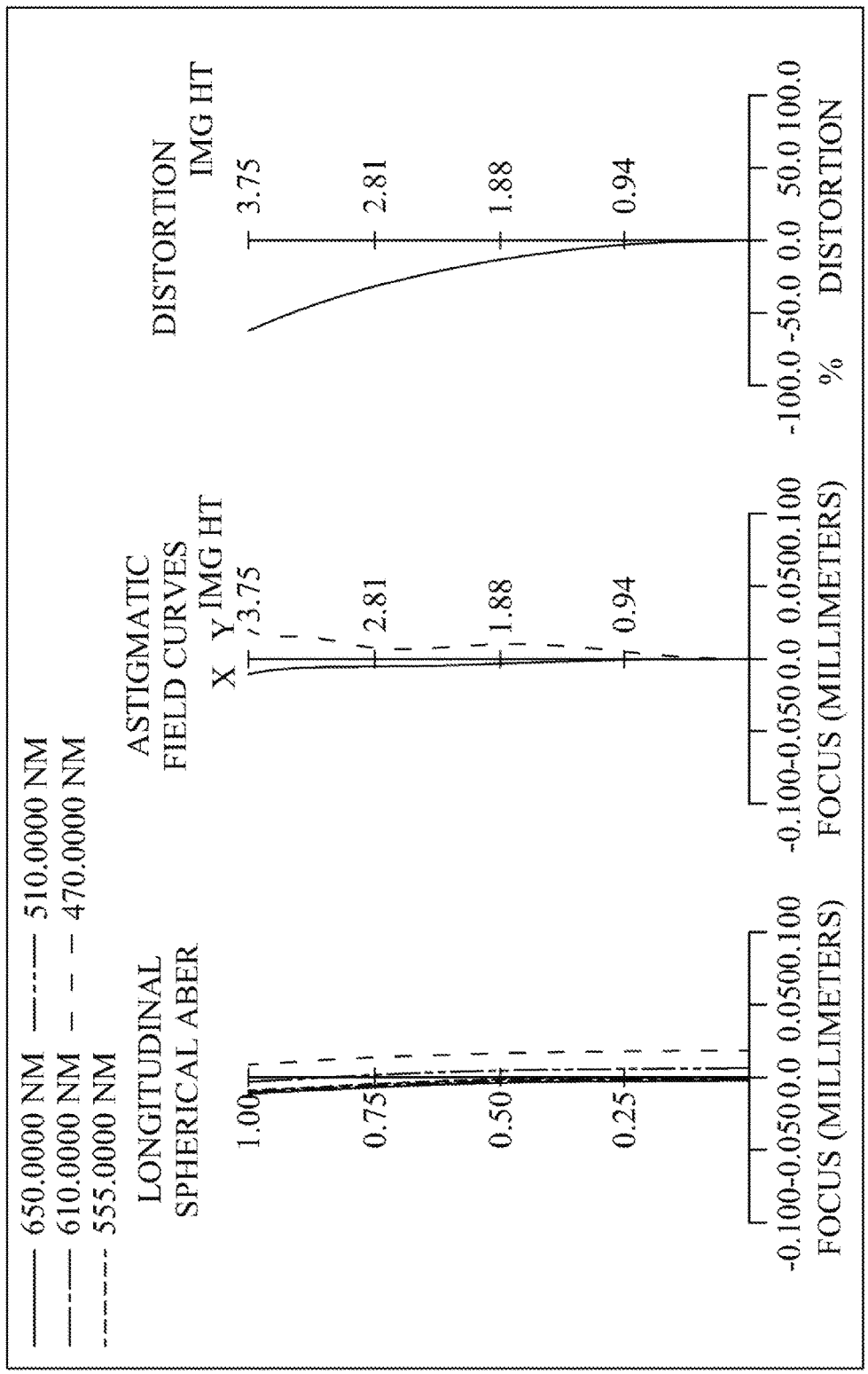
FIG. 5B shows curve diagrams of longitudinal spherical aberration, astigmatic field, and optical distortion of the optical image capturing system in the order from left to right, in accordance with the fifth embodiment of the present application.
Figure 5C:
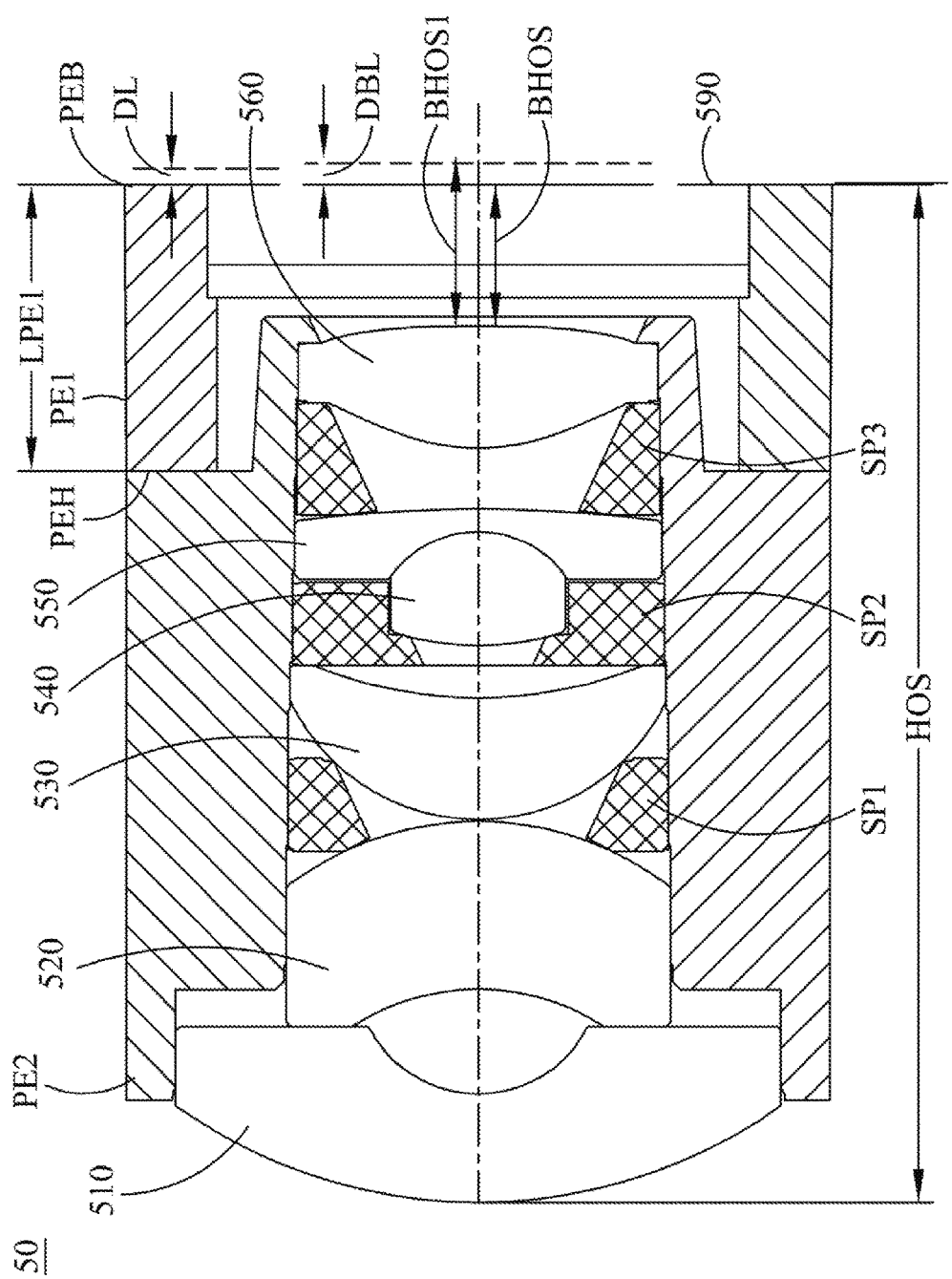
FIG. 5C is a schematic diagram of an assembly of a first positioning element and the optical imaging lens assembly of the fifth embodiment of the present invention.
Figure 5D:
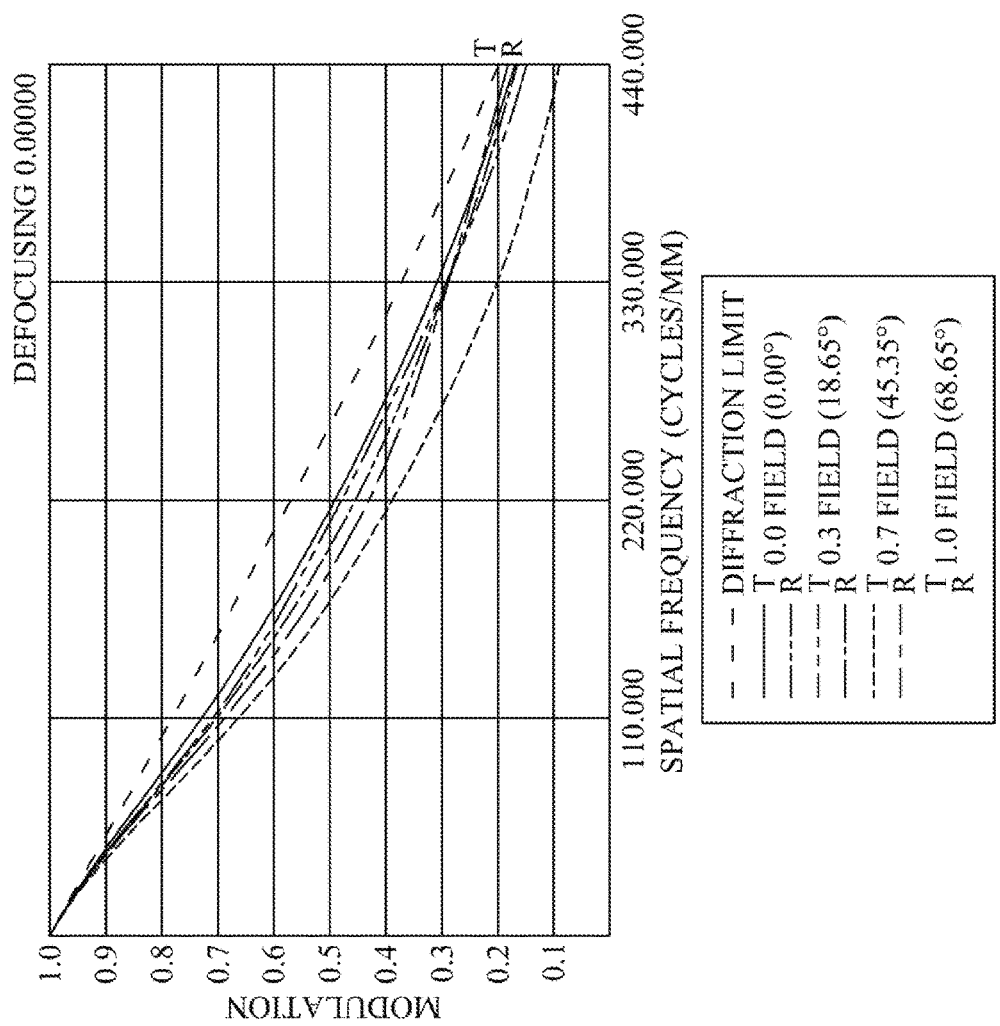
FIG. 5D shows a feature map of modulation transformation of the optical image capturing system of the fifth embodiment of the present invention in visible spectrum.

The following refers to FIGS. 5A through 5D. FIG. 5A is a schematic diagram of an optical imaging lens assembly of an optical image capturing system of a fifth embodiment of the present invention; FIG. 5B shows curve diagrams of longitudinal spherical aberration, astigmatic field, and optical distortion of the optical image capturing system in the order from left to right of the fifth embodiment of the present application; FIG. 5C is a schematic diagram of an assembly of a first positioning element and the optical imaging lens assembly of the fifth embodiment of the present invention; and FIG. 5D shows a feature map of modulation transformation of the optical image capturing system of the fifth embodiment of the present invention in visible spectrum. As shown in FIG. 5A, The optical imaging lens assembly 601 of the fifth embodiment includes, along an optical axis from an object side to an image side, a first lens 510, a second lens 520, a third lens 530, an aperture 500, a fourth lens 540, a fifth lens 550, a sixth lens 560, an infrared rays filter 580, an image plane 590, and an image sensor 592.

The first lens 510 has negative refractive power and is made of glass. An object-side surface 512 thereof, which faces the object side, is a convex spheric surface, and an image-side surface 514 thereof, which faces the image side, is a concave spheric surface. The object-side surface 512 has an inflection point.

The second lens 520 has negative refractive power and is made of glass. An object-side surface 522 thereof, which faces the object side, is a concave spheric surface, and an image-side surface 524 thereof, which faces the image side, is a convex spheric surface.

The third lens 530 has positive refractive power and is made of glass. An object-side surface 532 thereof, which faces the object side, is a convex spheric surface, and an image-side surface 534 thereof, which faces the image side, is a concave spheric surface.

The fourth lens 540 has positive refractive power and is made of glass. An object-side surface 542 thereof, which faces the object side, is a convex spheric surface, and an image-side surface 544 thereof, which faces the image side, is a convex spheric surface.

The fifth lens 550 has negative refractive power and is made of glass. An object-side surface 552 thereof, which faces the object side, is a concave spheric surface, and an image-side surface 554 thereof, which faces the image side, is a convex spheric surface.

The sixth lens 560 has positive refractive power and is made of glass. An object-side surface 562 thereof, which faces the object side, is a convex aspheric surface, and an image-side surface 564 thereof, which faces the image side, is a convex aspheric surface.

The infrared rays filter 580 is made of glass and between the sixth lens 560 and the image plane 590. The infrared rays filter 580 gives no contribution to the focal length of the system.

The optical imaging lens assembly 501 of the fifth embodiment has the following parameters, which are FWT1=3.5073 mm; FWT2=3.4943 mm; and FWT1/FST=1.0080, wherein FWT1 is a focal length of the system at the first working temperature of 70° C., and FWT2 is a focal length of the system at the second working temperature of 50° C.

The optical imaging lens assembly 501 of the fifth embodiment has the following parameters, which are: BHOS=3.6007 mm; BHOS1=3.6237 mm; |BHOS1−BHOS|=0.023 mm, and |BHOS1−BHOS|/BHOS=0.0064, wherein BHOS is a distance on the optical axis between the image plane and the object-side surface of the lens, which is nearest to the image plane at 25° C., and BHOS1 is a distance on the optical axis between the image plane and the object-side surface of the lens, which is nearest to the image plane, at the first working temperature of 70° C.

The optical imaging lens assembly 501 of the fifth embodiment has the following parameters, which are: BHOS=3.6007 mm; BHOS2=3.6157 mm; and |BHOS2−BHOS|=0.015 mm, wherein BHOS is a distance on the optical axis between the image plane and the object-side surface of the lens, which is nearest to the image plane at 25° C., and BHOS2 is a distance on the optical axis between the image plane and the object-side surface of the lens, which is nearest to the image plane, at the second working temperature of 50° C.

The first positioning member PE1 is made of aluminum and the second positioning member PE2 is made of polycarbonate (PC), and the optical image capturing system of the fifth embodiment has the following parameters, which are: LPE1=6.9110 mm, and LPE2=18.7790 mm, wherein LPE1 is a length of an outer wall of the first positioning element PE1 in parallel with the optical axis at 25° C., and LPE2 is a length of an outer wall of the second positioning element PE2 in parallel with the optical axis at 25° C. The optical imaging lens assembly 501 includes three spacers, the spacer SP1 is disposed between the second lens 520 and the third lens 530, the spacer SP2 is disposed between the third lens 530 and the fifth lens 550, and the spacer SP3 is disposed between the fifth lens 550 and the sixth lens 560. These spacers are made of aluminum. A length (thickness) of the outermost side of the spacer SP1 in parallel with the optical axis is 2.194 mm. A length (thickness) of the outermost side of the spacer SP2 in parallel with the optical axis is 0.72 mm. A length (thickness) of the outermost side of the spacer SP3 in parallel with the optical axis is 2.716 mm.

The optical image capturing system of the fifth embodiment further satisfies: DL=α*(70° C.−25° C.)=0.0218 mm; |BHOS1−BHOS|/α=47.5433; and |BHOS1−BHOS|/DL=1.0565, wherein CES1 is a thermal expansion coefficient of the material of the first positioning element PE1, α is the product of LPE1 and CES1, and DL is a thermal expansion length variation of the first positioning element PE1 at the first working temperature of 70° C.

The parameters of the lenses of the fifth embodiment are listed in Table 9 and Table in

TABLE 9

The parameters of the lenses of the fifth embodiment
FST = 3.4793 mm; FST/HEP = 2.8; HAF = 68.6529 deg

| Surface | Radius of curvature | | Thickness (mm) | Material | Refractive index | Abbe number | Focal length |
|---|---|---|---|---|---|---|---|
| 0 | Object plane | 1E+18 | 900 | | | | |
| 1 | 1$^{st}$ lens | 13 | 2.754 | glass | 2.001 | 25.44 | −4.39488 |
| 2 | | 2.952070766 | 2.468 | | | | |
| 3 | 2$^{nd}$ lens | −5.546404476 | 3.983 | glass | 1.883 | 40.77 | −687.195 |
| 4 | | −7.486861809 | 0.050 | | | | |
| 5 | 3$^{rd}$ lens | 5.000015664 | 2.986 | glass | 1.762 | 26.56 | 10.2341 |
| 6 | | 10.20357283 | 0.776 | | | | |
| 7 | Aperture plane | 1E+18 | 0.443 | | | | |
| 8 | 4$^{th}$ lens | 6.560763148 | 2.782 | glass | 1.593 | 68.53 | 3.55102 |
| 9 | | −2.619894698 | 0.001 | | | | |
| 10 | 5$^{th}$ lens | −2.619894698 | 0.600 | glass | 1.808 | 22.69 | −3.47668 |
| 11 | | −38.61839065 | 1.272 | | | | |
| 12 | 6$^{th}$ lens | 5.190511432 | 2.845 | glass | 1.511 | 57.12 | 8.68356 |
| 13 | | −25.45784856 | 0.181 | | | | |
| 14 | Infrared rays filter plane | 1E+18 | 0.800 | BK_7 | 1.517 | 64.13 | |
| 15 | | 1E+18 | 2.620 | | | | |
| 16 | | 1E+18 | 0.000 | | | | |
| 17 | Image plane | 1E+18 | 0.000 | | | | |

Reference wavelength (d-line): 555 nm; shield position: the clear aperture of the fourth surface is 2.395 mm; the clear aperture of the eleventh surface is 2.075 mm; the clear aperture of the twelfth surface is 3.309 mm
Values of refractive index of each lens relative to air in different working temperature ranges: dn/dt
(unit: 10$^{-6}$/° C., Reference wavelength: d-line)

| Lens number | Material code | Temperature (° C.) | | | | | |
|---|---|---|---|---|---|---|---|
| | | −40° C.~−20° C. | −20° C.~0° C. | 0° C.~20° C. | 20° C.~40° C. | 40° C.~60° C. | 60° C.~80° C. |
| 1$^{st}$ lens | H-ZLaF90 | 2.3 | 2.8 | 3.1 | 3.5 | 3.9 | 4.0 |
| 2$^{nd}$ lens | H-ZLaF68B | 3.0 | 3.4 | 3.6 | 3.8 | 4.1 | 3.8 |
| 3$^{rd}$ lens | ZF12 | 6.2 | 6.7 | 7.6 | 7.6 | 8.0 | 8.4 |

TABLE 9-continued

The parameters of the lenses of the fifth embodiment
FST = 3.4793 mm; FST/HEP = 2.8; HAF = 68.6529 deg

| 4$^{th}$ lens | H-ZPK5 | −7.1 | −7.3 | −7.3 | −7.4 | −7.5 | −7.4 |
| 5$^{th}$ lens | H-ZF71 | −2.4 | −2.3 | −2.1 | −1.9 | −1.6 | −1.5 |

| Lens | Material | Temperature (° C.) | | | | | |
| --- | --- | --- | --- | --- | --- | --- | --- |
| number | code | −10° C.~0° C. | 0° C.~10° C. | 10° C.~25° C. | 25° C.~40° C. | 40° C.~55° C. | 55° C.~70° C. |
| 6$^{th}$ lens | F4520 | −110.0 | −110.0 | −100.0 | −113.3 | −106.7 | −120.0 |

TABLE 10

Coefficients of the aspheric surfaces of fifth embodiment
TABLE 10: Coefficients of the aspheric surfaces

| | surface | | | | | |
| --- | --- | --- | --- | --- | --- | --- |
| | 1 | 2 | 3 | 4 | 5 | 6 |
| k = | 0.000000E+00 | 0.000000E+00 | 0.000000E+00 | 0.000000E+00 | 0.000000E+00 | 0.000000E+00 |
| A4 = | 0.000000E+00 | 0.000000E+00 | 0.000000E+00 | 0.000000E+00 | 0.000000E+00 | 0.000000E+00 |
| A6 = | 0.000000E+00 | 0.000000E+00 | 0.000000E+00 | 0.000000E+00 | 0.000000E+00 | 0.000000E+00 |
| A8 = | 0.000000E+00 | 0.000000E+00 | 0.000000E+00 | 0.000000E+00 | 0.000000E+00 | 0.000000E+00 |
| A10 = | 0.000000E+00 | 0.000000E+00 | 0.000000E+00 | 0.000000E+00 | 0.000000E+00 | 0.000000E+00 |
| A12 = | 0.000000E+00 | 0.000000E+00 | 0.000000E+00 | 0.000000E+00 | 0.000000E+00 | 0.000000E+00 |

| | surface | | | | | |
| --- | --- | --- | --- | --- | --- | --- |
| | 8 | 9 | 10 | 11 | 12 | 13 |
| k = | 0.000000E+00 | 0.000000E+00 | 0.000000E+00 | 0.000000E+00 | −4.219237E−01 | −2.000000E+02 |
| A4 = | 0.000000E+00 | 0.000000E+00 | 0.000000E+00 | 0.000000E+00 | −2.981548E−03 | −3.030994E−03 |
| A6 = | 0.000000E+00 | 0.000000E+00 | 0.000000E+00 | 0.000000E+00 | 1.563789E−04 | 1.893412E−04 |
| A8 = | 0.000000E+00 | 0.000000E+00 | 0.000000E+00 | 0.000000E+00 | −2.149746E−05 | −2.084493E−05 |
| A10 = | 0.000000E+00 | 0.000000E+00 | 0.000000E+00 | 0.000000E+00 | 1.469726E−06 | 1.120971E−06 |
| A12 = | 0.000000E+00 | 0.000000E+00 | 0.000000E+00 | 0.000000E+00 | −5.859479E−08 | −3.410962E−08 |

An equation of the aspheric surfaces of the fifth embodiment is the same as that of the first embodiment, and the definitions are the same as well.

The exact parameters of the fifth embodiment based on Table 9 and Table 10 are listed in the following table:

| Fifth embodiment (Reference wavelength: 555 nm) | | | | | |
| --- | --- | --- | --- | --- | --- |
| |FST/f1| | |FST/f2| | |FST/f3| | |FST/f4| | |FST/f5| | |FST/f6| |
| 0.79168 | 0.00506 | 0.33997 | 0.97981 | 1.00076 | 0.40068 |
| ΣPPR | ΣNPR | ΣPPR/\|ΣNPR\| | IN12/f | IN56/f | TP4/(IN34 + TP4 + IN45) |
| 2.77224 | 0.74572 | 3.71756 | 0.70936 | 0.36560 | 0.69512 |
| \|f1/f2\| | \|f2/f3\| | (TP1 + IN12)/TP2 | | (TP6 + IN56)/TP5 | |

| Fifth embodiment (Reference wavelength: 555 nm) | | | | | |
| --- | --- | --- | --- | --- | --- |
| 0.00640 | 67.14758 | 1.31099 | | 6.86125 | |
| HOS | InTL | HOS/HOI | InS/HOS | ODT % | TDT % |
| 24.56100 | 20.96030 | 6.54960 | 0.46999 | −57.86460 | 39.58230 |
| HVT51 | HVT52 | HVT61 | HVT62 | HVT62/HOI | HVT62/HOS |
| 0 | 0 | 0.00000 | 0.00000 | 0.00000 | 0.00000 |
| TP2/TP3 | TP3/TP4 | InRS61 | InRS62 | \|InRS61\|/TP6 | \|InRS62\|/TP6 |
| 1.33408 | 1.07326 | 0.79446 | −0.62773 | 0.27928 | 0.22067 |

The results of the equations of the fifth embodiment based on Table 9 and Table 10 are listed in the following table:

| Values related to the inflection points of the fifth embodiment (Reference wavelength: 555 nm) | | | | | | | |
| --- | --- | --- | --- | --- | --- | --- | --- |
| HIF111 | 0 | HIF111/HOI | 0 | SGI111 | 0 | \|GI111\|/(\|I111/HO\| + TP1) | 0 |

Values related to the lengths of the outline curves of the fifth embodiment based on Table 9 and Table 10 are listed in the following table:

Values related to the inflection points of the fifth embodiment
(Reference wavelength: 555 nm)

| ARE | ½(HEP) | ARE value | ARE − ½(HEP) | 2(ARE/HEP) % | TP | ARE/TP (%) |
|---|---|---|---|---|---|---|
| 11 | 0.622 | 0.622 | 0.00024 | 100.04% | 2.754 | 22.59% |
| 12 | 0.622 | 0.627 | 0.00470 | 100.76% | 2.754 | 22.76% |
| 21 | 0.622 | 0.623 | 0.00131 | 100.21% | 3.983 | 15.65% |
| 22 | 0.622 | 0.623 | 0.00072 | 100.12% | 3.983 | 15.63% |
| 31 | 0.622 | 0.624 | 0.00162 | 100.26% | 2.986 | 20.89% |
| 32 | 0.622 | 0.622 | 0.00039 | 100.06% | 2.986 | 20.84% |
| 41 | 0.622 | 0.623 | 0.00094 | 100.15% | 2.782 | 22.39% |
| 42 | 0.622 | 0.628 | 0.00600 | 100.96% | 2.782 | 22.57% |
| 51 | 0.622 | 0.628 | 0.00600 | 100.96% | 0.600 | 104.67% |
| 52 | 0.622 | 0.622 | 0.00003 | 100.00% | 0.600 | 103.67% |
| 61 | 0.622 | 0.623 | 0.00145 | 100.23% | 2.845 | 21.92% |
| 62 | 0.622 | 0.622 | 0.00007 | 100.01% | 2.845 | 21.87% |

| ARS | EHD | ARS value | ARS − EHD | (ARS/EHD) % | TP | ARS/TP (%) |
|---|---|---|---|---|---|---|
| 11 | 5.494 | 5.671 | 0.177 | 103.23% | 2.754 | 205.92% |
| 12 | 2.580 | 3.137 | 0.557 | 121.60% | 2.754 | 113.90% |
| 21 | 2.395 | 2.476 | 0.081 | 103.40% | 3.983 | 62.17% |
| 22 | 2.724 | 2.788 | 0.064 | 102.34% | 3.983 | 69.99% |
| 31 | 2.479 | 2.593 | 0.114 | 104.60% | 2.986 | 86.83% |
| 32 | 1.611 | 1.617 | 0.006 | 100.39% | 2.986 | 54.15% |
| 41 | 1.553 | 1.568 | 0.015 | 100.94% | 2.782 | 56.36% |
| 42 | 1.797 | 1.980 | 0.183 | 110.18% | 2.782 | 71.18% |
| 51 | 1.796 | 1.979 | 0.182 | 110.16% | 0.600 | 329.81% |
| 52 | 2.075 | 2.076 | 0.001 | 100.05% | 0.600 | 346.00% |
| 61 | 3.309 | 3.421 | 0.112 | 103.39% | 2.845 | 120.27% |
| 62 | 3.514 | 3.589 | 0.075 | 102.13% | 2.845 | 126.16% |

Sixth Embodiment

Figure 6A:
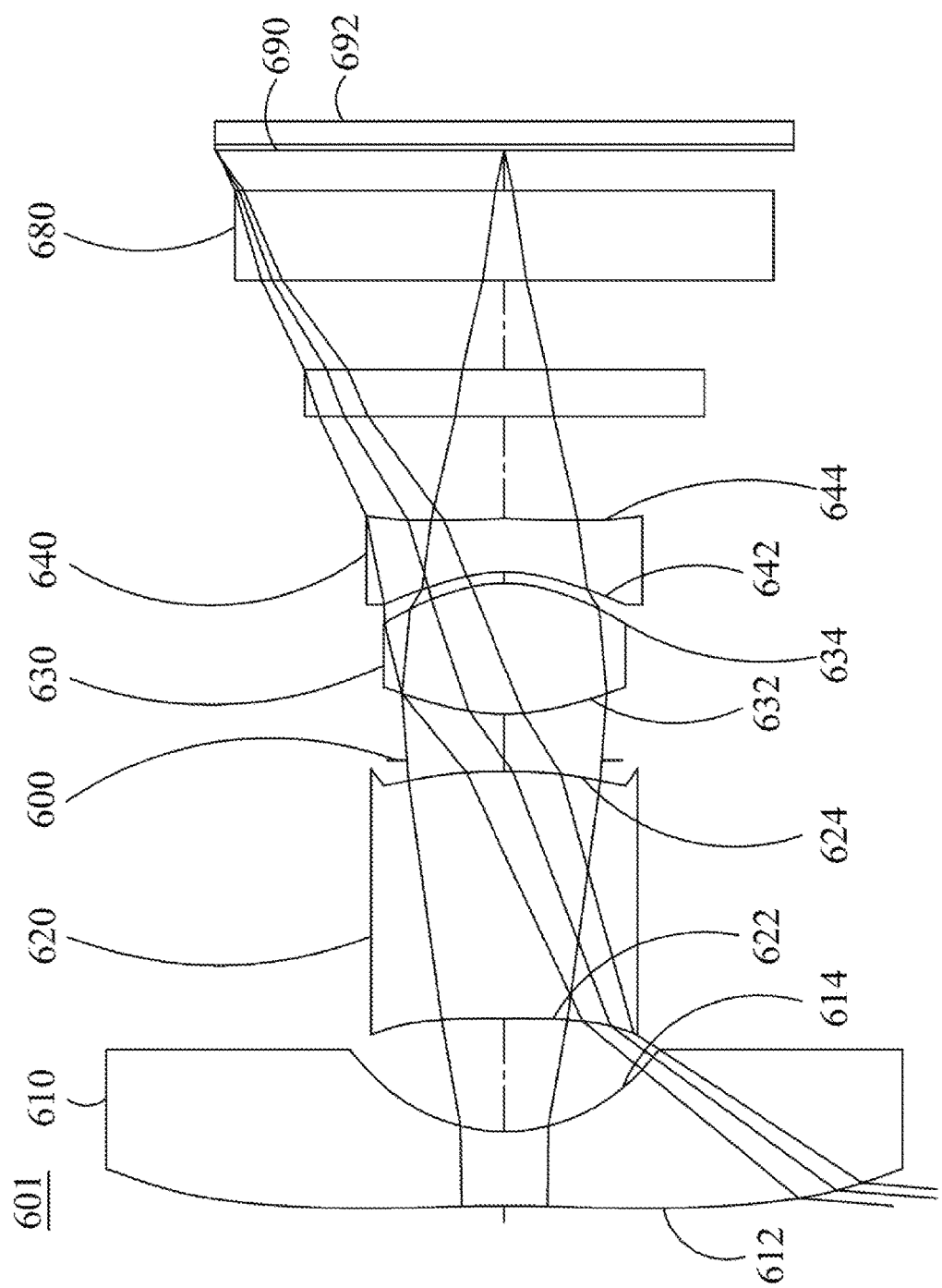
FIG. 6A is a schematic diagram of an optical imaging lens assembly of an optical image capturing system of a sixth embodiment of the present invention.
Figure 6B:
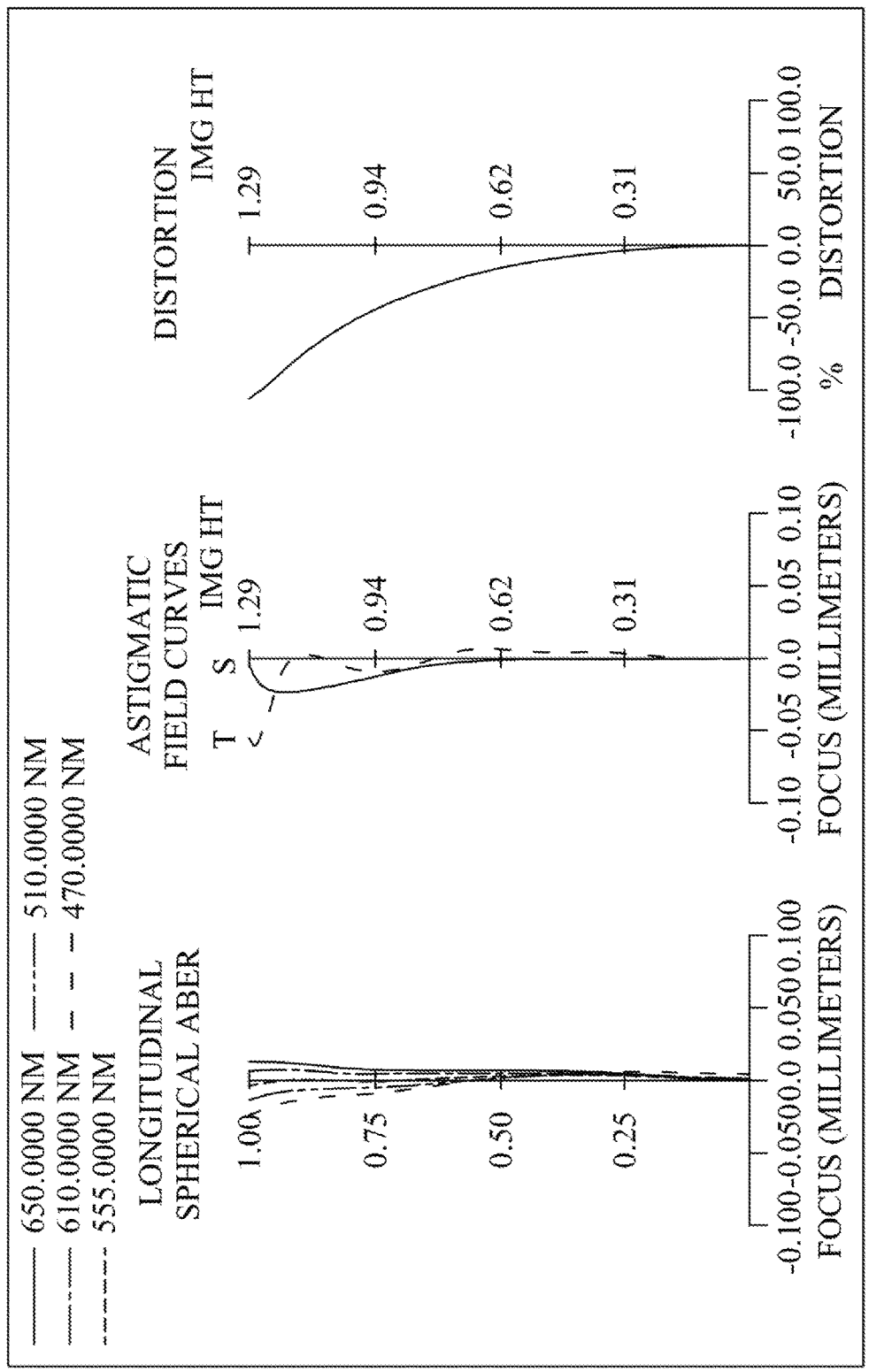
FIG. 6B shows curve diagrams of longitudinal spherical aberration, astigmatic field, and optical distortion of the optical image capturing system in the order from left to right, in accordance with the sixth embodiment of the present application.
Figure 6D:
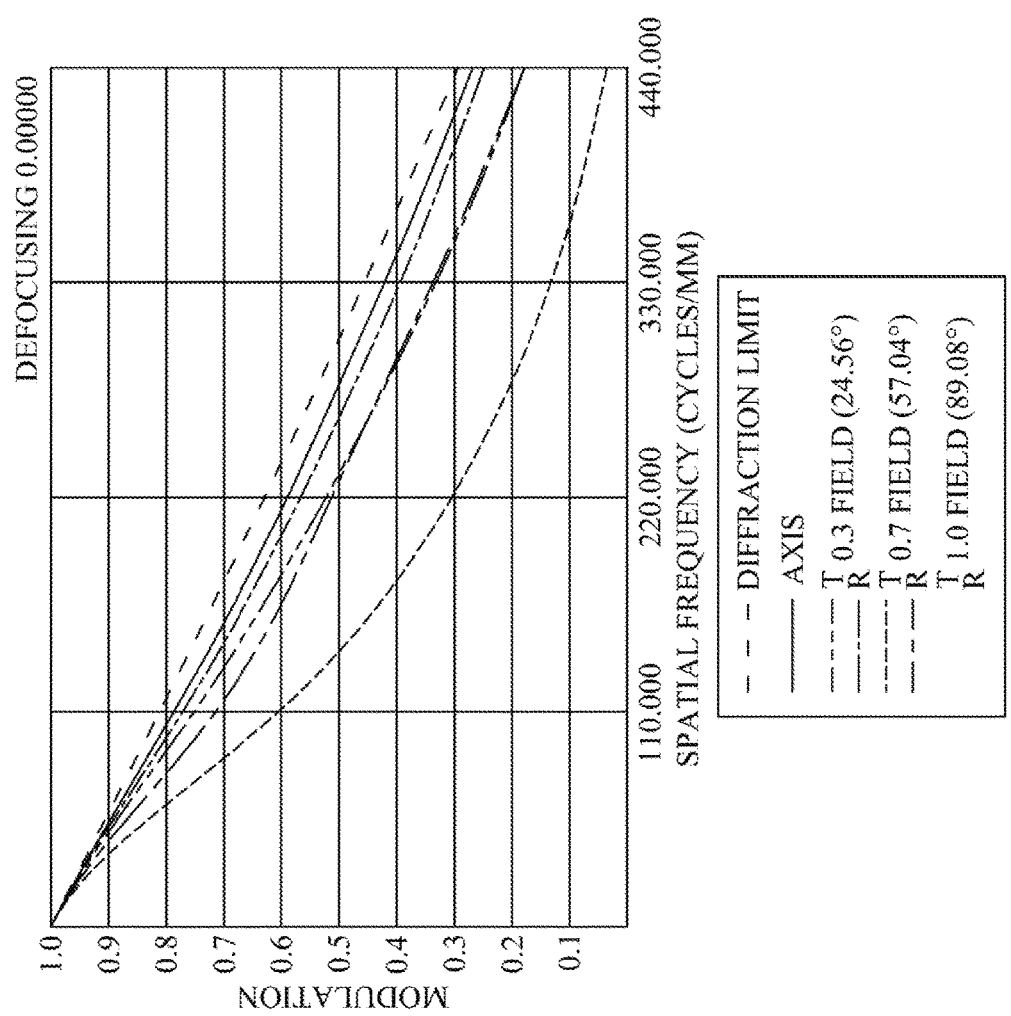
FIG. 6D shows a feature map of modulation transformation of the optical image capturing system of the sixth embodiment of the present invention in visible spectrum.

The following refers to FIGS. 6A through 6D. FIG. 6A is a schematic diagram of an optical imaging lens assembly of an optical image capturing system of a sixth embodiment of the present invention; FIG. 6B shows curve diagrams of longitudinal spherical aberration, astigmatic field, and optical distortion of the optical image capturing system in the order from left to right of the sixth embodiment of the present application; FIG. 6C is a schematic diagram of an assembly of a first positioning element and the optical imaging lens assembly of the sixth embodiment of the present invention; and FIG. 6D shows a feature map of modulation transformation of the optical image capturing system of the sixth embodiment of the present invention in visible spectrum. As shown in FIG. 6A, The optical imaging lens assembly 601 of the sixth embodiment includes, along an optical axis from an object side to an image side, a first lens 610, a second lens 620, an aperture 600, a third lens 630, a fourth lens 640, an infrared rays filter 680, an image plane 690, and an image sensor 692.

The first lens 610 has negative refractive power and is made of plastic. An object-side surface 612 thereof, which faces the object side, is a concave aspheric surface, and an image-side surface 614 thereof, which faces the image side, is a concave aspheric surface. The object-side surface 612 has an inflection point.

The second lens 620 has positive refractive power and is made of plastic. An object-side surface 622 thereof, which faces the object side, is a concave aspheric surface, and an image-side surface 624 thereof, which faces the image side, is a convex aspheric surface.

The third lens 630 has positive refractive power and is made of plastic. An object-side surface 632 thereof, which faces the object side, is a convex aspheric surface, and an image-side surface 634 thereof, which faces the image side, is a convex aspheric surface.

The fourth lens 640 has negative refractive power and is made of plastic. An object-side surface 642 thereof, which faces the object side, is a concave aspheric surface, and an image-side surface 644 thereof, which faces the image side, is a convex aspheric surface.

The infrared rays filter 680 is made of glass and between the fourth lens 640 and the image plane 690. The infrared rays filter 680 gives no contribution to the focal length of the system.

The optical imaging lens assembly 601 of the sixth embodiment has the following parameters, which are FWT1=0.8761 mm; FWT2=0.8701 mm; and FWT1/FST=1.0174, wherein FWT1 is a focal length of the system at the first working temperature of 70° C., and FWT2 is a focal length of the system at the second working temperature of 50° C.

The optical imaging lens assembly 601 of the sixth embodiment has the following parameters, which are: BHOS=1.6406 mm; BHOS1=1.6616 mm; |BHOS1−BHOS|=0.021 mm, and |BHOS1−BHOS|/BHOS=0.0128, wherein BHOS is a distance on the optical axis between the image plane and the object-side surface of the lens, which is nearest to the image plane at 25° C., and BHOS1 is a distance on the optical axis between the image plane and the object-side surface of the lens, which is nearest to the image plane, at the first working temperature of 70° C.

The optical imaging lens assembly 601 of the sixth embodiment has the following parameters, which are: BHOS=1.6406 mm; BHOS2=1.6516 mm; and |BHOS2−BHOS|=0.011 mm, wherein BHOS is a distance on the optical axis between the image plane and the object-side surface of the lens, which is nearest to the image plane at 25° C., and BHOS2 is a distance on the optical axis between the image plane and the object-side surface of the lens, which is nearest to the image plane, at the second working temperature of 50° C.

The first positioning member PE1 and the second positioning member PE2 are made of polycarbonate (PC), and the optical image capturing system of the sixth embodiment has the following parameters, which are: LPE1=6.3380 mm, LPE2=3.4290 mm, wherein LPE1 is a length of an outer wall of the first positioning element PE1 in parallel with the optical axis at 25° C., and LPE2 is a length of an outer wall of the second positioning element PE2 in parallel with the optical axis at 25° C.

The optical image capturing system of the sixth embodiment further satisfies: DL=α*(70° C.−25° C.)=0.02 mm; |BHOS1−BHOS|/α=47.3335; and |BHOS1−BHOS|/DL=1.0519, wherein CES1 is a thermal expansion coefficient of the material of the first positioning element PE1, α is the product of LPE1 and CES1, and DL is a thermal expansion length variation of the first positioning element PE1 at the first working temperature of 70° C.

The parameters of the lenses of the sixth embodiment are listed in Table 11 and Table 12.

TABLE 11

The parameters of the lenses of the sixth embodiment
FST = 2.41135 mm; FST/HEP = 2.22; HAF = 36 deg

| surfaces # | | Radius of curvature | Thickness (mm) | Material | Refractive index | Abbe number | Focal length (mm) |
|---|---|---|---|---|---|---|---|
| 0 | Object plane infinity | 1E+18 | 600 | | | | |
| 1 | 1$^{st}$ lens | −5.363613438 | 0.331 | plastic | 1.545 | 55.961 | −1.12988 |
| 2 | | 0.711941781 | 0.501 | | | | |
| 3 | 2$^{nd}$ lens | −8.263307468 | 1.100 | | 1.642 | 22.455 | 5.96234 |
| 4 | | −2.769365156 | 0.050 | plastic | | | |
| 5 | Aperture plane | 1E+18 | 0.207 | | | | |
| 6 | 3$^{rd}$ lens | 0.854500552 | 0.584 | plastic | 1.545 | 55.961 | 0.724805 |
| 7 | | −0.558945876 | 0.050 | | | | |
| 8 | 4$^{th}$ lens | −0.553573254 | 0.236 | plastic | 1.642 | 22.455 | −1.14569 |
| 9 | | −2.545571391 | 0.456 | | | | |
| 10 | Infrared rays filter plane | 1E+18 | 0.210 | BK_7 | 1.517 | 64.13 | |
| 11 | | 1E+18 | 0.396 | | | | |
| 12 | Infrared rays filter plane | 1E+18 | 0.400 | BK_7 | 1.517 | 64.13 | |
| 13 | | 1E+18 | 0.178 | | | | |
| 14 | Imagez plane | 1E+18 | 0.000 | | | | |

Reference wavelength (d-line): 555 nm; shield position: the clear aperture of the third surface is 0.552 mm; the clear aperture of the seventh surface is 0.502 mm; the clear aperture of the eighth surface is 0.499 mm
Values of refractive index of each lens relative to air in different working temperature ranges: dn/dt
(unit: $10^{-6}/°$ C., Reference wavelength: d-line)

| Lens number | Material code | Temperature (° C.) | | | | | |
|---|---|---|---|---|---|---|---|
| | | 10° C.~20° C. | 20° C.~30° C. | 30° C.~40° C. | 40° C.~50° C. | 50° C.~60° C. | 60° C.~70° C. |
| 1$^{st}$ lens | 5014CL | −96.0 | −97.0 | −102.0 | −102.0 | −103.0 | −103.0 |
| 3$^{rd}$ lens | 5014CL | −96.0 | −97.0 | −102.0 | −102.0 | −103.0 | −103.0 |
| 2$^{nd}$ lens | OKP1 | −80.0 | −110.0 | −110.0 | −140.0 | −150.0 | −120.0 |
| 4$^{th}$ lens | OKP1 | −80.0 | −110.0 | −110.0 | −140.0 | −150.0 | −120.0 |

TABLE 12

Coefficients of the aspheric surfaces of the sixth embodiment
TABLE 12 Coefficients of the aspheric surfaces

| | surface | | | | | |
|---|---|---|---|---|---|---|
| | 1 | 2 | 3 | 4 | 6 | 7 |
| k = | −2.607698E+01 | −1.816637E+00 | 1.708498E+02 | 1.557436E+01 | −1.808118E+00 | −2.505006E+00 |
| A4 = | 2.378338E−01 | 6.395066E−01 | −4.883793E−01 | −6.320153E−01 | −5.524492E−01 | 7.400462E−01 |
| A6 = | −3.389929E−01 | 1.464898E+00 | −9.328574E−02 | 2.513579E+00 | 3.204509E+00 | −5.964003E+00 |
| A8 = | 3.094579E−01 | −1.646253E+01 | −9.781808E−01 | −6.521371E+00 | −3.048307E+01 | 9.697633E+00 |
| A10 = | −1.717778E−01 | 1.006910E+02 | 4.011857E+00 | 1.620456E+01 | 2.448900E+02 | 1.036501E+02 |
| A12 = | 5.706804E−02 | −3.736760E+02 | 3.197411E−19 | −4.961959E−19 | −1.243961E+03 | −8.523414E+02 |
| A14 = | −1.042602E−02 | 7.251352E+02 | −2.490499E−22 | 2.854774E−22 | 3.340361E+03 | 2.619806E+03 |
| A16 = | 8.068330E−04 | −5.479885E+02 | 2.531377E−25 | −5.508137E−26 | −3.616847E+03 | −2.965546E+03 |

| | surface | |
|---|---|---|
| | 8 | 9 |
| k = | −1.616549E+00 | 4.226397E+00 |
| A4 = | 2.751917E+00 | 1.512948E+00 |
| A6 = | −1.412066E+01 | −3.677822E+00 |
| A8 = | 2.554096E+01 | 1.370159E+00 |
| A10 = | 1.925732E+02 | 4.821261E+01 |
| A12 = | −1.740792E+03 | −2.710777E+02 |
| A14 = | 5.643507E+03 | 6.643953E+02 |
| A16 = | −6.700631E+03 | −6.249709E+02 |

An equation of the aspheric surfaces of the sixth embodiment is the same as that of the first embodiment, and the definitions are the same as well.

The exact parameters of the sixth embodiment based on Table 11 and Table 12 are listed in the following table:

| The sixth embodiment (Reference wavelength: 555 nm) | | | | | |
|---|---|---|---|---|---|
| InRS41 | InRS42 | HVT41 | HVT42 | ODT % | TDT % |
| −0.14363 | 0.01237 | 0.00000 | 0.31027 | −97.67690 | 97.67690 |
| \|FST/f1\| | \|FST/f2\| | \|FST/f3\| | \|FST/f4\| | \|f1/f2\| | \|f2/f3\| |
| 0.76213 | 0.14443 | 1.18806 | 0.75161 | 0.18950 | 8.22613 |
| ΣPPR | ΣNPR | ΣPPR/\|ΣNPR\| | ΣPP | ΣNP | f1/ΣPP |
| 1.33249 | 1.51374 | 0.88026 | 6.68715 | −2.27557 | 0.89161 |
| f1/ΣNP | IN12/f | IN23/f | IN34/f | TP3/f | TP4/f |
| 0.49653 | 0.58206 | 0.29900 | 0.05806 | 0.67775 | 0.27422 |
| InTL | HOS | HOS/HOI | InS/HOS | InTL/HOS | ΣTP/InTL |
| 3.05937 | 4.70000 | 3.76000 | 0.57827 | 0.65093 | 0.73566 |
| (TP1 + IN12)/TP2 | (TP4 + IN34)/TP3 | TP1/TP2 | TP3/TP4 | | IN23/(TP2 + IN23 + TP3) |
| 0.75623 | 0.49028 | 0.30064 | 2.47155 | | 0.13263 |
| \|InRS41\|/TP4 | \|InRS42\|/TP4 | HVT42/HOI | HVT42/HOS | | |
| 0.6083 | 0.0524 | 0.2482 | 0.0660 | | |

The results of the equations of the sixth embodiment based on Table 11 and Table 12 are listed in the following table:

| Values related to the inflection points of the sixth embodiment (Reference wavelength: 555 nm) | | | | | | |
|---|---|---|---|---|---|---|
| HIF111 | 0.2798 | HIF111/HOI | 0.2238 | SGI311 | −0.0059 | \|0.0059\|/(.0059)相\|+ TP3) | 0.0174 |
| HIF421 | 0.1626 | HIF421/HOI | 0.1300 | SGI421 | −0.0042 | \|SGI421I\|/(\|SGI421I\| + TP4) | 0.0176 |

Values related to the lengths of the outline curves of the sixth embodiment based on Table 11 and Table 12 are listed in the following table:

| Sixth embodiment (Reference wavelength: 555 nm) | | | | | | |
|---|---|---|---|---|---|---|
| ARE | ½(HEP) | ARE value | ARE − ½(HEP) | 2(ARE/HEP) % | TP | ARE/TP (%) |
| 11 | 0.179 | 0.179 | −0.000469 | 99.74% | 0.331 | 54.13% |
| 12 | 0.179 | 0.181 | 0.001454 | 100.81% | 0.331 | 54.71% |
| 21 | 0.179 | 0.179 | −0.000470 | 99.74% | 1.100 | 16.27% |
| 22 | 0.179 | 0.179 | −0.000334 | 99.81% | 1.100 | 16.29% |
| 31 | 0.179 | 0.180 | 0.000701 | 100.39% | 0.584 | 30.88% |
| 32 | 0.179 | 0.182 | 0.002140 | 101.19% | 0.584 | 31.12% |
| 41 | 0.179 | 0.181 | 0.001918 | 101.07% | 0.236 | 76.83% |
| 42 | 0.179 | 0.179 | −0.000414 | 99.77% | 0.236 | 75.84% |
| ARS | EHD | ARS value | ARS − EHD | (ARS/EHD) % | TP | ARS/TP (%) |
| 11 | 1.649 | 1.672 | 0.023095 | 101.40% | 0.331 | 505.46% |
| 12 | 0.641 | 0.766 | 0.124456 | 119.40% | 0.331 | 231.56% |
| 21 | 0.552 | 0.560 | 0.007637 | 101.38% | 1.100 | 50.86% |
| 22 | 0.401 | 0.403 | 0.002142 | 100.53% | 1.100 | 36.63% |
| 31 | 0.481 | 0.495 | 0.014521 | 103.02% | 0.584 | 84.89% |
| 32 | 0.502 | 0.540 | 0.038819 | 107.74% | 0.584 | 92.60% |
| 41 | 0.499 | 0.522 | 0.023752 | 104.76% | 0.236 | 221.27% |
| 42 | 0.571 | 0.572 | 0.000982 | 100.17% | 0.236 | 242.33% |

Figure 7A:
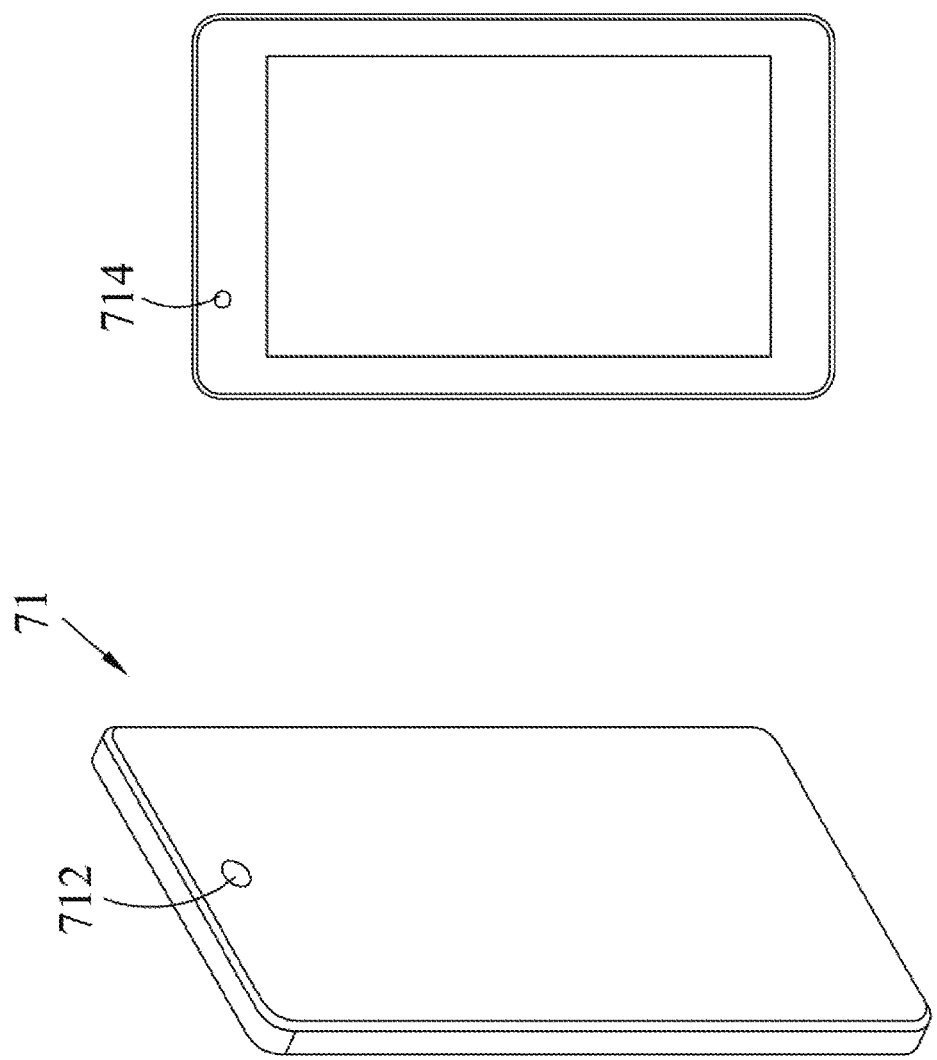
FIG. 7A shows a schematic view of the optical image capturing system applied to a mobile communication device, in accordance with the present invention.
Figure 7B:
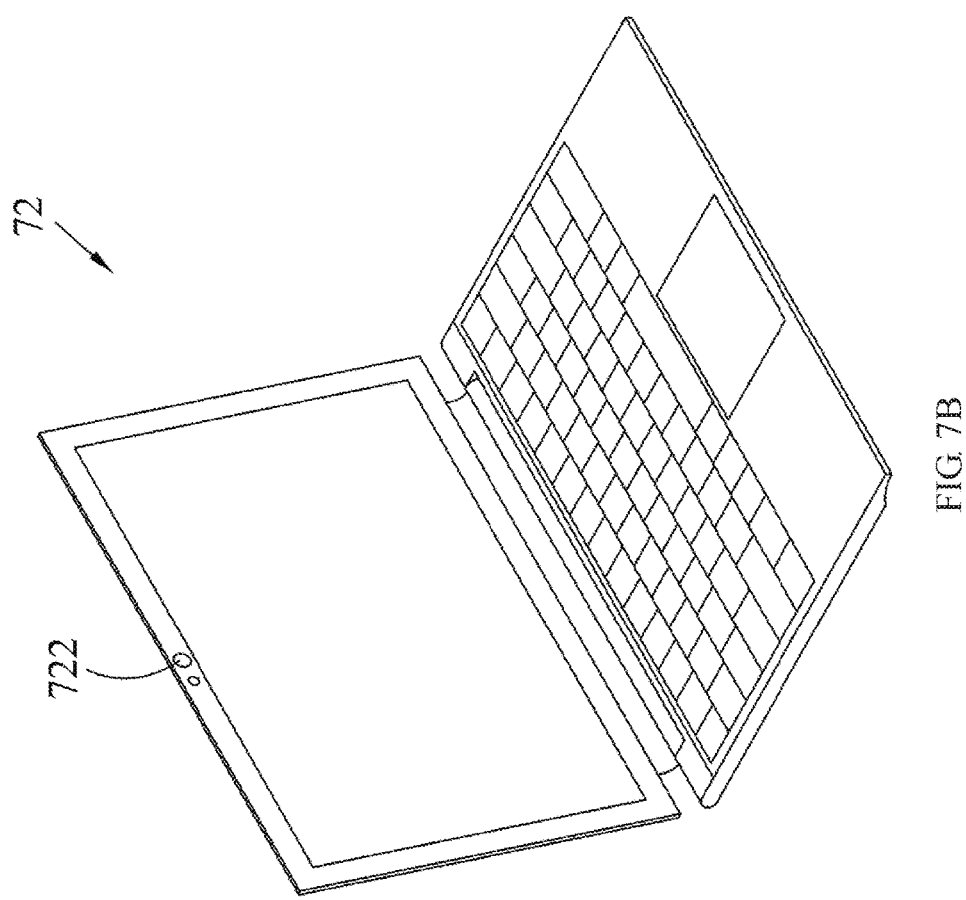
FIG. 7B shows a schematic view of the optical image capturing system applied to a mobile information device, in accordance with the present invention.
Figure 7C:
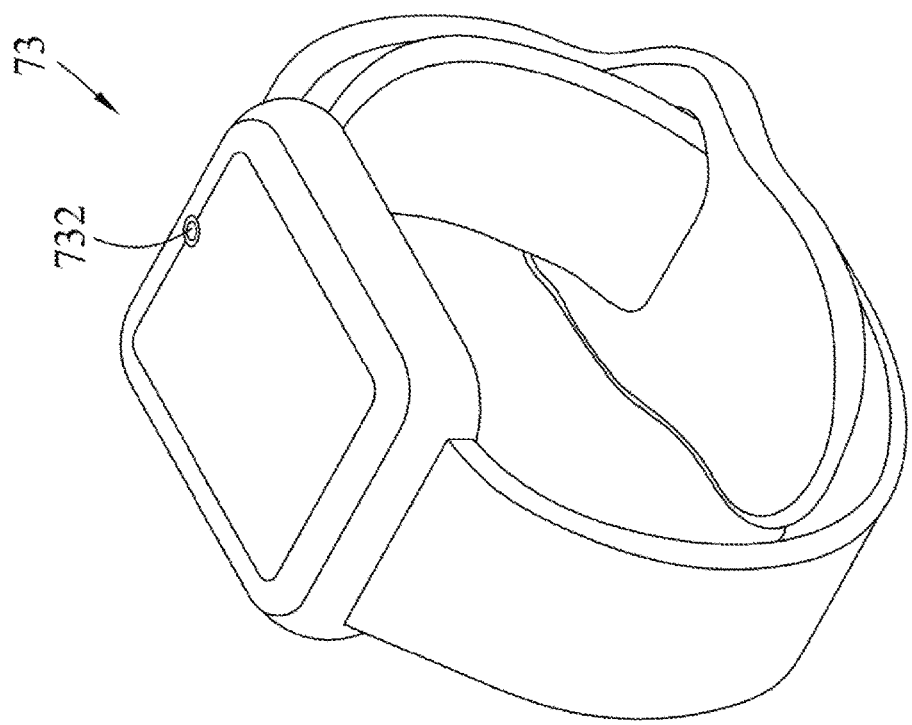
FIG. 7C shows a schematic view of the optical image capturing system applied to a smart watch, in accordance with the present invention.
Figure 7D:
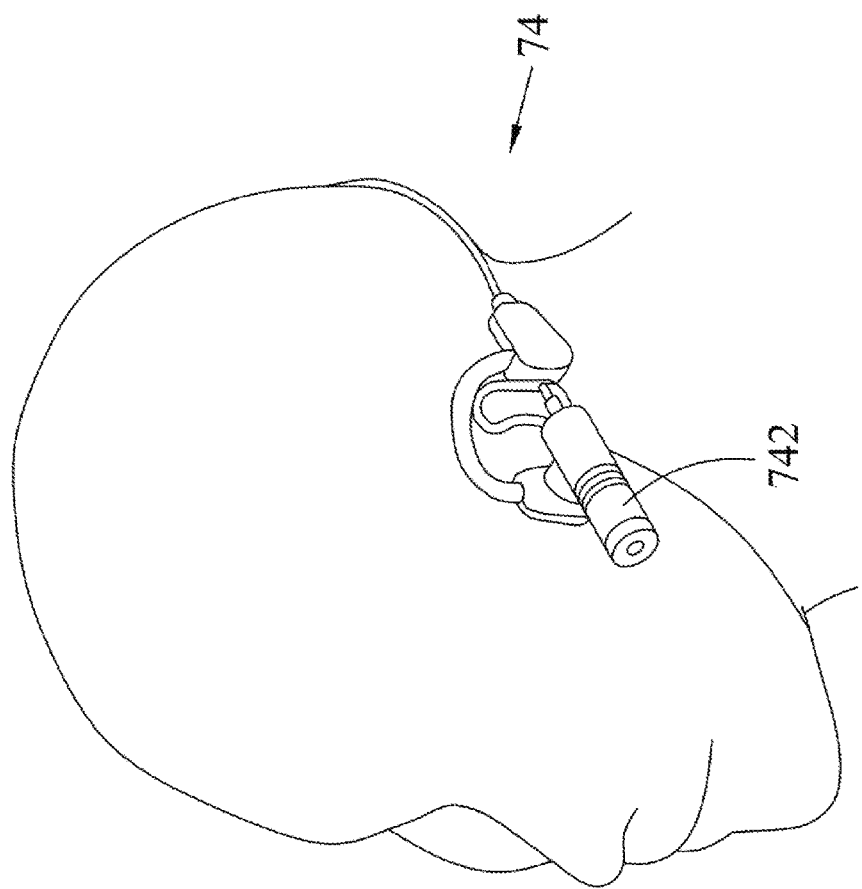
FIG. 7D shows a schematic view of the optical image capturing system applied to a smart head-mounted device, in accordance with the present invention.
Figure 7G:
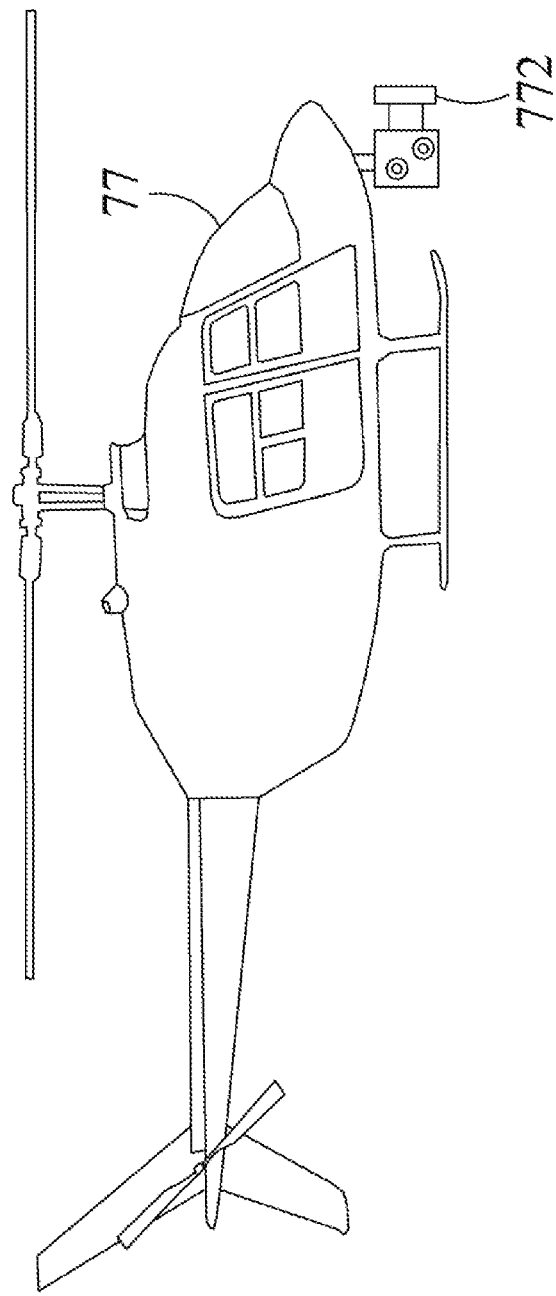
FIG. 7G shows a schematic view of the optical image capturing system applied to an unmanned aerial vehicle, in accordance with the present invention.
Figure 7H:
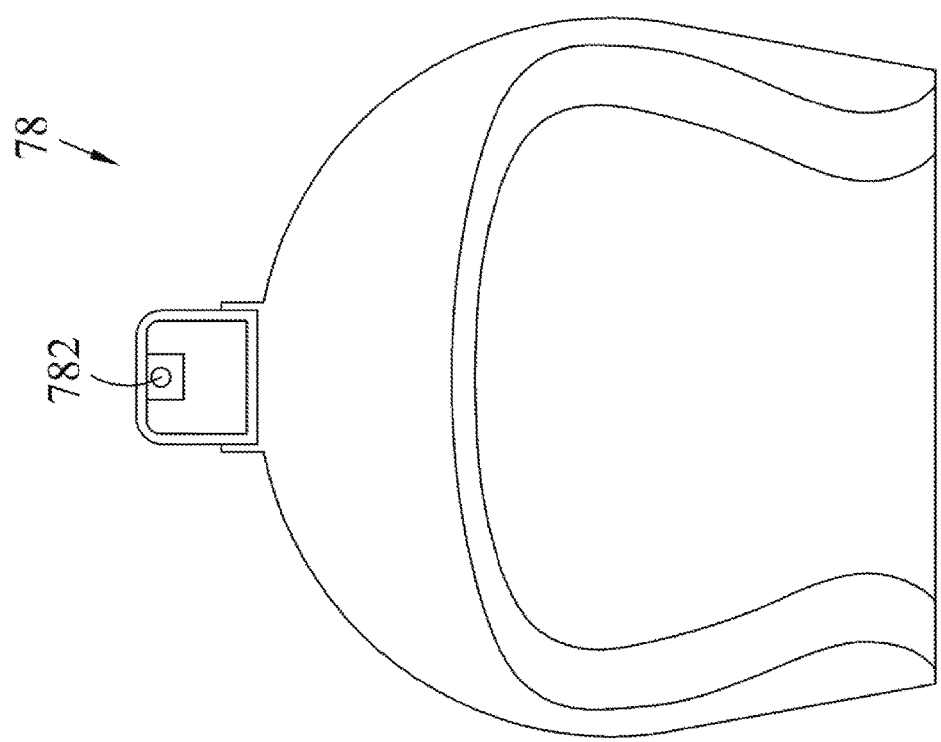
FIG. 7H shows a schematic view of the optical image capturing system applied to an extreme sport imaging device, in accordance with the present invention.

The optical image capturing system of the present invention may be applied to an electronic portable device, electronic wearable device, electronic monitoring device, electronic information device, electronic communication device, machine vision device or in-vehicle electronic device, or a combination thereof. The number and material of the lens of the lens group of the optical image capturing system may be adjusted upon demand, thereby achieving weatherability and providing high imaging quality. Please refer to FIGS. 7A through 7H. FIG. 7A shows that an optical image capturing system 712 and an optical image capturing system 714 of the present invention is applied to a mobile communication device 71, such as a smart phone. The optical image capturing system 714 serves as a front camera lens of the smart phone. FIG. 7B shows that an optical image capturing system 722 of the present invention is applied to a mobile information device 72, such as a notebook. FIG. 7C shows that an optical image capturing system 732 of the present invention is applied to a smart watch 73. FIG. 7D shows that an optical image capturing system 742 of the present invention is applied to a smart head-mounted device 74, such as a smart hat. FIG. 7E shows that an optical image capturing system 752 of the present invention is applied to a security monitoring device 75, such as an IP Cam. FIG. 7F shows that an optical image capturing system 762 of the present invention is applied to an in-vehicle imaging device 76. FIG. 7G shows that an optical image capturing system 772 of the present invention is applied to an unmanned aerial vehicle 77. FIG. 7H shows that an optical image capturing system 782 of the present invention is applied to an extreme sport imaging device 78.

It must be pointed out that the embodiments described above are only some embodiments of the present invention. All equivalent structures which employ the concepts disclosed in this specification and the appended claims should fall within the scope of the present invention.

What is claimed is:

1. An optical image capturing system, comprising:
    an optical imaging lens assembly comprising at least two lenses having refractive power; and
    an image plane;
    wherein each lens of the at least two lenses has an object-side surface, which faces an object side, and an image-side surface, which faces an image side;
    wherein at least one among the at least two lenses has positive refractive power, and the optical image capturing system satisfies: 1.0≤FST/HEP≤10.0; 0 deg<HAF≤150 deg; WT1≤100° C.; and BHOS1/BHOS≥0.9, wherein FST is a standard effective focal length of the optical imaging lens assembly at a standard temperature ST, HEP is an entrance pupil diameter of the optical imaging lens assembly, HAF is a half of the maximum field angle of the optical imaging lens assembly;

wherein under the standard temperature ST, HOS is a distance on the optical axis between the object-side surface of the lens, which is nearest to the object side, and the image plane, BHOS is a distance on the optical axis between the image-side surface of the lens, which is nearest to the image plane, and the image plane;

wherein under a first working temperature WT1, BHOS1 is a distance on the optical axis between the image-side surface of the lens, which is nearest to the image plane, and the image plane;

wherein MTFE0, MTFE3, and MTFE7 are respectively a value of modulation transfer function of visible light in a spatial frequency of 55 cycles/mm at the optical axis, 0.3 HOI, and 0.7 HOI on an image plane, and the optical image capturing system further satisfies: MTFE0≥0.1; MTFE3≥0.01; and MTFE7≥0.01.

2. The optical image capturing system according to claim 1, wherein the first working temperature WT1 satisfies: −50° C.<WT1≤100° C.

3. The optical image capturing system according to claim 1, wherein the first working temperature WT1 satisfies: −40° C.<WT1≤70° C.

4. The optical image capturing system according to claim 1, wherein at least one among the at least two lenses of the optical imaging lens assembly is made of material which has a first thermal refractive index coefficient DNT1 at the first working temperature WT1 and a reference wavelength of d-line, and the optical image capturing system satisfies: −200 ($10^{-6}/°$ C.)≤DNT1<0($10^{-6}/°$ C.).

5. The optical image capturing system according to claim 1, wherein at least one among the at least two lenses of the optical imaging lens assembly is made of material which has a second thermal refractive index coefficient DNT2 at a second working temperature WT2 and a reference wavelength of d-line, the second working temperature WT2 is lower than the first working temperature WT1, and the optical image capturing system satisfies: ST<WT2<WT1; and −200 ($10^{-6}/°$ C.)≤DNT2<−1($10^{-6}/°$ C.).

6. The optical image capturing system according to claim 5, wherein the second working temperature WT2 satisfies: −40° C.≤WT2≤50° C.

7. The optical image capturing system according to claim 1, wherein the optical image capturing system further satisfies: 0.9≤2(ARE/HEP)≤2.0, wherein ARE is a length of outline curve from an axial point on any surface of any one of the at least two lenses to a coordinate point of perpendicular height with a distance of a half of the entrance pupil diameter from the optical axis on the surface along an outline of the surface.

8. The optical image capturing system according to claim 1, wherein the optical image capturing system further satisfies: 0.9≤ARS/EHD≤2.0, wherein EHD is the maximum effective half diameter of any surface of any one of the at least two lenses, and ARS is a length of outline curve from an axial point on any surface of any one of the at least two lenses to a coordinate point of perpendicular height with a distance of a half of the entrance pupil diameter from the optical axis on the surface along an outline of the surface of any surface of any one of the at least two lenses.

9. The optical image capturing system according to claim 1, wherein the optical image capturing system satisfies: 1<FWT1/FST≤5, wherein FWT1 is a first effective focal length of the optical imaging lens assembly at the first working temperature WT1.

10. The optical image capturing system according to claim 1, wherein the optical image capturing system satisfies: |BHOS1−BHOS|>0.001 mm, wherein under the standard temperature ST, HOS is a distance on the optical axis between the object-side surface of the lens, which is nearest to the object side, and the image plane, BHOS is a distance on the optical axis between the image-side surface of the lens, which is nearest to the image plane, and the image plane; and wherein under a first working temperature WT1, BHOS1 is a distance on the optical axis between the image-side surface of the lens, which is nearest to the image plane, and the image plane.

11. The optical image capturing system according to claim 1, wherein the optical image capturing system satisfies: 0<|BHOS1−BHOS|/BHOS≤2, wherein under the standard temperature ST, HOS is a distance on the optical axis between the object-side surface of the lens, which is nearest to the object side, and the image plane, and BHOS is a distance on the optical axis between the image-side surface of the lens, which is nearest to the image plane, and the image plane; and wherein under a first working temperature WT1, BHOS1 is a distance on the optical axis between the image-side surface of the lens, which is nearest to the image plane, and the image plane.

12. An optical image capturing system, comprising:
an optical imaging lens assembly comprising at least two lenses having refractive power; and
an image plane, wherein each lens of the at least two lenses has an object-side surface, which faces an object side, and an image-side surface, which faces an image side;
a first positioning element comprising a holder and a base, and wherein the holder is in a hollow shape and non-transparent, and configured to connect the optical imaging lens assembly, and the base is disposed near the image plane and configured to shield the image plane;
wherein at least one among the at least two lenses has positive refractive power, and the optical image capturing system satisfies: 1.0≤FST/HEP≤10.0; 0 deg<HAF≤150 deg; 1 mm≤LPE1≤1000 mm; 1.1($10^{-6}/°$ C.)≤CES1≤120($10^{-6}/°$ C.); and DNT1<0 ($10^{-6}/°$ C.), wherein FST is a standard effective focal length of the optical imaging lens assembly at a standard temperature ST, HEP is an entrance pupil diameter of the optical imaging lens assembly, HAF is a half of the maximum field angle of the optical imaging lens assembly;

wherein at least one among the at least two lenses of the optical imaging lens assembly is made of material which has a first thermal refractive index coefficient DNT1 at a first working temperature WT1 and a reference wavelength of d-line, and LPE1 is a length of an outer wall of the first positioning element in parallel with the optical axis at the standard temperature ST, and CES1 is a thermal expansion coefficient of the first positioning element at the standard temperature ST;

wherein BHOS is a distance on the optical axis between the image-side surface of the lens, which is nearest to the image plane, and the image plane, and under the first working temperature WT1, BHOS1 is a distance on the optical axis between the image-side surface of the lens, which is nearest to the image plane, and the image plane;

wherein the optical image capturing system satisfies: $0<|BHOS1-BHOS|/\alpha \leq 100$, where $\alpha$ is the product of LPE1 and CES1.

13. The optical image capturing system according to claim 12, wherein the first working temperature WT1 satisfies: $-50°$ C.$<$WT1$\leq 100°$ C.

14. The optical image capturing system according to claim 12, wherein the first working temperature WT1 satisfies: $-40°$ C.$<$WT1$\leq 70°$ C.

15. The optical image capturing system according to claim 12, wherein at least one among the at least two lenses of the optical imaging lens assembly is made of material which has a first thermal refractive index coefficient DNT1 at a first working temperature WT1 and a reference wavelength of d-line, and the optical image capturing system satisfies: $-200\ (10^{-6}/°\ C.)\leq DNT1<0(10^{-6}/°\ C.)$.

16. The optical image capturing system according to claim 12, wherein the optical image capturing system satisfies: $0<|BHOS1-BHOS|/BHOS\leq 10$, wherein under the standard temperature ST, HOS is a distance on the optical axis between the object-side surface of the lens, which is nearest to the object side, and the image plane.

17. The optical image capturing system according to claim 12, wherein the optical image capturing system satisfies: $1\ mm(10^{-4}/°\ C.)\leq \alpha \leq 10\ mm\ (10^{-4}/°\ C.)$, where a is the product of LPE1 and CES1.

18. The optical image capturing system according to claim 12, wherein the optical image capturing system further satisfies: MTFE0$\geq$0.1; MTFE3$\geq$0.01; and MTFE7$\geq$0.01, wherein MTFE0, MTFE3, and MTFE7 are respectively a value of modulation transfer function of visible light in a spatial frequency of 55 cycles/mm at the optical axis, 0.3 HOI, and 0.7 HOI on an image plane.

19. The optical image capturing system according to claim 12, wherein the optical image capturing system further satisfies: $0.9\leq 2(ARE/HEP)\leq 2.0$, wherein ARE is a length of outline curve from an axial point on any surface of any one of the at least two lenses to a coordinate point of perpendicular height with a distance of a half of the entrance pupil diameter from the optical axis on the surface along an outline of the surface.

20. The optical image capturing system according to claim 12, wherein material of the first positioning element is selected from the group consisting of aluminum, magnesium, copper, iron, silver, gold, and alloy thereof.

21. The optical image capturing system according to claim 12, wherein material of the first positioning element is selected from the group consisting of polycarbonate, liquid crystal plastic, and a mixture thereof.

22. An optical image capturing system, comprising:
an optical imaging lens assembly comprising at least two lenses having refractive power; and
an image plane;
wherein each lens of the at least two lenses has an object-side surface, which faces an object side, and an image-side surface, which faces an image side;
wherein at least one among the at least two lenses has positive refractive power, and the optical image capturing system satisfies: $1.0\leq FST/HEP\leq 10.0$; $0$ deg$<$HAF$\leq$150 deg; $-50°$ C.$<$WT1$\leq 100°$ C.; $-200\ (10^{-6}/°\ C.)\leq DNT1<0(10^{-6}/°\ C.)$ and $0<|BHOS1-BHOS|/BHOS\leq 5$, wherein FST is a standard effective focal length of the optical imaging lens assembly at a standard temperature ST, HEP is an entrance pupil diameter of the optical imaging lens assembly, HAF is a half of the maximum field angle of the optical imaging lens assembly, HOS is a distance on the optical axis between the object-side surface of the lens, which is nearest to the object side and the image plane, and BHOS is a distance on the optical axis between the image-side surface of the lens, which is nearest to the image plane, and the image plane;
wherein under a first working temperature WT1, BHOS1 is a distance on the optical axis between the image-side surface of the lens, which is nearest to the image plane, and the image plane; and
wherein at least one among the at least two lenses of the optical imaging lens assembly is made of material which has a first thermal refractive index coefficient DNT1 at the first working temperature WT1 and a reference wavelength of d-line.

23. The optical image capturing system according to claim 22, further comprising a first positioning element comprising a holder and a base, wherein the holder is in a hollow shape and non-transparent, and configured to connect the optical imaging lens assembly, and the base is disposed near the image plane and configured to shield the image plane; wherein the optical image capturing system satisfies: $0<|BHOS1-BHOS|/\alpha \leq 100$, wherein LPE1 is a length of an outer wall of the first positioning element in parallel with the optical axis at the standard temperature ST, CES1 is a thermal expansion coefficient of the first positioning element at the standard temperature ST, and a is the product of LPE1 and CES1.

24. An electronic device, comprising:
an optical imaging lens assembly comprising at least two lenses having refractive power;
an image plane; and
a first positioning element comprising a holder and a base, and the holder is in a hollow shape and non-transparent, and configured to connect the optical imaging lens assembly, and the base is disposed near the image plane and configured to shield the image plane;
wherein at least one among the at least two lenses has positive refractive power, and the following relationships are satisfied: $1.0\leq FST/HEP\leq 10.0$; $0$ deg$<$HAF$\leq$150 deg; and $-200\ (10^{-6}/°\ C.)<DNT1<0\ (10^{-6}/°\ C.)$, wherein FST is a standard effective focal length of the optical imaging lens assembly at a standard temperature ST;
wherein at least one among the at least two lenses of the optical imaging lens assembly is made of material which has a first thermal refractive index coefficient DNT1 at a first working temperature WT1 and a reference wavelength of d-line, and the first working temperature WT1 is higher than the standard temperature ST;
wherein HEP is an entrance pupil diameter of the optical imaging lens assembly, HAF is a half of the maximum field angle of the optical imaging lens assembly;
wherein MTFE0, MTFE3, and MTFE7 are respectively a value of modulation transfer function of visible light in a spatial frequency of 55 cycles/mm at the optical axis, 0.3 HOI and 0.7 HOI on an image plane, and an optical image capturing system further satisfies: MTFE0$\leq$0.1; MTFE3$\geq$0.01: and MTFE7$\geq$0.01.

25. The electronic device according to claim 24, wherein the first working temperature WT1 satisfies: $-50°$ C.$<$WT1$\leq 100°$ C.

26. The electronic device according to claim 24, wherein the optical image capturing system further satisfies: $0.9 \leq 2(ARE/HEP) \leq 2.0$, wherein ARE is a length of outline curve from an axial point on any surface of any one of the at least two lenses to a coordinate point of perpendicular height with a distance of a half of the entrance pupil diameter from the optical axis on the surface along an outline of the surface.

27. The electronic device according to claim 24, wherein the optical image capturing system further satisfies: $0 < |BHOS1-BHOS|/\alpha \leq 100$, wherein under the standard temperature ST, HOS is a distance on the optical axis between the object-side surface of the lens, which is nearest to the object side, and the image plane, BHOS is a distance on the optical axis between the image-side surface of the lens, which is nearest to the image plane, and the image plane;

wherein under the first working temperature WT1, BHOS1 is a distance on the optical axis between the image-side surface of the lens, which is nearest to the image plane, and the image plane;

wherein LPE1 is a length of an outer wall of the first positioning element in parallel with the optical axis at the standard temperature ST, and CES1 is a thermal expansion coefficient of the first positioning element at the standard temperature ST, and a is the product of LPE1 and CES1.

\* \* \* \* \*